United States Patent
Park et al.

(10) Patent No.: US 11,903,001 B2
(45) Date of Patent: Feb. 13, 2024

(54) METHODS AND APPARATUS FOR COMMUNICATING DATA ON THE BASIS OF TONE PLAN

(71) Applicant: LG ELECTRONICS INC., Seoul (KR)

(72) Inventors: Eunsung Park, Seoul (KR); Sunwoong Yun, Seoul (KR); Dongguk Lim, Seoul (KR); Jinsoo Choi, Seoul (KR)

(73) Assignee: LG ELECTRONICS, INC., Seoul (KR)

( * ) Notice: Subject to any disclaimer, the term of this patent is extended or adjusted under 35 U.S.C. 154(b) by 581 days.

(21) Appl. No.: 16/973,427

(22) PCT Filed: Jun. 3, 2019

(86) PCT No.: PCT/KR2019/006631
§ 371 (c)(1),
(2) Date: Dec. 9, 2020

(87) PCT Pub. No.: WO2019/235787
PCT Pub. Date: Dec. 12, 2019

(65) Prior Publication Data
US 2021/0392647 A1 Dec. 16, 2021

(30) Foreign Application Priority Data

Jun. 8, 2018 (KR) ........................ 10-2018-0066232
Jun. 15, 2018 (KR) ........................ 10-2018-0068773
(Continued)

(51) Int. Cl.
*H04W 72/53* (2023.01)
*H04L 27/26* (2006.01)
(Continued)

(52) U.S. Cl.
CPC ........... *H04W 72/53* (2023.01); *H04L 5/0053* (2013.01); *H04L 5/0094* (2013.01);
(Continued)

(58) Field of Classification Search
CPC . H04W 72/53; H04W 72/0453; H04W 72/23; H04W 84/12; H04L 27/2607; H04L 5/0053; H04L 5/0094; H04L 27/2602
See application file for complete search history.

(56) References Cited

U.S. PATENT DOCUMENTS

2016/0330300 A1  11/2016  Josiam et al.
2017/0255659 A1  9/2017  Cariou et al.
(Continued)

OTHER PUBLICATIONS

PCT International Application No. PCT/KR2019/006631, International Search Report dated Sep. 3, 2019, 4 pages.
(Continued)

*Primary Examiner* — Omar J Ghowrwal
(74) *Attorney, Agent, or Firm* — LEE, HONG, DEGERMAN, KANG & WAIMEY

(57) ABSTRACT

A method and an apparatus for transmitting and receiving data in a wireless LAN system are proposed. Specifically, an AP transmits control information to at least one STA. The AP transmits data to at least one STA or receives data from at least one STA, on the basis of the control information. The control information includes resource unit information for transmitting and receiving the data in a broadband. If the RU information is tone plan information for the full bandwidth of the broadband, the RU information includes allocation information that the broadband is composed of 12 guard tones, 4068 tones RU, 5 DC tones, and 11 guard tones. If the RU information is tone plan information to which OFDMA is applied for the broadband, the RU information includes allocation information that the broadband is composed of 12

(Continued)

guard tones, 2020 tones RU, 13 tones RU, 7 DC, 13 tones RU, 2020 tones RU, and 11 guard tones.

18 Claims, 19 Drawing Sheets

(30) Foreign Application Priority Data

Jul. 19, 2018 (KR) .................. 10-2018-0084372
Jul. 26, 2018 (KR) .................. 10-2018-0087456

(51) Int. Cl.
*H04W 72/0453* (2023.01)
*H04W 72/23* (2023.01)
*H04L 5/00* (2006.01)
*H04L 27/02* (2006.01)
*H04W 84/12* (2009.01)

(52) U.S. Cl.
CPC ...... *H04L 27/2602* (2013.01); *H04L 27/2603* (2021.01); *H04L 27/2607* (2013.01); *H04W 72/0453* (2013.01); *H04W 72/23* (2023.01); *H04W 84/12* (2013.01)

(56) References Cited

U.S. PATENT DOCUMENTS

| | | | |
|---|---|---|---|
| 2017/0273083 A1 | 9/2017 | Chen et al. | |
| 2019/0109684 A1* | 4/2019 | Chen | H04L 5/003 |
| 2019/0253296 A1* | 8/2019 | Chen | H04L 5/0044 |
| 2020/0374062 A1* | 11/2020 | Verma | H04L 5/0035 |

OTHER PUBLICATIONS

Cariou, L. et al., "Extreme Throughput (EX) 802.11", doc.: IEEE 802.11-18/0789r10, May 2018, 17 pages.
Yang, L. et al., "11ax OFDMA Tone Plan Leftover Tones and Pilot Structure", doc.: IEEE 802.11-15/0819r1, Jul. 2015, 34 pages.

* cited by examiner

FIG. 1
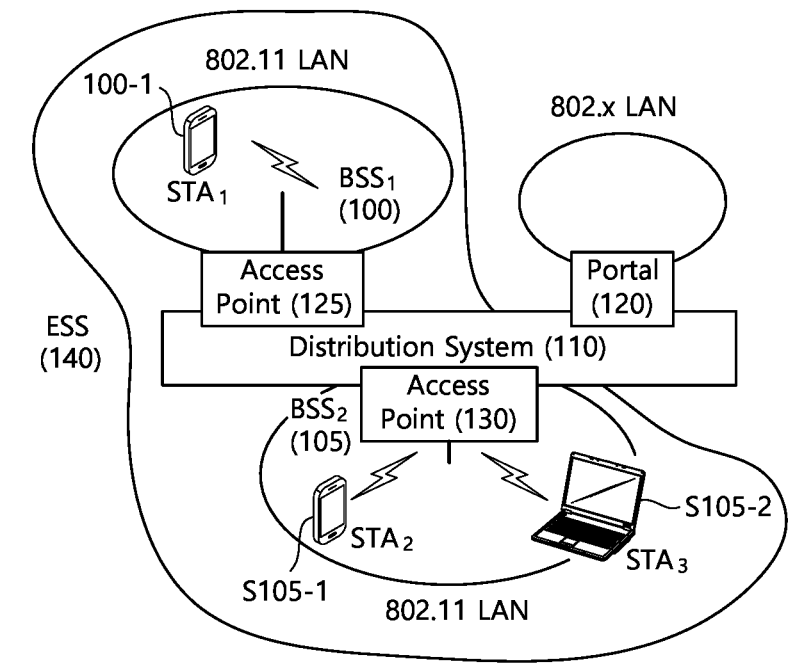
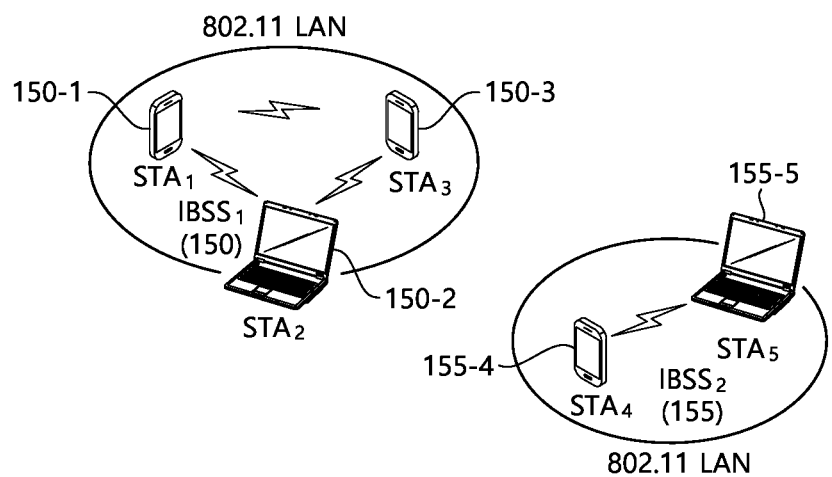

METHODS AND APPARATUS FOR COMMUNICATING DATA ON THE BASIS OF TONE PLAN

CROSS-REFERENCE TO RELATED APPLICATIONS

This application is the National Stage filing under 35 U.S.C. 371 of International Application No. PCT/KR2019/006631, filed on Jun. 3, 2019, which claims the benefit of earlier filing date and right of priority to Korean Patent Application Nos. 10-2018-0066232, filed on Jun. 8, 2018, 10-2018-0068773, filed on Jun. 15, 2018, 10-2018-0084372, filed on Jul. 19, 2018, and 10-2018-0087456, filed on Jul. 26, 2018, the contents of which are all incorporated by reference herein in their entirety.

BACKGROUND

Field

The present specification relates to a scheme of configuring a tone plan in a wireless local area network (WLAN) system, and more particularly, to a method and apparatus for transmitting/receiving data by using a tone plan in a WLAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY

The present specification proposes a method and apparatus for transmitting/receiving data, based on a tone plan, in a wireless local area network (WLAN) system.

An example of the present specification proposes a method of transmitting/receiving data, based on a tone plan.

The present embodiment may be performed in a network environment in which a next-generation WLAN system is supported. The next-generation WLAN system is a WLAN system evolved from an 802.11ax system, and may satisfy backward compatibility with the 802.11ax system.

The present embodiment may be performed in a transmitting device, and the transmitting device may correspond to an access point (AP). A receiving device of the present embodiment may correspond to a station (STA) (non-AP STA).

The AP transmits control information to at least one STA.

The AP transmits data to the at least one STA or receives data from the at least one STA, based on the control information.

The control information includes resource unit (RU) information for transmitting/receiving the data in a broadband. That is, it may be regarded that the RU information includes scheduling information on data for the at least one STA (information on a configuration of an RU used when data is transmitted in practice in the broadband). The at least one STA may decode the RU information to transmit/receive the data in unit of RU. The broadband may be 160 MHz, 240 MHz or 320 MHz, but is limited to 320 MHz in the present embodiment.

If the RU information is tone plan information for a full bandwidth of the broadband, the RU information includes allocation information on that the broadband consists of 12 guard tones, a 4068-tone RU, 5 DC tones, and 11 guard tones. The allocation information is one example, and may include allocation information for a configuration of various RUs in which data is transmitted in practice. When using the tone plan for the full bandwidth of the broadband, it may be SU transmission. When MU MIMO is applied for the full bandwidth, it may be MU transmission.

If the RU information is tone plan information which applies OFDMA for the broadband, the RU information includes allocation information on that the broadband consists of 12 guard tones, a 2020-tone RU, a 13-tone RU, 7 DC tones, a 13-tone RU, a 2020-tone RU, and 11 guard tones. The allocation information is one example, and the RU information may include allocation information for a configuration of various RUs in which data is transmitted in practice. When using the tone plan which applies OFDMA for the broadband, the at least one STA is one or more STAs (SU transmission or MU transmission).

If the RU information is tone plan information for the full bandwidth of the broadband, the tone plan for the broadband is as follows. The broadband may sequentially consist of 12 guard tones, a 4068-tone RU, 5 DC tones, and 11 guard tones. The 5 DC tones may be located at the center of the broadband.

The 4068-tone RU is an RU including 4068 tones. A tone index of the 4068-tone RU ranges from −2036 to −3 and from 3 to 2036. The data may be transmitted/received through the 4068-tone RU.

If the RU information is tone plan information which applies OFDMA for the broadband, the tone plan for the broadband is as follows. The broadband may sequentially consist of 12 guard tones, a 4068-tone RU, 5 DC tones, and 11 guard tones. The 5 DC tones may be located at the center of the broadband.

The 2020-tone RU is an RU including 2020 tones. The 2020-tone RU may consist of a 996-tone RU, 1 null tone, a 26-tone RU, 1 null tone, and a 996-tone RU.

The 996-tone RU is an RU including 996 tones. The 996-tone RU may consist of a 484-tone RU, 1 null tone, a 26-tone RU, 1 null tone, and a 484-tone RU.

The 484-tone RU is an RU including 484 tones. The 484-tone RU may consist of a 242-tone RU and a 242-tone RU.

The 242-tone RU is an RU including 242 tones. The 242-tone RU may consist of 1 null tone, a 106-tone RU, 1 null tone, a 26-tone RU, 1 null tone, a 106-tone RU, and 1 null tone.

The 106-tone RU is an RU including 106 tones. The 106-tone RU may consist of a 52-tone RU, 1 null tone, and a 52-tone RU.

The 52-tone RU is an RU including 52 tones. The 52-tone RU may consist of a 26-tone RU and a 26-tone RU. The 26-tone RU may be a minimum-unit RU including 26 tones.

In case of a tone plan which applies OFDMA for the broadband, the data may be transmitted/received through the 2020-tone RU, the 996-tone RU, the 484-tone RU, the 242-tone RU, the 106-tone RU, the 52-tone RU, or the 26-tone RU. That is, the data may be transmitted/received through an RU (the 996-tone RU, the 484-tone RU, the 242-tone RU, the 106-tone RU, the 52-tone RU, or the 26-tone RU) having the 2020-tone RU or a smaller tone included in the 2020-tone RU.

In addition, the AP may generate a physical protocol data unit (PPDU).

The PPDU may include a legacy preamble, a signal field, a training field, and a data field, The control information may be included in the signal field. The signal field may include extremely high throughput (EHT)-SIG-A and EHT-SIG-B. The EHT-SIG-B may include the RU information. That is, the AP may report information on the tone plan in the broadband through the EHT-SIG-B in the PPDU.

The data may include the training field and the data field. The training field may include an EHT-short training field (STF) and an EHT-long training field (LTF). That is, the EHT-STF, EHT-LTF, and data field in the PPDU may be transmitted/received in a band (RU) based on the tone plan in the broadband.

The present specification proposes a scheme of configuring a tone plan in a broadband in a wireless local area network (WLAN) system.

According to an embodiment proposed in the present specification, downlink transmission or uplink transmission can be scheduled by allocating a resource unit, based on the proposed tone plan, thereby acquiring high throughput and efficiency of subcarriers.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
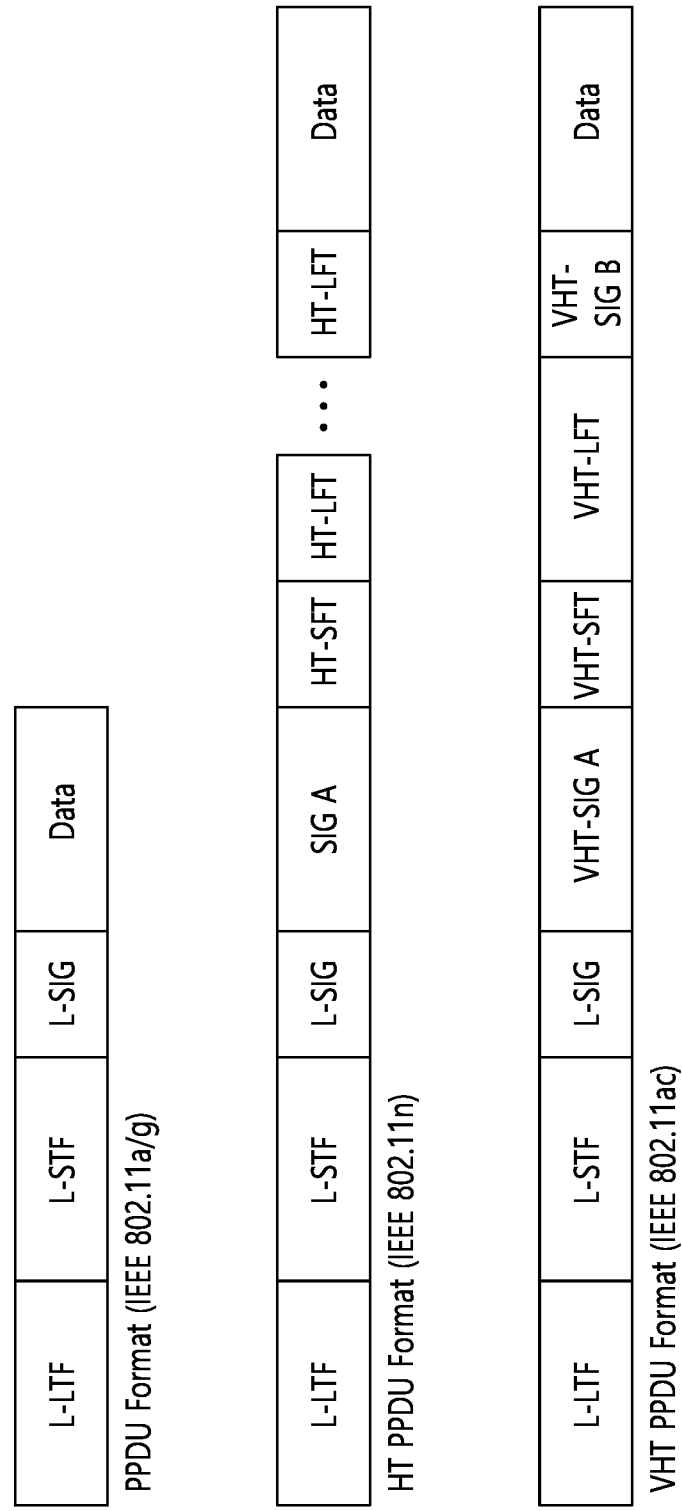
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs (100, 105) (hereinafter, referred to as BSS). The BSSs (100, 105), as a set of an AP and an STA such as an access point (AP) (125) and a station (STA1) (100-1) which are successfully synchronized to communicate with each other, are not concepts indicating a specific region. The BSS (105) may include one or more STAs (105-1, 105-2) which may be joined to one AP (130).

The BSS may include at least one STA, APs providing a distribution service, and a distribution system (DS) (110) connecting multiple APs.

The distribution system (110) may implement an extended service set (ESS) (140) extended by connecting the multiple BSSs (100, 105). The ESS (140) may be used as a term indicating one network configured by connecting one or more APs (125, 130) through the distribution system (110). The AP included in one ESS (140) may have the same service set identification (SSID).

A portal (120) may serve as a bridge which connects the wireless LAN network (IEEE 802.11) and another network (e.g., 802.X).

In the BSS illustrated in the upper part of FIG. 1, a network between the APs (125, 130) and a network between the APs (125, 130) and the STAs (100-1, 105-1, 105-2) may be implemented. However, the network is configured even between the STAs without the APs (125, 130) to perform communication. A network in which the communication is performed by configuring the network even between the STAs without the APs (125, 130) is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs (150-1, 150-2, 150-3, 155-4, 155-5) are managed by a distributed manner. In the IBSS, all STAs (150-1, 150-2, 150-3, 155-4, 155-5) may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in various meanings, for example, in wireless LAN communication, this term may be used to signify a STA participating in uplink MU MIMO and/or uplink OFDMA transmission. However, the meaning of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, and so on. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
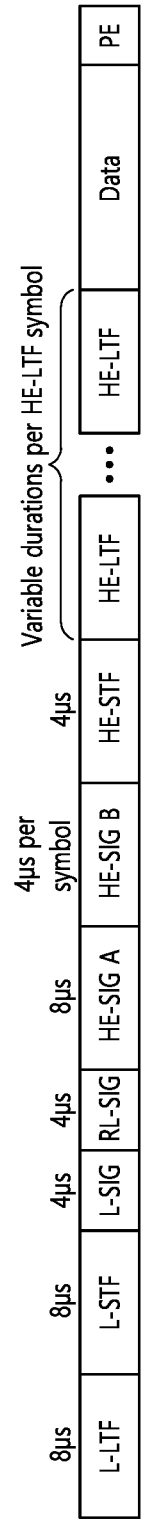
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 µs).

More detailed description of the respective fields of FIG. 3 will be made below.

Figure 4:
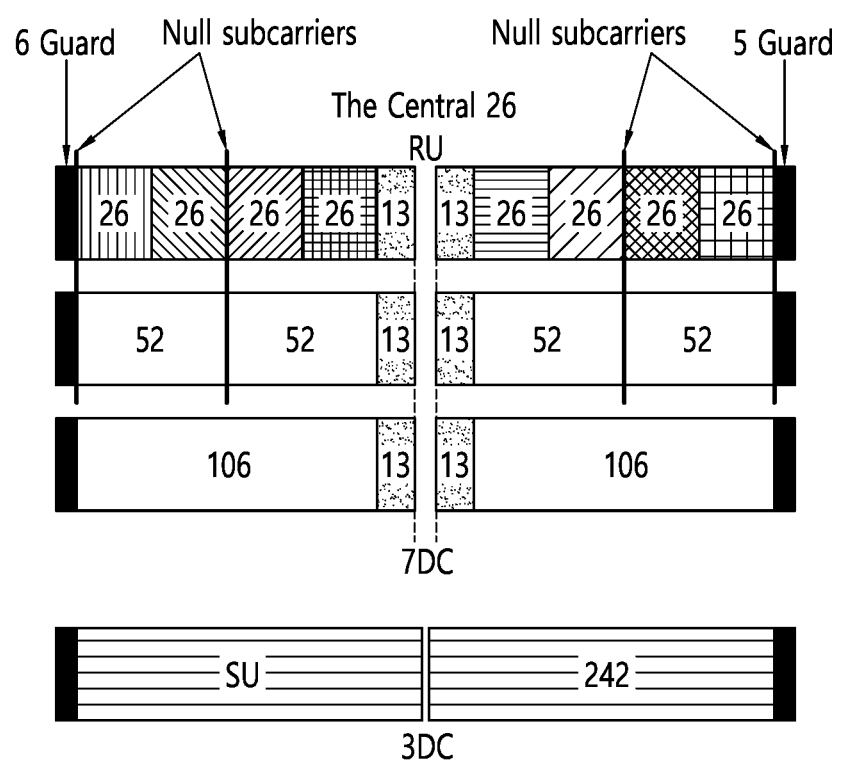
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and, in this case, as illustrated in a lowermost part of FIG. 4, one 242-unit may be used and, in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
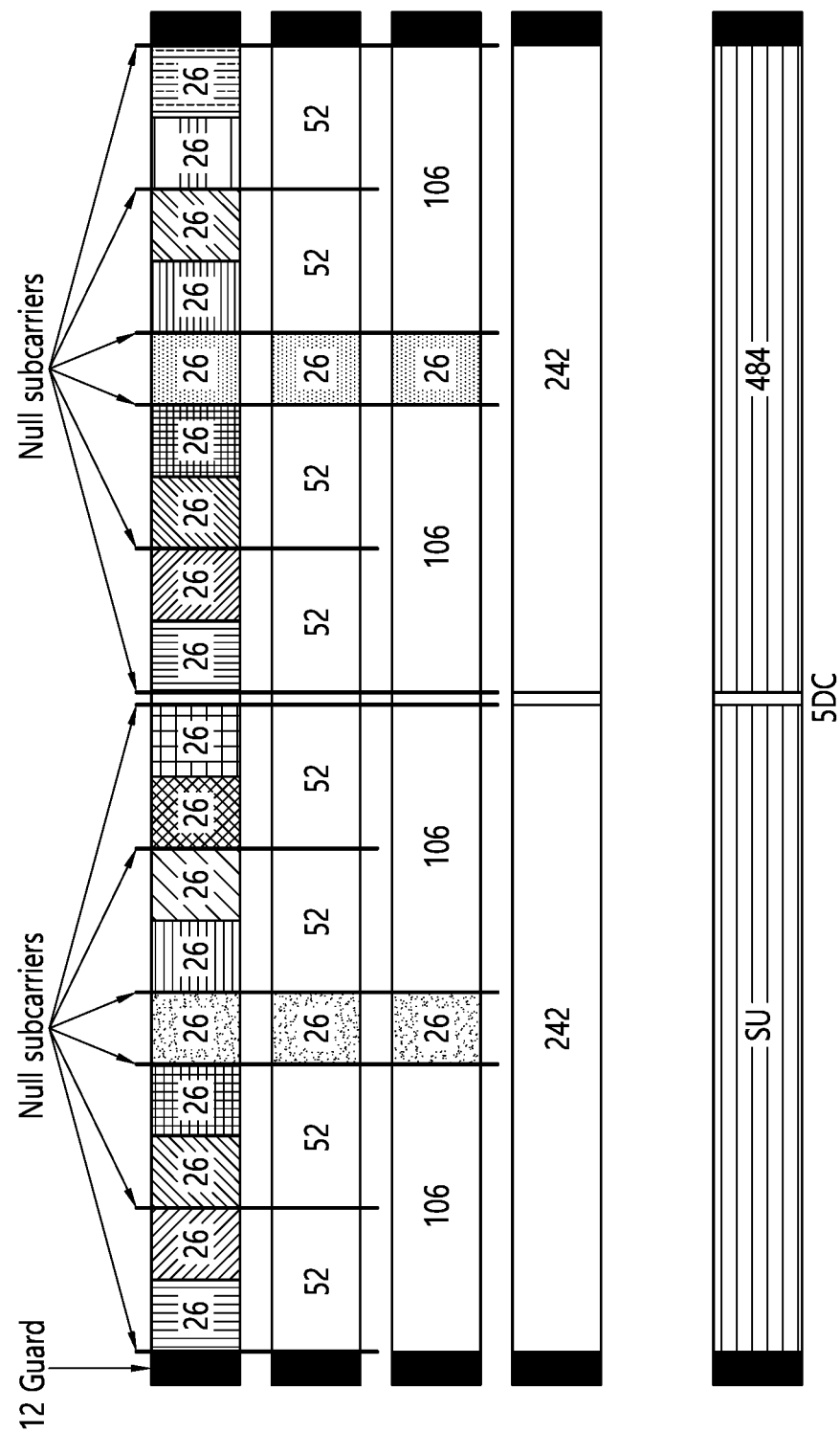
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like, may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
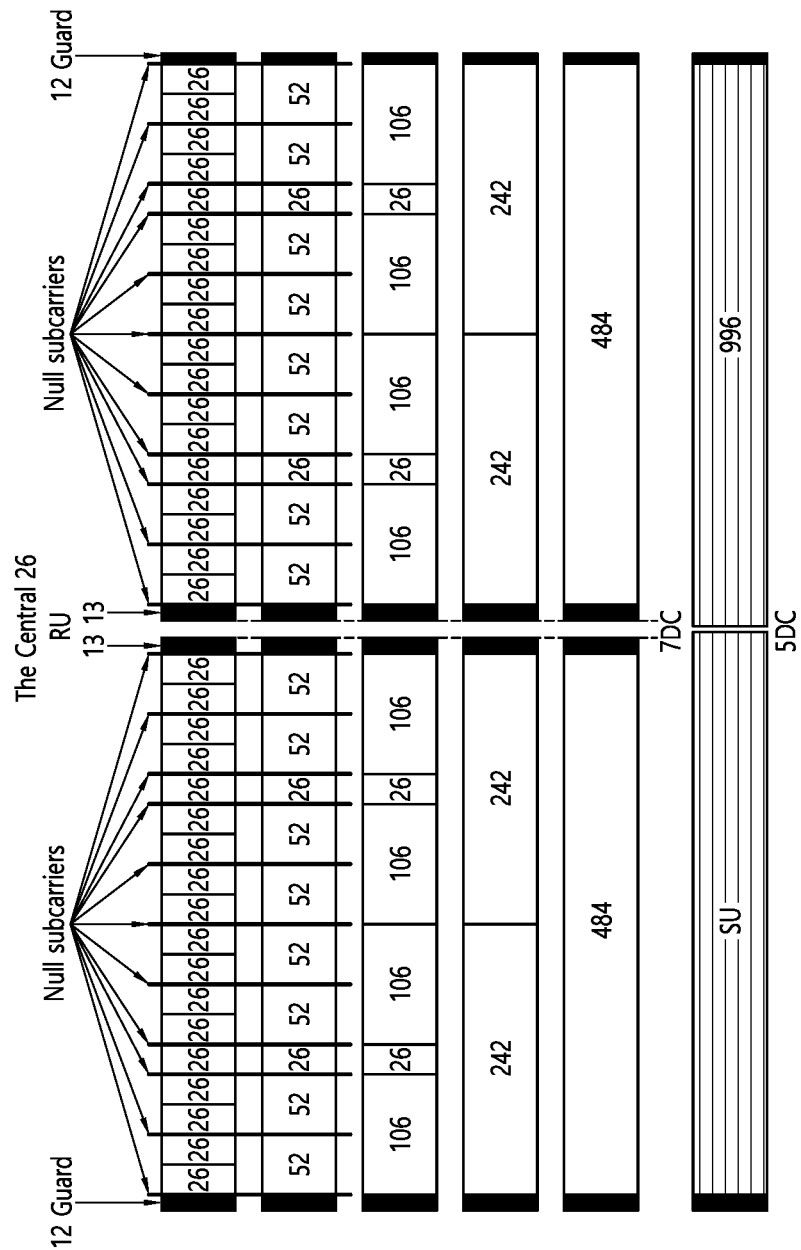
FIG. 6 is a diagram illustrating a layout of resource units (RUs) used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like, may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and, in this case, 5 DC tones may be inserted.

Meanwhile, the detailed number of RUs may be modified similarly to one example of each of FIG. 4 or FIG. 5.

Figure 7:
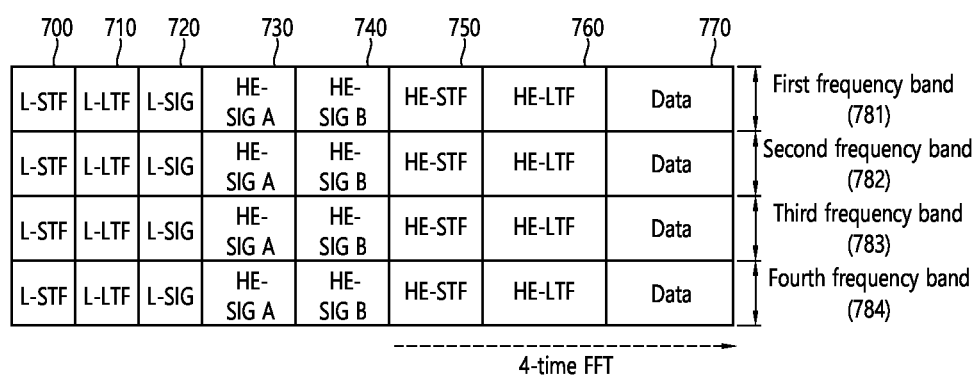
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF (700) may include a short training orthogonal frequency division multiplexing (OFDM) symbol. The L-STF (700) may be used for frame detection, automatic gain control (AGC), diversity detection, and coarse frequency/time synchronization.

An L-LTF (710) may include a long training orthogonal frequency division multiplexing (OFDM) symbol. The L-LTF (710) may be used for fine frequency/time synchronization and channel prediction.

An L-SIG (720) may be used for transmitting control information. The L-SIG (720) may include information regarding a data rate and a data length. Further, the L-SIG (720) may be repeatedly transmitted. That is, a new format, in which the L-SIG (720) is repeated (for example, may be referred to as R-LSIG) may be configured.

An HE-SIG-A (730) may include the control information common to the receiving station.

In detail, the HE-SIG-A (730) may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), and 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

In addition, the HE-SIG-A (730) may be composed of two parts: HE-SIG-A1 and HE-SIG-A2. HE-SIG-A1 and HE-SIG-A2 included in the HE-SIG-A may be defined by the following format structure (fields) according to the PPDU. First, the HE-SIG-A field of the HE SUPPDU may be defined as follows.

TABLE 1

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTE. Equation (28-6), Equation (28-9), Equation (28-12), Equation (28-14), Equation (28-16) and Equation (28-18) apply if the Beam Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0.(#16803) |
| | B2 | UL/DL | 1 | Indicates whether the PPDU is sent UL or DL. Set to the value indicated by the TXVECTOR parameter UPLINK_FLAG. |
| | B3-B6 | MCS | 4 | For an HE SU PPDU: Set to n for MCSn, where n = 0, 1, 2, ...., 11 Values 12-15 are reserved For HE ER SU PPDU with Bandwidth field set to 0 (242-tone RU): Set to n for MCSn, where n = 0, 1, 2 Values 3-15 are reserved For HE ER SU PPDU with Bandwidth field set to 1 (upper frequency 106-tone RU): Set to 0 for MCS 0 Values 1-15 are reserved |
| | B7 | DCM | 1 | Indicates whether or not DCM is applied to the Data field for the MCS indicated. If the STBC field is 0, then set to 1 to indicate That DCM is applied to the Data field. Neither DCM nor STBC shall be applied if(#15489) both the DCM and STBC are set to 1. Set to 0 to indicate that DCM is not applied to the Data field. NOTE-DCM is applied only to HE-MCSs 0, 1, 3 and 4. DCM is applied only to 1 and 2 spatial streams. DCM is not applied in combination with STBC(#15490). |

TABLE 1-continued

| Two Parts of HE-SIG-A | Bit | Field | Number of bits | Description |
|---|---|---|---|---|
| | B8-B13 | BSS Color | 6 | The BSS Color field is an identifier of the BSS. Set to the value of the TXVECTOR parameter BSS_COLOR. |
| | B14 | Reserved | 1 | Reserved and set to 1 |
| | B15-B18 | Spatial Reuse | 4 | Indicates whether or not spatial reuse is allowed during the transmission of this PPDU(#16804). Set to a value from Table 28-21 (Spatial Reuse field encoding for an HE SU PPDU, HE ER SU PPDU, and HE MU PPDU), see 27.11.6 (SPATIAL_REUSE). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B20 | Bandwidth | 2 | For an HE SU PPDU:<br>Set to 0 for 20 MHz<br>Set to 1 for 40 MHz<br>Set to 2 for 80 MHz<br>Set to 3 for 160 MHz and 80 + 80 MHz<br>For an HE ER SU PPDU:<br>Set to 0 for 242-tone RU<br>Set to 1 for upper frequency 106-tone RU within the primary 20 MHz<br>Values 2 and 3 are reserved |
| | B21-B22 | GI+LTF Size | 2 | Indicates the GI duration and HE-LTF size.<br>Set to 0 to indicate a 1 x HE-LTE and 0.8 μs GI<br>Set to 1 to indicate a 2 x HE-LTF and 0.8 μs GI<br>Set to 2 to indicate a 2 x HE-LTE and 1.6 μs GI<br>Set to 3 to indicate:<br>a 4 x HE-LTF and 0.8 μs GI if both the DCM and STBC fields are 1. Neither DCM nor STBC shall be applied if(#Ed) both the DCM and STBC fields are set to 1.<br>a 4 x HE-LTF and 3.2 μs GI, otherwise |
| | B23-B25 | NSTS And Midamble Periodicity | 3 | If the Doppler field is 0, indicates the number of space-time streams.<br>Set to the number of space-time streams minus 1<br>For an HE ER SU PPDU, values 2 to 7 are reserved<br>If the Doppler field is 1; then B23-B24 indicates the number of space time streams, up to 4, and B25 indicates the midamble periodicity.<br>B23-B24 is set to the number of space time streams minus 1.<br>For an HE ER SU PPDU, values 2 and 3 are reserved<br>B25 is set to 0 if TXVECTOR parameter MIDAMBLE_PERIODICITY is 10 and set to 1 if TXVECTOR parameter MIDAMBLE_PERIODICITY is 20. |
| HE-SIG-A2 (HE SU PPDU) or HE-SIG-A3 (HE ER SU PPDU) | B0-B6 | TXOP | 7 | Set to 127 to indicate no duration information if (#15491) TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor(TXOP_DURATION/8)(#62771.<br>Otherwise, B0 is set to 1 and B1-B6 is set to floor((TXOP_DURATION-512 ) / 128)(#16277).<br>where(#16061)<br>B0 indicates the TXOP length granularity. Set to 0 for 8 μs; otherwise set to 1 for 128 μs.<br>B1-B6 indicates the scaled value of the TXOP_DURATION |
| | B7 | Coding | 1 | Indicates whether BCC or LDPC is used:<br>Set to 0 to indicate BCC<br>Set to 1 to indicate LDPC |

TABLE 1-continued

| Two Parts of HE-SIG-A | Bit | Field | Number of bits | Description |
|---|---|---|---|---|
| | B8 | LDPC Extra Symbol Segment | 1 | Indicates the presence of the extra OFDM symbol segment for LDPC:<br>Set to 1 if an extra OFDM symbol segment for LDPC is present<br>Set to 0 if an extra OFDM symbol segment for LDPC is not present<br>Reserved and set to 1 if the Coding field is set to 0(#15492). |
| | B9 | STBC | 1 | If the DCM field is set to 0, then set to 1 if space time block coding is used. Neither DCM nor STBC shall be applied if(#15493) both the DCM field and STBC field are set to 1.<br>Set to 0 otherwise. |
| | B10 | Beamformed (#16038) | 1 | Set to 1 if a beamforming steering matrix is applied to the waveform in an SU transmission.<br>Set to 0 otherwise. |
| | B11-B12 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B13 | PE Disambiguity | 1 | Indicates PE disambiguity(#16274) as defined in 28.3.12 (Packet extension). |
| | B14 | Reserved | 1 | Reserved and set to 1 |
| | B15 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link.<br>Set to 0 otherwise. |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, the HE-SIG-A field of the HE MU PPDU may be defined as follows.

TABLE 2

| Two Parts of HE-SIG-A | Bit | Field | Number of bits | Description |
|---|---|---|---|---|
| HE-SIG-A1 | B0 | UL/DL | 1 | Indicates whether the PPDU is sent UL or DL. Set to the value indicated by the TX VECTOR parameter UPLINK_FLAG.(#16805)<br>NOTE-The TDLS peer can identify the TDLS frame by To DS and From DS fields in the MAC header of the MPDU. |
| | B1-B3 | SIGB MCS | 3 | Indicates the MCS of the HE-SIG-B field:<br>Set to 0 for MCS 0<br>Set to 1 for MCS 1<br>Set to 2 for MCS 2<br>Set to 3 for MCS 3<br>Set to 4 for MCS 4<br>Set to 5 for MCS 5<br>The values 6 and 7 are reserved |

TABLE 2-continued

| Two Parts of HE-SIG-A | Bit | Field | Number of bits | Description |
|---|---|---|---|---|
| | B4 | SIGB DCM | 1 | Set to 1 indicates that the HE-SIG-B is modulated with DCM for the MCS. Set to 0 indicates that the HE-SIG-B is not modulated with DCM for the MCS. NOTE-DCM is only applicable to MCS 0, MCS 1, MCS 3, and MCS 4. |
| | B5-B10 | BSS Color | 6 | The BSS Color field is an identifier of the BSS. Set to the value of the TXVECTOR parameter BSS_COLOR. |
| | B11-B14 | Spatial Reuse | 4 | Indicates whether or not spatial reuse is allowed during the transmission of this PPDU(#16806). Set to the value of the SPATIAL RETTSE parameter of the TXVECTOR, which contains a value from Table 28-21 (Spatial Reuse field encoding for an HE SU PPDU, HE ER SU PPDU, and HE MU PPDU) (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B17 | Bandwidth | 3 | Set to 0 for 20 MHz Set to 1 or 40 MHz. Set to 2 for 80 MHz non-preamble puncturing mode. Set to 3 for 160 MHz and 80 + 80 MHz non-preamble puncturing mode. If the SIGB Compression field is 0: Set to 4 for preamble puncturing in 80 MHz, where in the preamble only the secondary 20 MHz is punctured. Set to 5 for preamble puncturing in 80 MHz, where in the preamble only one of the two 20 MHz subchannels in secondary 40 MHz is punctured. Set to 6 for preamble puncturing in 160 MHz or 80 + 80 MHz, where in the primary 80 MHz of the preamble only the secondary 20 MHz is punctured. Set to 7 for preamble puncturing in 160 MHz or 80 + 80 MHz, where in the primary 80 MHz of the preamble the primary 40 MHz is present. If the SIGB Compression field is 1 then values 4-7 are reserved. |
| | B18-B21 | Number Of HE-SIG-B Symbols Or MU-MIMO Users | 4 | If the HE-SIG-B Compression field is set to 0, indicates the number of OFDM symbols in the HE-SIG-B field:(#15494) Set to the number of OFDM symbols in the HE-SIG-B field minus 1 if the number of OFDM symbols in the HE-SIG-B field is less than 16; Set to 15 to indicate that the number of OFDM symbols in the HE-SIG-B field is equal to 16 if Longer Than 16 HE SIG-B OFDM Symbols Support subfield of the HE Capabilities element transmitted by at least one recipient STA is 0; Set to 15 to indicate that the number of OFDM symbols in the HE-SIG-B field is greater than or equal to 16 if the Longer Than 16 HE SIG-B OFDM Symbols Support subfield of die HE Capabilities element transmitted by all the recipient STAs are 1 and if the HE-SIG-B data rate is less than MCS 4 without DCM. The exact number of OFDM symbols in die HE-SIG-B field is calculated based on the number of User fields in the HE-SIG-B content channel which is indicated by HE-SIG-B common field in this case. If the HE-SIG-B Compression field is set to 1, indicates the number of MU-MIMO users and is set to the number of NU-MIMO users minus 1(#15495). |
| | B22 | SIGB Compression | 1 | Set to 0 if the Common field in HE-SIG-B is present. Set to 1 if the Common field in HE-SIG-B is not present.(#16139) |
| | B23-B24 | GI + LTF Size | 2 | Indicates the GI duration and HE-LTF size: Set to 0 to indicate a 4 × HE-LTF and 0.8 µs GI Set to 1 to indicate a 2 × HE-LTF and 0.8 µs GI Set to 2 to indicate a 2 × HE-LTF and 1.6 µs GI Set to 3 to indicate a 4 × HE-LTF and 3.2 µs GI |

TABLE 2-continued

| Two Parts of HE-SIG-A | Bit | Field | Number of bits | Description |
|---|---|---|---|---|
| | B25 | Doppler | 1 | Set to 1 if one of the following applies:<br>The number of OFDM symbols in the Data field is larger than the signaled midamble periodicity plus 1 and the midamble is present<br>The number of OFDM symbols in the Data lield is less than or equal to the signaled midamble periodicity plus 1 (see 28.3.11.16 Midamble), the midamble is not present, but the channel is fast varying. It recommends that midamble may be used for the PPDUs of the reverse link.<br>Set to 0 otherwise. |
| HE-SIG-A2 | B0-B6 | TXOP | 7 | Set to 127 to indicate no duration information if(#15496) TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor(TXOP_DURATION/8)(#16277).<br>Otherwise, B0 is set to 1 and B1-B6 is set to floor((TXOP_DURATION-512)/128)(#16277).<br>where(#16061)<br>B0 indicates the TXOP length granularity. Set to 0 for 8 μs; otherwise set to 1 for 128 μs.<br>B1-B6 indicates the scaled value of the TXOP_DURATION |
| | B7 | Reserved | 1 | Reserved and set to 1 |
| | B8-B10 | Number of HE-LTF SymbolsAnd Midamble Periodicity | 3 | If the Doppler field is set to 0(#15497), indicates the number of HE-LTF symbols:<br>Set to 0 for 1 HE-LTF symbol<br>Set to 1 for 2 HE-LTF symbols<br>Set to 2 for 4 HE-LTF symbols<br>Set to 3 for 6 HE-LTF symbols<br>Set to 4 for 8 HE-LTF symbols<br>Other values are reserved.<br>If the Doppler field is set to 1(#15498), B8-B9 indicates the number of HE-LTF symbols(#16056) and B10 indicates midamble periodicity:<br>B8-B9 is encoded as follows:<br>0 indicates 1 HE-LTF symbol<br>1 indicates 2 HE-LTF symbols<br>2 indicates 4 HE-LTF symbols<br>3 is reserved<br>B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment or LDPC.<br>Set to 1 if an extra OFDM symbol segment for LDPC is present.<br>Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload.<br>STBC does not apply to HE-SIG-B.<br>STBC is not applied if one or more RUs are used for MU-MIMO allocation.(#15661) |
| | B13-B14 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B15 | PE Disambigusty | 1 | Indicates PE disambiguity(#16274) as defined in 28.3.12 (Packet extension). |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, the HE-SIG-A field of the HE TB PPDU may be defined as follows.

TABLE 3

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 0 for an HE TB PPDU |
| | B1-B6 | BSS Color | 6 | The BSS Color field is an identifier of the BSS. Set to the value of the TX VECTOR parameter BSS_COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz then this Spatial Reuse field applies to the First 20 MHz subband. If the Bandwidth field indicates 160/80 + 80 MHz then this Spatial Reuse field applies to the first 40 MHz subband of the 160 MHz operating band. Set to the value of the SPATIAL_REUSE(1) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRC+OBSS PD-based spatial reuse during this PPDU. For the interpretation of other values see 27.11.6 (SPATIAL_REUSE) and 27.9 (Spatial reuse operation). |
| | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz: This Spatial Reuse field applies to the second 20 MHz subband. If (#Ed) the STA operating channel width is 20 MHz, then this field is set to the same value as Spatial Reuse 1 field. If (#Ed) the STA operating channel width is 40 MHz in the 2.4 GHz band, this field is set to the same value as Spatial Reuse 1 field. If the Bandwidth field indicates 160/80 + 80 MHz the this Spatial Reuse field applies to the second 40 MHz subband of the 160 MHz operating band. Set to the value of the SPATIAL_REUSE(2) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL REUSE) and 27.9 (Spatial reuse operation). |
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the third 20 MHz subband. If (#Ed) the STA operating channel width is 20 MHz or 40 MHz, this field is set to the same value as Spatial Reuse 1 field. |

TABLE 3-continued

| Two Parts of HE-SIG-A | Bit | Field | Number of bits | Description |
|---|---|---|---|---|
| | B19-B22 | Spatial Reuse 4 | 4 | If the Bandwidth field indicates 160/80 + 80 MHz: This Spatial Reuse field applies to the third 40 MHz subband of the 160 MHz operating band. If(#Ed) the STA operating channel width is 80 + 80 MHz, this field is set to the same value as Spatial Reuse 1 field. Set to the value of the SPATIAL_REUSE(3) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the fourth 20 MHz subband. If(#Ed) the STA operating channel width is 20 MHz, then this field is set to the same value as Spatial Reuse 1 field. If(#Ed) the STA operating channel width is 40 MHz, then this field is set to the same value as Spatial Reuse 2 field. If the Bandwidth field indicates 160/80 + 80 MHz: This Spatial Reuse field applies to the fourth 40 MHz subband of the 160 MHz operating band. If(#Ed) the STA operating channel width is 80 + 80 MHz, then this field is set to same value as Spatial Reuse 2 field. Set to the value of the SPATIAL_REUSE(4) parameter of the TXVECTOR, which contains a value from Table 28-22 (Spatial Reuse field encoding for an HE TB PPDU) for an HE TB PPDU (see 27.11.6 (SPATIAL _REUSE)). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL _REUSE) and 27.9 (Spatial reuse operation). |
| | B23 | Reserved | 1 | Reserved and set to 1. NOTE-Unlike other Reserved fields in HE-SIG-A of the HE TB PPDU, B23 does not have a conesponding bit in the Trigger frame. |
| | B24-B25 | Bandwidth | 2 | (#16003)Set to 0 for 20 MHz Set to 1 for 40 MHz Set to 2 for 80 MHz Set to 3 for 160 MHz and 80 + 80 MHz |
| HE-SIG-A2 | B0-B6 | TXOP | 7 | Set to 127 to indicate no duration information if(#15499) TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8)(#16277). Otherwise, B0 is set to 1 and B1-B6 is set to floor ((TXOP_DURATION-512 )/128)( #16277). where(#16061) B0 indicates the TXOP length granularity. Set to 0 for 8 μs; otherwise set to 1 for 128 μs. B1-B6 indicates the scaled value of the TXOP_DURATION |

TABLE 3-continued

| Two Parts of HE-SIG-A | Bit | Field | Number of bits | Description |
|---|---|---|---|---|
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

An HE-SIG-B (740) may be included only in the case of the PPDU for the multiple users (MUs) as described above. Principally, an HE-SIG-A (750) or an HE-SIG-B (760) may include resource allocation information (alternatively, virtual resource allocation information) for at least one receiving STA.

Figure 8:
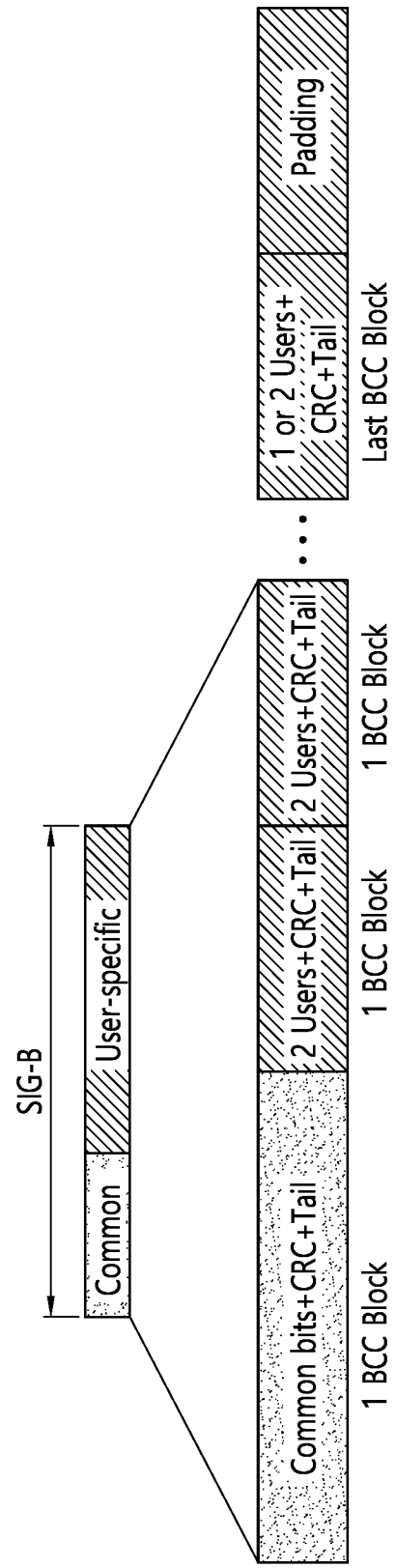
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B (740) may be transmitted in a duplicated form on a MU PPDU. In the case of the HE-SIG-B (740), the HE-SIG-B (740) transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B (740) in a specific frequency band (e.g., the second frequency band) is duplicated with the HE-SIG-B (740) of another frequency band (e.g., the fourth frequency band). Alternatively, the HE-SIG B (740) may be transmitted in an encoded form on all transmission resources. A field after the HE-SIG B (740) may include individual information for respective receiving STAs receiving the PPDU.

The HE-STF (750) may be used for improving automatic gain control estimation in a multiple input multiple output (MIMO) environment or an OFDMA environment.

The HE-LTF (760) may be used for estimating a channel in the MIMO environment or the OFDMA environment.

The size of fast Fourier transform (FFT)/inverse fast Fourier transform (IFFT) applied to the HE-STF (750) and the field after the HE-STF (750), and the size of the FFT/IFFT applied to the field before the HE-STF (750) may be different from each other. For example, the size of the FFT/IFFT applied to the HE-STF (750) and the field after the HE-STF (750) may be four times larger than the size of the FFT/IFFT applied to the field before the HE-STF (750).

For example, when at least one field of the L-STF (700), the L-LTF (710), the L-SIG (720), the HE-SIG-A (730), and the HE-SIG-B (740) on the PPDU of FIG. 7 is referred to as a first field, at least one of the data field (770), the HE-STF (750), and the HE-LTF (760) may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 µs and the IDFT/DFT length applied to each symbol of the second field of the HE PPDU may be expressed as 3.2 µs*4 (=12.8 µs). The length of the OFDM symbol may be a value acquired by adding the length of a guard interval (GI) to the IDFT/DFT length. The length of the GI may have various values such as 0.4 µs, 0.8 µs, 1.6 µs, 2.4 µs, and 3.2 µs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A (730) and may be instructed to receive the downlink PPDU based on the HE-SIG-A (730). In this case, the STA may perform decoding based on the FFT size changed from the HE-STF (750) and the field after the HE-STF (750). On the contrary, when the STA may not be instructed to receive the downlink PPDU based on the HE-SIG-A (730), the STA may stop the decoding and configure a network allocation vector (NAV). A cyclic prefix (CP) of the HE-STF (750) may have a larger size than the CP of another field and the during the CP period, the STA may perform the decoding for the downlink PPDU by changing the FFT size.

Hereinafter, in the embodiment of the present disclosure, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the total bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, subchannels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, subchannel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, subchannels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, subchannel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
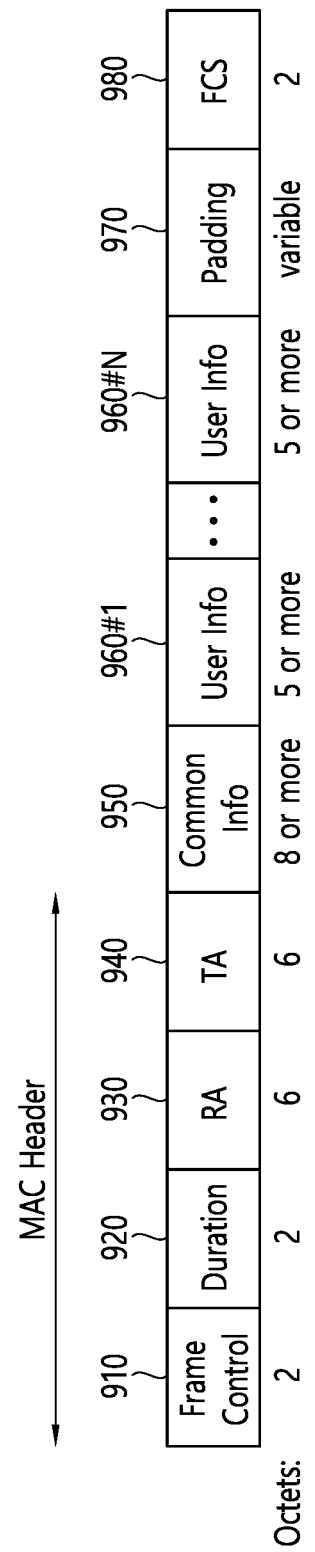
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field (910) shown in FIG. 9 may include information related to a version of the MAC protocol and other additional control information, and a Duration field (920) may include time information for configuring a NAV or information related to an identifier (e.g., AID) of the user equipment.

Also, the RA field (930) includes address information of a receiving STA of the corresponding trigger frame and may be omitted if necessary. The TA field (940) includes address information of an STA triggering the corresponding trigger frame (for example, an AP), and the common information field (950) includes common control information applied to a receiving STA that receives the corresponding trigger frame. For example, a field indicating the length of the L-SIG field of the UL PPDU transmitted in response to the corresponding trigger frame or information controlling the content of the SIG-A field (namely, the HE-SIG-A field) of the UL PPDU transmitted in response to the corresponding trigger frame may be included. Also, as common control information, information on the length of the CP of the UP PPDU transmitted in response to the corresponding trigger frame or information on the length of the LTF field may be included.

Also, it is preferable to include a per user information field (960 #1 to 960 #N) corresponding to the number of receiving STAs that receive the trigger frame of FIG. 9. The per user information field may be referred to as an "RU allocation field".

Also, the trigger frame of FIG. 9 may include a padding field (970) and a frame check sequence field (980).

It is preferable that each of the per user information fields (960 #1 to 960 #N) shown in FIG. 9 includes a plurality of subfields.

Figure 10:
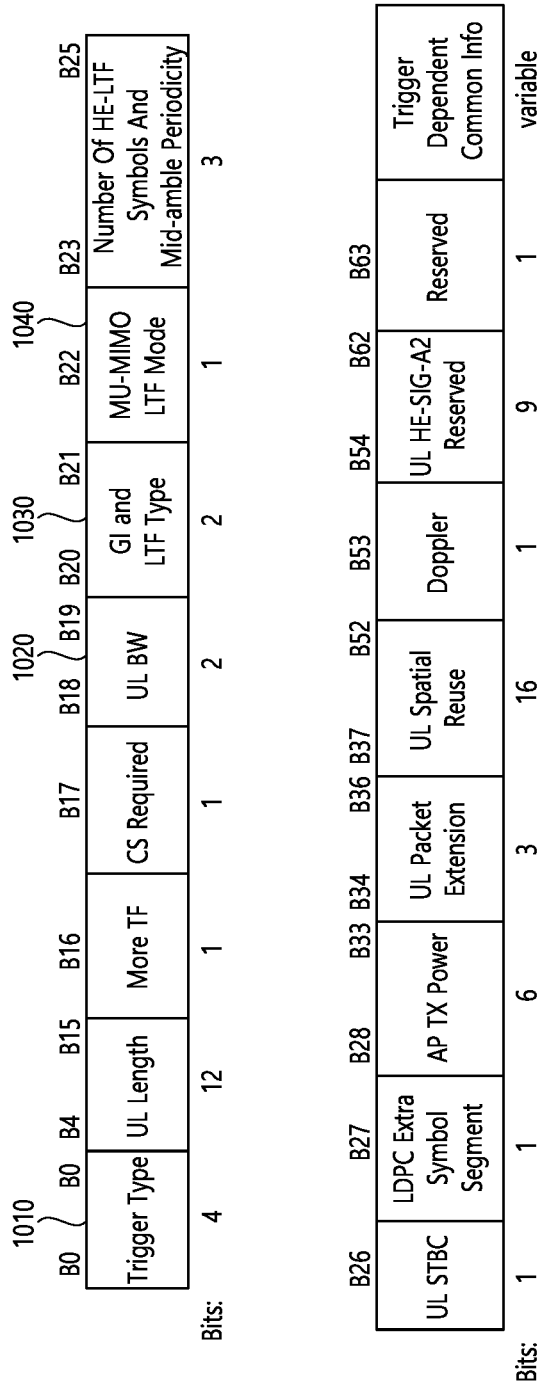
FIG. 10 illustrates an example of a common information field.

FIG. 10 illustrates an example of a common information field. Among the subfields of FIG. 10, some may be omitted, and other additional subfields may also be added. Additionally, the length of each of the subfields shown in the drawing may be varied.

The trigger type field (1010) of FIG. 10 may indicate a trigger frame variant and encoding of the trigger frame variant. The trigger type field (1010) may be defined as follows.

TABLE 4

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

The UL BW field (1020) of FIG. 10 indicates bandwidth in the HE-SIG-A field of an HE Trigger Based (TB) PPDU. The UL BW field (1020) may be defined as follows.

TABLE 5

| UL BW subfield value | Description |
|---|---|
| 0 | 20 MHz |
| 1 | 40 MHz |
| 2 | 80 MHz |
| 3 | 80 + 80 MHz or 160 MHz |

The Guard Interval (GI) and LTF type fields (1030) of FIG. 10 indicate the GI and HE-LTF type of the HE TB PPDU response. The GI and LTF type field (1030) may be defined as follows.

TABLE 6

| GI And LTF field value | Description |
|---|---|
| 0 | 1 × HE-LTF + 1.6 µs GI |
| 1 | 2 × HE-LTF + 1.6 µs GI |
| 2 | 4 × HE-LTF + 3.2 µs GI(#15968) |
| 3 | Reserved |

Also, when the GI and LTF type fields (1030) have a value of 2 or 3, the MU-MIMO LTF mode field (1040) of FIG. 10 indicates the LTF mode of a UL MU-MIMO HE TB PPDU response. At this time, the MU-MIMO LTF mode field (1040) may be defined as follows.

If the trigger frame allocates an RU that occupies the whole HE TB PPDU bandwidth and the RU is allocated to one or more STAs, the MU-MIMO LTF mode field (1040) indicates one of an HE single stream pilot HE-LTF mode or an HE masked HE-LTF sequence mode.

If the trigger frame does not allocate an RU that occupies the whole HE TB PPDU bandwidth and the RU is not allocated to one or more STAs, the MU-MIMO LTF mode field (1040) indicates the HE single stream pilot HE-LTF mode. The MU-MIMO LTF mode field (1040) may be defined as follows.

TABLE 7

| MU-MIMO LTF subfield value | Description |
| --- | --- |
| 0 | HE single stream pilot HE-LTF mode |
| 1 | HE masked HE-LTF sequence mode |

Figure 11:
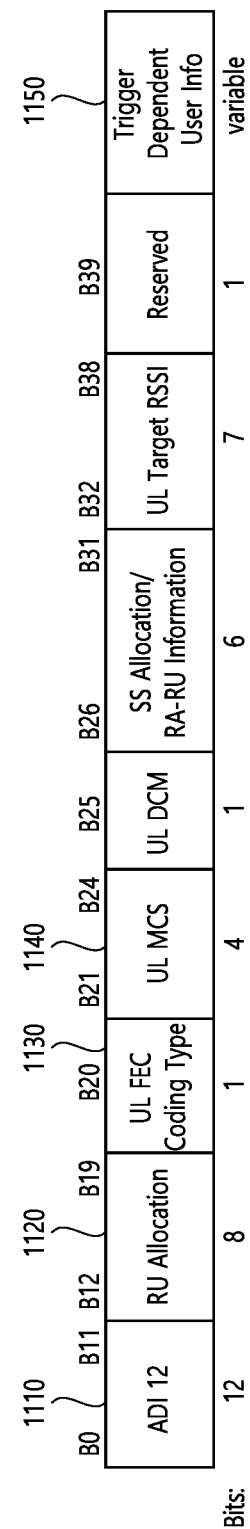
FIG. 11 illustrates an example of a sub-field being included in a per user information field.

FIG. 11 illustrates an example of a subfield being included in a per user information field. Among the subfields of FIG. 11, some may be omitted, and other additional subfields may also be added. Additionally, the length of each of the subfields shown in the drawing may be varied.

The User Identifier field of FIG. 11 (or AID12 field, 1110) indicates the identifier of an STA (namely, a receiving STA) corresponding to per user information, where an example of the identifier may be the whole or part of the AID.

Also, an RU Allocation field (1120) may be included. In other words, when a receiving STA identified by the User Identifier field (1110) transmits a UL PPDU in response to the trigger frame of FIG. 9, the corresponding UL PPDU is transmitted through an RU indicated by the RU Allocation field (1120). In this case, it is preferable that the RU indicated by the RU Allocation field (1120) indicates the RUs shown in FIGS. 4, 5, and 6. A specific structure of the RU Allocation field (1120) will be described later.

The subfield of FIG. 11 may include a (UL FEC) coding type field (1130). The coding type field (1130) may indicate the coding type of an uplink PPDU transmitted in response to the trigger frame of FIG. 9. For example, when BCC coding is applied to the uplink PPDU, the coding type field (1130) may be set to '1', and when LDPC coding is applied, the coding type field (1130) may be set to '0'.

Additionally, the subfield of FIG. 11 may include a UL MCS field (1140). The MCS field (1140) may indicate an MCS scheme being applied to the uplink PPDU that is transmitted in response to the trigger frame of FIG. 9.

Also, the subfield of FIG. 11 may include a Trigger Dependent User Info field (1150). When the Trigger Type field (1010) of FIG. 10 indicates a basic trigger variant, the Trigger Dependent User Info field (1150) may include an MPDU MU Spacing Factor subfield (2 bits), a TID Aggregate Limit subfield (3 bits), a Reserved field (1 bit), and a Preferred AC subfield (2 bits).

Hereinafter, the present disclosure proposes an example of improving a control field included in a PPDU. The control field improved according to the present disclosure includes a first control field including control information required to interpret the PPDU and a second control field including control information for demodulate the data field of the PPDU. The first and second control fields may be used for various fields. For example, the first control field may be the HE-SIG-A (730) of FIG. 7, and the second control field may be the HE-SIG-B (740) shown in FIGS. 7 and 8.

Hereinafter, a specific example of improving the first or the second control field will be described.

In the following example, a control identifier inserted to the first control field or a second control field is proposed.

The size of the control identifier may vary, which, for example, may be implemented with 1-bit information.

The control identifier (for example, a 1-bit identifier) may indicate whether a 242-type RU is allocated when, for example, 20 MHz transmission is performed. As shown in FIGS. 4 to 6, RUs of various sizes may be used. These RUs may be divided broadly into two types. For example, all of the RUs shown in FIGS. 4 to 6 may be classified into 26-type RUs and 242-type RUs. For example, a 26-type RU may include a 26-RU, a 52-RU, and a 106-RU while a 242-type RU may include a 242-RU, a 484-RU, and a larger RU.

The control identifier (for example, a 1-bit identifier) may indicate that a 242-type RU has been used. In other words, the control identifier may indicate that a 242-RU, a 484-RU, or a 996-RU is included. If the transmission frequency band in which a PPDU is transmitted has a bandwidth of 20 MHz, a 242-RU is a single RU corresponding to the full bandwidth of the transmission frequency band (namely, 20 MHz). Accordingly, the control identifier (for example, 1-bit identifier) may indicate whether a single RU corresponding to the full bandwidth of the transmission frequency band is allocated.

For example, if the transmission frequency band has a bandwidth of 40 MHz, the control identifier (for example, a 1-bit identifier) may indicate whether a single RU corresponding to the full bandwidth (namely, bandwidth of 40 MHz) of the transmission frequency band has been allocated. In other words, the control identifier may indicate whether a 484-RU has been allocated for transmission in the frequency band with a bandwidth of 40 MHz.

For example, if the transmission frequency band has a bandwidth of 80 MHz, the control identifier (for example, a 1-bit identifier) may indicate whether a single RU corresponding to the full bandwidth (namely, bandwidth of 80 MHz) of the transmission frequency band has been allocated. In other words, the control identifier may indicate whether a 996-RU has been allocated for transmission in the frequency band with a bandwidth of 80 MHz.

Various technical effects may be achieved through the control identifier (for example, 1-bit identifier).

First of all, when a single RU corresponding to the full bandwidth of the transmission frequency band is allocated through the control identifier (for example, a 1-bit identifier), allocation information of the RU may be omitted. In other words, since only one RU rather than a plurality of RUs is allocated over the whole transmission frequency band, allocation information of the RU may be omitted deliberately.

Also, the control identifier may be used as signaling for full bandwidth MU-MIMO. For example, when a single RU is allocated over the full bandwidth of the transmission frequency band, multiple users may be allocated to the corresponding single RU. In other words, even though signals for each user are not distinctive in the temporal and spatial domains, other techniques (for example, spatial multiplexing) may be used to multiplex the signals for multiple users in the same, single RU. Accordingly, the control identifier (for example, a 1-bit identifier) may also be used to indicate whether to use the full bandwidth MU-MIMO described above.

The common field included in the second control field (HE-SIG-B, 740) may include an RU allocation subfield. According to the PPDU bandwidth, the common field may include a plurality of RU allocation subfields (including N RU allocation subfields). The format of the common field may be defined as follows.

TABLE 8

| Subfield | Number of bits | Description |
|---|---|---|
| RU Allocation | N × 8 | Indicates the RU assignment to be used in the data portion in the frequency domain. It also indicates the number of users in each RU. For RUs of size greater than or equal to 106-tones that support MU-MIMO, it indicates the number of users multiplexed using MU-MIMO. Consists of N RU Allocation subfields: N = 1 for a 20 MHz and a 40 MHz HE MU PPDU N = 2 for an 80 MHz HE MU PPDU N = 4 for a 160 MHz or 80 + 80 MHz HE MU PPDU |
| Center 26-tone RU | 1 | This field is present only if (#15510) the value of the Bandwidth field of HE-SIG-A field in an HE MU PPDU is set to greater than 1. If the Bandwidth field of the HE-SIG-A field in an HE MU PPDU is set to 2, 4 or 5 for 80 MHz: Set to 1 to indicate that a user is allocated to the center 26-tone RU (see Figure 28-7 (RU locations in an 80 MT-17 HE PPDU(#16528))); otherwise, set to 0. The same value is applied to both HE-SIG-B content channels. If the Bandwidth field of the HE-SIG-A field in an HE MU PPDU is set to 3, 6 or 7 for 160 MHz or 80 + 80 MHz: For HE-SIG-B content channel 1, set to 1 to indicate that a user is allocated to the center 26-tone RU of the lower frequency 80 MHz; otherwise, set to 0. For HE-SIG-B content channel 2, set to 1 to indicate that a user is allocated to the center 26-tone RU of the higher frequency 80 MHz; otherwise, set to 0. |
| CRC | 4 | See 28.3.10.7.3 (CRC computation) |
| Tail | 6 | Used to terminate the trellis of the convolutional decoder. Set to 0 |

The RU allocation subfield included in the common field of the HE-SIG-B may be configured with 8 bits and may indicate as follows with respect to 20 MHz PPDU bandwidth. RUs to be used as a data portion in the frequency domain are allocated using an index for RU size and disposition in the frequency domain. The mapping between an 8-bit RU allocation subfield for RU allocation and the number of users per RU may be defined as follows.

TABLE 9

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | 26 | 26 | | 1 |
| 00000011 | 26 | 26 | 26 | 26 | 26 | 52 | 52 | | | 1 |
| 00000100 | 26 | 26 | 52 | 26 | 26 | 26 | 26 | | | 1 |
| 00000101 | 26 | 26 | 52 | 26 | 26 | 52 | 26 | | | 1 |
| 00000110 | 26 | 26 | 52 | 26 | 52 | 26 | 26 | | | 1 |
| 00000111 | 26 | 26 | 52 | 26 | 52 | 52 | | | | 1 |
| 00001000 | 52 | 26 | 26 | 26 | 26 | 26 | 26 | | | 1 |
| 00001001 | 52 | 26 | 26 | 26 | 26 | 26 | 52 | | | 1 |
| 00001010 | 52 | 26 | 26 | 26 | 52 | 26 | 26 | | | 1 |
| 00001011 | 52 | 26 | 26 | 26 | 52 | 52 | | | | 1 |
| 00001100 | 52 | 52 | 26 | 26 | 26 | 26 | | | | 1 |
| 00001101 | 52 | 52 | 26 | 26 | 26 | 52 | | | | 1 |
| 00001110 | 52 | 52 | 26 | 52 | 26 | 26 | | | | 1 |
| 00001111 | 52 | 52 | 26 | 52 | 52 | | | | | 1 |
| 00010$y_2y_1y_0$ | 52 | 52 | — | 106 | | | | | | 8 |
| 00011$y_2y_1y_0$ | | 106 | — | 52 | 52 | | | | | 8 |
| 00100$y_2y_1y_0$ | 26 | 26 | 26 | 26 | 26 | 106 | | | | 8 |
| 00101$y_2y_1y_0$ | 26 | 26 | 52 | 26 | 106 | | | | | 8 |
| 00110$y_2y_1y_0$ | 52 | 26 | 26 | 26 | 106 | | | | | 8 |
| 00111$y_2y_1y_0$ | 52 | 52 | 26 | 106 | | | | | | 8 |
| 01000$y_2y_1y_0$ | 106 | 26 | 26 | 26 | 26 | 26 | | | | 8 |
| 01001$y_2y_1y_0$ | 106 | 26 | 26 | 26 | 52 | | | | | 8 |
| 01010$y_2y_1y_0$ | 106 | 26 | 52 | 26 | 26 | | | | | 8 |
| 01011$y_2y_1y_0$ | 106 | 26 | 52 | 52 | | | | | | 8 |
| 0110$y_1y_0z_1z_0$ | 106 | — | 106 | | | | | | | 16 |
| 01110000 | 52 | 52 | — | 52 | 52 | | | | | 1 |
| 01110001 | 242-tone RU empty | | | | | | | | | 1 |
| 01110010 | 484-tone RU with zero User fields indicated in this RU Allocation subfield of the HE-SIG-B content channel | | | | | | | | | 1 |
| 01110011 | 996-tone RU with zero User fields indicated in this RU Allocation subfield of the HE-SIG-B content channel | | | | | | | | | 1 |
| 011101$x_1x_0$ | Reserved | | | | | | | | | 4 |
| 01111$y_2y_1y_0$ | Reserved | | | | | | | | | 8 |
| 10$y_2y_1y_0z_2z_1z_0$ | 106 | 26 | 106 | | | | | | | 64 |
| 11000$y_2y_1y_0$ | 242 | | | | | | | | | 8 |
| 11001$y_2y_1y_0$ | 484 | | | | | | | | | 8 |
| 11010$y_2y_1y_0$ | 996 | | | | | | | | | 8 |

TABLE 9-continued

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 11011$y_2 y_1 y_0$ | | | | | Reserved | | | | | 8 |
| 111$x_4 x_3 x_2 x_1 x_0$ | | | | | Reserved | | | | | 32 |

If (#Ed) signaling RUs of size greater than 242 subcarriers, $y_2 y_1 y_0$ = 000-111 indicates number of User fields in the HE-SIG-B content channel that contains the corresponding 8-bit RU Allocation subfield. Otherwise, $y_2 y_1 y_0$ = 000-111 indicates number of STAs multiplexed in the 106-tone RU, 242-tone RU or the lower frequency 106-tone RU if there are two 106-tone RUs and one 26-tone RU is assigned between two 106-tone RUs. The binary vector $y_2 y_1 y_0$ indicates $2^2 \times y_2 + 2^1 \times y_1 + y_0 + 1$ STAs multiplexed the RU.
$z_2 z_1 z_0$ = 000-111 indicates number of STAs multiplexed in the higher frequency 106-tone RU if there are two 106-tone RUs and one 26-tone RU is assigned between two 106-tone RUs. The binary vector $z_2 z_1 z_0$ indicates $2^2 \times z_2 + 2^1 \times z_1 + z_0 + 1$ STAs multiplexed in the RU.
Similarly, $y_1 y_0$ = 00-11 indicates number of STAs multiplexed in the lower frequency 106-tone RU. The binary vector $y_1 y_0$ indicates $2^1 \times y_1 + y_0 + 1$ STAs multiplexed in the RU.
Similarly, $z_1 z_0$ = 00-11 indicates the number of STAs multiplexed in the higher frequency 106-tone RU. The binary vector $z_1 z_0$ indicates $2^1 \times z_1 + z_0 + 1$ STAs multiplexed in the RU.
1 to #9 (from left to the right) is ordered in increasing order of the absolute frequency.
$x_1 x_0$ = 00-11, $x_4 x_3 x_2 x_1 x_0$ = 00000-11111.
'—' means no STA in that RU.

The user-specific field included in the second control field (HE-SIG-B, 740) may include a user field, a CRC field, and a Tail field. The format of the user-specific field may be defined as follows.

TABLE 10

| Subfield | Number of bits | Description |
|---|---|---|
| User field | N × 21 | The User field format for a non-MU-MIMO allocation is defined in Table 28-26 (User field format for a non-MU-MIMO allocation). The User field format for a MU-MIMO allocation is defined in Table 28-27 (User field for an MU-MIMO allocation). N = 1 if it is the last User Block field, and if there is only one user in the last User Block field. N = 2 otherwise. |
| CRC | 4 | The CRC is calculated over bits 0 to 20 for a User Block field that contains one User field, and bits 0 to 41 for a User Block field that contains two User fields. See 28.3.10.7.3 (CRC computation). |
| Tail | 6 | Used to terminate the trellis of the convolutional decoder. Set to 0. |

Also, the user-specific field of the HE-SIG-B is composed of a plurality of user fields. The plurality of user fields are located after the common field of the HE-SIG-B. The location of the RU allocation subfield of the common field and that of the user field of the user-specific field are used together to identify an RU used for transmitting data of an STA. A plurality of RUs designated as a single STA are now allowed in the user-specific field. Therefore, signaling that allows an STA to decode its own data is transmitted only in one user field.

As an example, it may be assumed that the RU allocation subfield is configured with 8 bits of 01000010 to indicate that five 26-tone RUs are arranged next to one 106-tone RU and three user fields are included in the 106-tone RU. At this time, the 106-tone RU may support multiplexing of the three users. This example may indicate that eight user fields included in the user-specific field are mapped to six RUs, the first three user fields are allocated according to the MU-MIMO scheme in the first 106-tone RU, and the remaining five user fields are allocated to each of the five 26-tone RUs.

Figure 12:
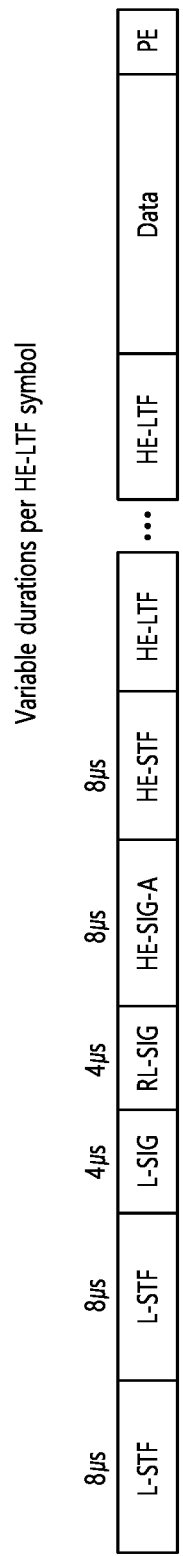
FIG. 12 illustrates one example of an HE TB PPDU.

FIG. 12 illustrates an example of an HE TB PPDU. The PPDU of FIG. 12 illustrates an uplink PPDU transmitted in response to the trigger frame of FIG. 9. At least one STA receiving a trigger frame from an AP may check the common information field and the individual user information field of the trigger frame and may transmit a HE TB PPDU simultaneously with another STA which has received the trigger frame.

As shown in the figure, the PPDU of FIG. 12 includes various fields, each of which corresponds to the field shown in FIGS. 2, 3, and 7. Meanwhile, as shown in the figure, the HE TB PPDU (or uplink PPDU) of FIG. 12 may not include the HE-SIG-B field but only the HE-SIG-A field.

In the existing 11ax, a tone plan for full band and OFDMA transmission at 20/40/80/80+80/160 MHz is designed, and a 160 MHz tone plan is used by simply repeating the existing 80 MHz tone plan twice. This is designed in consideration of a case where transmission is performed by taking two RFs into account, and may be a reasonable tone plan in case of non-contiguous 80+80 MHz. However, a situation where transmission is performed by using one RF may be considered in case of contiguous 160 MHz. In this case, since there are many subcarriers wasted in the existing tone plan, a new tone plan may be proposed to increase efficiency and throughput of a subcarrier in use.

1. New 160 MHz Tone Plan

<Full Band>

In case of transmission using a full band, a new resource unit (RU) may be proposed, and a size of the new RU may be determined by considering various DC tones according to an effect of a DC offset and by considering the existing 11ax 160 MHz guard tone. The existing 11ax guard tone consists of left 12 tones and right 11 tones, and the number of DC tones of 80 MHz is 5 or 7. When this is directly considered, the new RU of the full band is 2020RU or 2018RU.

12/11 guard tone, 5DC, 2020RU

12/11 guard tone, 7DC, 2018RU

In 160 MHz, considering the effect of the DC offset, it is not preferable that the number of DC tones in use is less than 5/7 which is less than the number of DC tones used in the existing 80 MHz. In addition, 5/7DC may be sufficient in terms of performance Considering the following OFDMA tone plan, up to 7DC may be suitable. In the following OFDMA tone plan, DC is designed by considering 7DC and 5DC in the existing 80 MHz OFDMA tone plan, and it is not preferable that the number of DC tones is less than that. 5 or 7DC may be sufficient in terms of performance 7DC is used in 20 MHz and 80 MH which is a case where a center 26RU (13+13RU) is used in the existing 11ax.

<OFDMA Tone Plan>

The OFDMA tone plan can be expressed using the existing 996RU and 26RU (13+13RU) as follows. Hereinafter, G denotes a guard tone and N denotes a null tone.

12G+996RU+13RU+7DC+13RU+996RU+11G

12G+996RU+1N+13RU+5DC+13RU+1N+996RU+11G

The number of DC tones and the number of null subcarriers at both sides may be determined by a DC offset of the center 26RU (13+13 RU) and performance based on an effect of interference. Considering the effect of interference, it may be preferably configured of 5DC and 1 null carrier at both sides.

The following two configurations are proposed as a 996RU configuration.

996RU=484RU+1N+26RU+1N+484RU

996RU=1N+484RU+26RU+484RU+1N

In a first configuration, a null tone is present at both sides of the 26RU so that an effect of interference from/to an adjacent RU can be decreased. In a second configuration, the effect of interference between 484RU and its adjacent RU can be decreased. An RU which uses a small number of subcarriers, such as 26RU, may preferably use the first configuration since interference has significant effect on performance.

The 484RU has two 242RU configurations as in the existing 11ax.

484RU=242RU+242RU

The 242RU has the following configuration as in the existing 11ax.

242RU=1N+106RU+1N+26RU+1N+106RU+1N

The 106RU has the following configuration as in the existing 11ax.

106RU=52RU+2N+52RU

The 52RU has the following configuration as in the existing 11ax.

52RU=26RU+26RU

Each RU and an index of a null tone are listed below in a case where 2020/2018RU is used in full band transmission, a tone plan of '12G+996RU+13RU+7DC+13RU+996RU+11G' is used, and the first configuration of 996RU is used.

<26 RU for New 160 MHz Tone Plan>

TABLE 11

| RU1 | RU2 | RU3 | RU4 | RU5 | RU6 | RU7 | RU8 | RU9 |
| --- | --- | --- | --- | --- | --- | --- | --- | --- |
| −1011:−986 | −985:−960 | −957:−932 | −931:−906 | −904:−879 | −877:−852 | −851:−826 | −823:−798 | −797:−772 |
| RU10 | RU11 | RU12 | RU13 | RU14 | RU15 | RU16 | RU17 | RU18 | RU19 |
| −769:−744 | −743:−718 | −715:−690 | −689:−664 | −662:−637 | −635:−610 | −609:−584 | −581:−556 | −555:−530 | −527:−502 |
| RU20 | RU21 | RU22 | RU23 | RU24 | RU25 | RU26 | RU27 | RU28 |
| −499:−474 | −473:−448 | −445:−420 | −419:−394 | −392:−367 | −365:−340 | −339:−314 | −311:−286 | −285:−260 |
| RU29 | RU30 | RU31 | RU32 | RU33 | RU34 | RU35 | RU36 | RU37 | RU38 |
| −257:−232 | −231:−206 | −203:−178 | −177:−152 | −150:125 | −123:−98 | −97:−72 | −69:−44 | −43:−18 | −16:−4, 4:16 |
| RU39 | RU40 | RU41 | RU42 | RU43 | RU44 | RU45 | RU46 | RU47 |
| 18:43 | 44:69 | 72:97 | 98:123 | 125:150 | 152:177 | 178:203 | 206:231 | 232:257 |
| RU48 | RU49 | RU50 | RU51 | RU52 | RU53 | RU54 | RU55 | RU56 | RU57 |
| 260:285 | 286:311 | 314:339 | 340:365 | 367:392 | 394:419 | 420:445 | 448:473 | 474:499 | 502:527 |
| RU58 | RU59 | RU60 | RU61 | RU62 | RU63 | RU64 | RU65 | RU66 |
| 530:555 | 556:581 | 584:609 | 610:635 | 637:662 | 664:689 | 690:715 | 718:743 | 744:769 |
| RU67 | RU68 | RU69 | RU70 | RU71 | RU72 | RU73 | RU74 | RU75 |
| 772:797 | 798:823 | 826:851 | 852:877 | 879:904 | 906:931 | 932:957 | 960:985 | 986:1011 |

Null subcarriers: ±{17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012}

<52 RU for New 160 MHz Tone Plan>

TABLE 12

| RU1 | RU2 | RU3 | RU4 |
| --- | --- | --- | --- |
| −1011:−960 | −957:−906 | −877:−826 | −823:−772 |
| RU5 | RU6 | RU7 | RU8 |
| −769:−718 | −715:−664 | −635:−584 | −581:−530 |
| RU9 | RU10 | RU11 | RU12 |
| −499:−448 | −445:−394 | −365:−314 | −311:−260 |
| RU13 | RU14 | RU15 | RU16 |
| −257:−206 | −203:−152 | −123:−72 | −69:−18 |
| RU17 | RU18 | RU19 | RU20 |
| 18:69 | 72:123 | 152:203 | 206:257 |
| RU21 | RU22 | RU23 | RU24 |
| 260:311 | 314:365 | 394:445 | 448:499 |
| RU25 | RU26 | RU27 | RU28 |
| 530:581 | 584:635 | 664:715 | 718:769 |
| RU29 | RU30 | RU31 | RU32 |
| 772:823 | 826:877 | 906:957 | 960:1011 |

Null subcarriers: ±{17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012}

<106 RU for New 160 MHz Tone Plan>

TABLE 13

| RU1 | RU2 | RU3 | RU4 |
| --- | --- | --- | --- |
| −1011:−906 | −877:−772 | −769:−664 | −635:−530 |
| RU5 | RU6 | RU7 | RU8 |
| −499:−394 | −365:−260 | −257:−152 | −123:−18 |
| RU9 | RU10 | RU11 | RU12 |
| 18:123 | 152:257 | 260:365 | 394:499 |
| RU13 | RU14 | RU15 | RU16 |
| 530:635 | 664:769 | 772:877 | 906:1011 |

Null subcarriers: ±{17, 124, 151, 258, 259, 366, 393, 500, 501, 528, 529, 636, 663, 770, 771, 878, 905, 1012}

<242 RU for New 160 MHz Tone Plan>

TABLE 14

| RU1 | RU2 | RU3 | RU4 |
| --- | --- | --- | --- |
| −1012:−771 | −770:−529 | −500:−259 | −258:−17 |
| RU5 | RU6 | RU7 | RU8 |
| 17:258 | 259:500 | 529:770 | 771:1012 |

Null subcarriers: ±{501, 528}

<484 RU for New 160 MHz Tone Plan>

TABLE 15

| RU1 | RU2 | RU3 | RU4 |
|---|---|---|---|
| −1012:−529 | −500:−17 | 17:500 | 529:1012 |

Null subcarriers: ±{501, 528}
<996 RU for New 160 MHz Tone Plan>

TABLE 16

| RU1 | RU2 |
|---|---|
| −1012:−17 | 17:1012 |

Null subcarriers: X
<2020 or 2018 RU for New 160 MHz Tone Plan>
2020RU: −1012: −3, 3:1012
2018RU: −1012: −4, 4:1012
Null subcarriers: X
Each RU and an index of a null tone are listed below in a case where 2020/2018RU is used in full band transmission, a tone plan of '12G+996RU+13RU+7DC+13RU+996RU+11G' is used, and the second configuration of 996RU is used.
<26 RU for New 160 MHz Tone Plan>

TABLE 17

| RU1 | RU2 | RU3 | RU4 | RU5 | RU6 | RU7 | RU8 | RU9 |
|---|---|---|---|---|---|---|---|---|
| −1010:−985 | −984:−959 | −956:−931 | −930:−905 | −903:−878 | −876:−851 | −850:−825 | −822:−797 | −796:−771 |
| RU10 | RU11 | RU12 | RU13 | RU14 | RU15 | RU16 | RU17 | RU18 | RU19 |
| −768:−743 | −742:−717 | −714:−689 | −688:−663 | −661:−636 | −634:−609 | −608:−583 | −580:−555 | −554:−529 | −527:−502 |
| RU20 | RU21 | RU22 | RU23 | RU24 | RU25 | RU26 | RU27 | RU28 |
| −500:−475 | −474:−449 | −446:−421 | −420:−395 | −393:−368 | −366:−341 | −340:−315 | −311:−287 | −286:−261 |
| RU29 | RU30 | RU31 | RU32 | RU33 | RU34 | RU35 | RU36 | RU37 | RU38 |
| −258:−233 | −232:−207 | −204:−179 | −178:−153 | −151:−126 | −124:−99 | −98:−73 | −70:−45 | −44:−19 | −16:−4, 4:16 |
| RU39 | RU40 | RU41 | RU42 | RU43 | RU44 | RU45 | RU46 | RU47 |
| 19:44 | 45:70 | 73:98 | 99:124 | 126:151 | 153:178 | 179:204 | 207:232 | 233:258 |
| RU48 | RU49 | RU50 | RU51 | RU52 | RU53 | RU54 | RU55 | RU56 | RU57 |
| 261:386 | 287:312 | 315:340 | 341:366 | 368:393 | 395:420 | 421:446 | 449:474 | 475:500 | 502:527 |
| RU58 | RU59 | RU60 | RU61 | RU62 | RU63 | RU64 | RU65 | RU66 |
| 529:554 | 555:580 | 583:608 | 609:634 | 636:661 | 663:688 | 689:714 | 717:742 | 743:768 |
| RU67 | RU68 | RU69 | RU70 | RU71 | RU72 | RU73 | RU74 | RU75 |
| 771:796 | 797:822 | 825:850 | 851:876 | 878:903 | 905:930 | 931:956 | 959:984 | 985:1010 |

Null subcarriers: ±{17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012}
<52 RU for New 160 MHz Tone Plan>

TABLE 18

| RU1 | RU2 | RU3 | RU4 |
|---|---|---|---|
| −1010:−959 | −956:−905 | −876:−825 | −822:−771 |
| RU5 | RU6 | RU7 | RU8 |
| −768:−717 | −714:−663 | −634:−583 | −580:−529 |
| RU9 | RU10 | RU11 | RU12 |
| −500:−449 | −446:−395 | −366:−315 | −312:−261 |
| RU13 | RU14 | RU15 | RU16 |
| −258:−207 | −204:−153 | −124:−73 | −70:−19 |
| RU17 | RU18 | RU19 | RU20 |
| 19:70 | 73:124 | 153:204 | 207:258 |
| RU21 | RU22 | RU23 | RU24 |
| 261:312 | 315:366 | 395:446 | 449:500 |
| RU25 | RU26 | RU27 | RU28 |
| 529:580 | 583:634 | 663:714 | 717:768 |
| RU29 | RU30 | RU31 | RU32 |
| 771:822 | 825:876 | 905:956 | 959:1010 |

Null subcarriers: ±{17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012}
<106 RU for New 160 MHz Tone Plan>

TABLE 19

| RU1 | RU2 | RU3 | RU4 |
|---|---|---|---|
| −1010:−905 | −876:−771 | −768:−663 | −634:−529 |
| RU5 | RU6 | RU7 | RU8 |
| −500:−395 | −366:−261 | −258:−153 | −124:−19 |
| RU9 | RU10 | RU11 | RU12 |
| 19:124 | 153:258 | 261:366 | 395:500 |
| RU13 | RU14 | RU15 | RU16 |
| 529:634 | 663:768 | 771:876 | 905:1010 |

Null subcarriers: ±{17, 18, 125, 152, 259, 260, 367, 394, 501, 528, 635, 662, 769, 770, 877, 904, 1011, 1012}
<242 RU for New 160 MHz Tone Plan>

Table 20

| RU1 | RU2 | RU3 | RU4 |
|---|---|---|---|
| −1011:−770 | −769:−528 | −501:−260 | −259:−18 |

Table 20-continued

| RU5 | RU6 | RU7 | RU8 |
|---|---|---|---|
| 18:259 | 260:501 | 528:769 | 770:1011 |

Null subcarriers: ±{17, 1012}
<484 RU for New 160 MHz Tone Plan>

TABLE 21

| RU1 | RU2 | RU3 | RU4 |
|---|---|---|---|
| −1011:−528 | −501:−18 | 18:501 | 528:1011 |

Null subcarriers: ±{17, 1012}
<996 RU for New 160 MHz Tone Plan>

TABLE 22

| RU1 | RU2 |
|---|---|
| −1012:−17 | 17:1012 |

Null subcarriers: X

<2020 or 2018 RU for New 160 MHz Tone Plan>

2020RU: −1012: −3, 3:1012

2018RU: −1012: −4, 4:1012

Null subcarriers: X

Each RU and an index of a null tone are listed below in a case where 2020/2018RU is used in full band transmission, a tone plan of '12G+996RU+1N+13RU+5DC+13RU+1N+996RU+11G' is used, and the first configuration of 996RU is used.

<26 RU for New 160 MHz Tone Plan>

TABLE 23

| RU1 | RU2 | RU3 | RU4 | RU5 | RU6 | RU7 | RU8 | RU9 |
|---|---|---|---|---|---|---|---|---|
| −1011:−986 | −985:−960 | −957:−932 | −931:−906 | −904:−879 | −877:−852 | −851:−826 | −823:−798 | −797:−772 |
| RU10 | RU11 | RU12 | RU13 | RU14 | RU15 | RU16 | RU17 | RU18 | RU19 |
| −769:−744 | −743:−718 | −715:−690 | −689:−664 | −662:−637 | −635:−610 | −609:−584 | −581:−556 | −555:−530 | −527:−502 |
| RU20 | RU21 | RU22 | RU23 | RU24 | RU25 | RU26 | RU27 | RU28 |
| −499:−474 | −473:4−48 | −445:−420 | −419:−394 | −392:−367 | −365:−340 | −339:−314 | −311:−286 | −285:−260 |
| RU29 | RU30 | RU31 | RU32 | RU33 | RU34 | RU35 | RU36 | RU37 | RU38 |
| −257:−232 | −231:−206 | −203:−178 | −177:−152 | −150:−125 | −123:−98 | −97:−72 | −69:−44 | −43:−18 | −15:−3, 3:15 |
| RU39 | RU40 | RU41 | RU42 | RU43 | RU44 | RU45 | RU46 | RU47 |
| 18:43 | 44:69 | 72:97 | 98:123 | 125:150 | 152:177 | 178:203 | 206:231 | 232:257 |
| RU48 | RU49 | RU50 | RU51 | RU52 | RU53 | RU54 | RU55 | RU56 | RU57 |
| 260:285 | 286:311 | 314:339 | 340:365 | 367:392 | 394:419 | 420:445 | 448:473 | 474:499 | 502:527 |
| RU58 | RU59 | RU60 | RU61 | RU62 | RU63 | RU64 | RU65 | RU66 |
| 530:555 | 556:581 | 584:609 | 610:635 | 637:662 | 664:689 | 690:715 | 718:743 | 744:769 |
| RU67 | RU68 | RU69 | RU70 | RU71 | RU72 | RU73 | RU74 | RU75 |
| 772:797 | 798:823 | 826:851 | 852:877 | 879:904 | 906:931 | 932:957 | 960:985 | 986:1011 |

Null subcarriers: ±{16, 17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012}

<52 RU for New 160 MHz Tone Plan>

TABLE 24

| RU1 | RU2 | RU3 | RU4 |
|---|---|---|---|
| −1011:−960 | −957:−906 | −877:−826 | −823:−772 |
| RU5 | RU6 | RU7 | RU8 |
| −769:−718 | −715:−664 | −635:−584 | −581:−530 |
| RU9 | RU10 | RU11 | RU12 |
| −499:−448 | −445:−394 | −365:−314 | −311:−260 |
| RU13 | RU14 | RU15 | RU16 |
| −257:−206 | −203:−152 | −123:−72 | −69:−18 |
| RU17 | RU18 | RU19 | RU20 |
| 18:69 | 72:123 | 152:203 | 206:257 |
| RU21 | RU22 | RU23 | RU24 |
| 260:311 | 314:365 | 394:445 | 448:499 |
| RU25 | RU26 | RU27 | RU28 |
| 530:581 | 584:635 | 664:715 | 718:769 |
| RU29 | RU30 | RU31 | RU32 |
| 772:823 | 826:877 | 906:957 | 960:1011 |

Null subcarriers: ±{16, 17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012}

<106 RU for New 160 MHz Tone Plan>

TABLE 25

| RU1 | RU2 | RU3 | RU4 |
|---|---|---|---|
| −1011:−906 | −877:−772 | −769:−664 | −635:−530 |
| RU5 | RU6 | RU7 | RU8 |
| −499:−394 | −365:−260 | −257:−152 | −123:−18 |
| RU9 | RU10 | RU11 | RU12 |
| 18:123 | 152:257 | 260:365 | 394:499 |
| RU13 | RU14 | RU15 | RU16 |
| 530:635 | 664:769 | 772:877 | 906:1011 |

Null subcarriers: ±{16, 17, 124, 151, 258, 259, 366, 393, 500, 501, 528, 529, 636, 663, 770, 771, 878, 905, 1012}

<242 RU for New 160 MHz Tone Plan>

TABLE 26

| RU1 | RU2 | RU3 | RU4 |
|---|---|---|---|
| −1012:−771 | −770:−529 | −500:−259 | −258:−17 |
| RU5 | RU6 | RU7 | RU8 |
| 17:258 | 259:500 | 529:770 | 771:1012 |

Null subcarriers: ±{16, 501, 528}

<484 RU for New 160 MHz Tone Plan>

TABLE 27

| RU1 | RU2 | RU3 | RU4 |
|---|---|---|---|
| −1012:−529 | −500:−17 | 17:500 | 529:1012 |

Null subcarriers: ±{16, 501, 528}

<996 RU for New 160 MHz Tone Plan>

TABLE 28

| RU1 | RU2 |
|---|---|
| −1012:−17 | 17:1012 |

Null subcarriers: ±{16}

<2020 or 2018 RU for New 160 MHz Tone Plan>

2020RU: −1012:−3, 3:1012

2018RU: −1012:−4, 4:1012

Null subcarriers: X

Each RU and an index of a null tone are listed below in a case where 2020/2018RU is used in full band transmission, a tone plan of '12G+996RU+1N+13RU+5DC+13RU+1N+996RU+11G' is used, and the second configuration of 996RU is used.

<26 RU for New 160 MHz Tone Plan>

TABLE 29

| RU1 | RU2 | RU3 | RU4 | RU5 | RU6 | RU7 | RU8 | RU9 | |
|---|---|---|---|---|---|---|---|---|---|
| −1010:−985 | −984:−959 | −956:−931 | −930:−905 | −903:−878 | −876:−851 | −850:−825 | −822:−797 | −796:−771 | |
| RU10 | RU11 | RU12 | RU13 | RU14 | RU15 | RU16 | RU17 | RU18 | RU19 |
| −768:−743 | −742:−717 | −714:−689 | −688:−663 | −661:−636 | −634:−609 | −608:−583 | −580:−555 | −554:−529 | −527:−502 |
| RU20 | RU21 | RU22 | RU23 | RU24 | RU25 | RU26 | RU27 | RU28 | |
| −500:−475 | −474:−449 | −446:−421 | −420:−395 | −393:−368 | −366:−341 | −340:−315 | −311:−287 | −286:−261 | |
| RU29 | RU30 | RU31 | RU32 | RU33 | RU34 | RU35 | RU36 | RU37 | RU38 |
| −258:−233 | −232:−207 | −204:−179 | −178:−153 | −151:126 | −124:−99 | −98:−73 | −70:−45 | −44:−19 | −15:−3, 3:15 |
| RU39 | RU40 | RU41 | RU42 | RU43 | RU44 | RU45 | RU46 | RU47 | |
| 19:44 | 45:70 | 73:98 | 99:124 | 126:151 | 153:178 | 179:204 | 207:232 | 233:258 | |
| RU48 | RU49 | RU50 | RU51 | RU52 | RU53 | RU54 | RU55 | RU56 | RU57 |
| 261:286 | 287:312 | 315:340 | 341:366 | 368:393 | 395:420 | 421:446 | 449:474 | 475:500 | 502:527 |
| RU58 | RU59 | RU60 | RU61 | RU62 | RU63 | RU64 | RU65 | RU66 | |
| 529:554 | 555:580 | 583:608 | 609:634 | 636:661 | 663:688 | 689:714 | 717:742 | 743:768 | |
| RU67 | RU68 | RU69 | RU70 | RU71 | RU72 | RU73 | RU74 | RU75 | |
| 771:796 | 797:822 | 825:850 | 851:876 | 878:903 | 905:930 | 931:956 | 959:984 | 985:1010 | |

Null subcarriers: ±{16, 17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012}

<52 RU for New 160 MHz Tone Plan>

TABLE 30

| RU1 | RU2 | RU3 | RU4 |
|---|---|---|---|
| −1010:−959 | −956:−905 | −876:−825 | −822:−771 |
| RU5 | RU6 | RU7 | RU8 |
| −768:−717 | −714:−663 | −634:−583 | −580:−529 |
| RU9 | RU10 | RU11 | RU12 |
| −500:−449 | −446:−395 | −366:−315 | −312:−261 |
| RU13 | RU14 | RU15 | RU16 |
| −258:−207 | −204:−153 | −124:−73 | −70:−19 |
| RU17 | RU18 | RU19 | RU20 |
| 19:70 | 73:124 | 153:204 | 207:258 |
| RU21 | RU22 | RU23 | RU24 |
| 261:312 | 315:366 | 395:446 | 449:500 |
| RU25 | RU26 | RU27 | RU28 |
| 529:580 | 583:634 | 663:714 | 717:768 |
| RU29 | RU30 | RU31 | RU32 |
| 771:822 | 825:876 | 905:956 | 959:1010 |

Null subcarriers: ±{16, 17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012}

<106 RU for New 160 MHz Tone Plan>

TABLE 31

| RU1 | RU2 | RU3 | RU4 |
|---|---|---|---|
| −1010:−905 | −876:−771 | −768:−663 | −634:−529 |
| RU5 | RU6 | RU7 | RU8 |
| −500:−395 | −366:−261 | −258:−153 | −124:−19 |
| RU9 | RU10 | RU11 | RU12 |
| 19:124 | 153:258 | 261:366 | 395:500 |
| RU13 | RU14 | RU15 | RU16 |
| 529:634 | 663:768 | 771:876 | 905:1010 |

Null subcarriers: ±{16, 17, 18, 125, 152, 259, 260, 367, 394, 501, 528, 635, 662, 769, 770, 877, 904, 1011, 1012}

<242 RU for New 160 MHz Tone Plan>

TABLE 32

| RU1 | RU2 | RU3 | RU4 |
|---|---|---|---|
| −1011:−770 | −769:−528 | −501:−260 | −259:−18 |
| RU5 | RU6 | RU7 | RU8 |
| 18:259 | 260:501 | 528:769 | 770:1011 |

Null subcarriers: ±{16, 17, 1012}

<484 RU for New 160 MHz Tone Plan>

TABLE 33

| RU1 | RU2 | RU3 | RU4 |
|---|---|---|---|
| −1011:−528 | −501:−18 | 18:501 | 528:1011 |

Null subcarriers: ±{16, 17, 1012}

<996 RU for New 160 MHz Tone Plan>

TABLE 34

| RU1 | RU2 |
|---|---|
| −1012:−17 | 17:1012 |

Null subcarriers: ±{16}

<2020 or 2018 RU for New 160 MHz Tone Plan>

2020RU: −1012:−3, 3:1012

2018RU: −1012:−4, 4:1012

Null subcarriers: X

In addition, non-contiguous 80+80 MHz may directly use the existing 11ax tone plan. In this case, each 80 MHz bandwidth may be located within the same band, or may be located at a different band. For example, transmission may be performed by using one 80 MHz bandwidth at a 2.4 GHz band and by using another 80 MHz bandwidth at a 5 GHz band.

2. 320 MHz Tone Plan

A configuration of 320 MHz may consider various options as follows.

Option 1: Combination of Four Existing 11ax 80 MHz Tone Plans

This may be expressed as follows by considering both contiguous and non-contiguous situations.

80+80+80+80 MHz/160+80+80 MHz/80+160+80 MHz/80+80+160 MHz/240+80 MHz/80+240 MHz/320 MHz

+ means non-contiguous, and 160/240/320 manes that 2/3/480 MHz tone plans are contiguously arranged in succession.

<In the Presence of Contiguous Band>

When 160 MHz is used, a tone index of a left 80 MHz tone plan is tone index-512 of the existing 80 MHz tone plan, and a tone index of a right 80 MHz tone plan is tone index+512 of the existing 80 MHZ tone plan.

When 240 MHz is used, a tone index of a center 80 MHz tone plan is directly a tone index of the existing 80 MHz tone plan, a tone index of the leftmost 80 MHz tone plan is a tone index-1024 of the existing 80 NHz tone plan, and a tone index of the rightmost 80 MHz tone index is tone index+1024 of the existing 80 MHz tone plan.

When 320 MHz is used, a tone index of a first left 80 MHz tone plan is tone index-1536 of the existing 80 MHz tone plan, a tone index of a second left 80 MHz tone plan is tone index-512 of the existing 80 MHz tone plan, a tone index of a third left 80 MHz tone plan is tone index+512 of the existing 80 MHz tone plan, and a tone index of a fourth left 80 MHz tone plan is tone index+1536 of the existing 80 MHz tone plan.

The aforementioned various non-contiguous combinations may use not only the same band but also different bands. For example, in 80+160+80 MHz, each 80/160/80 MHz bandwidth may use 2.4 GH/5 GHz/6 GHz band in transmission.

Option 2: Combination of Two New 160 MHz Tone Plans

This may be expressed as follows by considering both contiguous and non-contiguous situations.

160+160 MHz/320 MHz

+ means non-contiguous, and 320 MHz means that two new 160 MHz tone plans are contiguously arranged.

<In the Presence of Contiguous Band>

When 320 MHz is used, a tone index of a left 160 MHz tone plan is tone index-1024 of the new 160 MHz tone plan, and a tone index of a right 160 MHz tone plan is tone index+1024 of the existing 160 MHZ tone plan.

The aforementioned non-contiguous combinations may use not only the same band but also different bands. For example, in 160+160 MHz, each 160 MHz bandwidth may use 2.4 GH/5 GHz band in transmission.

Option 3: Combination of Two Existing 11Ax 80 MHz Tone Plans and One New 160 MHz This may be expressed as follows by considering both contiguous and non-contiguous situations.

$c80+c80+n160$ MHz/$c80+n160$ MHz+$c80/n160+c80+$
  $c80$ MHz/$cc160+n160$ MHz/$n160+cc160$ MHz/
  $ncc320$ MHz/$cnc320$ MHz/$ccn320$ MHz + means non-contiguous, and c80 MHz, cc160 MHz, and n160 MHz respectively mean the existing 11ax 80 MHz tone plan, the existing 11ax successive two 80 MHz tone plans, and a new 160 MHz tone plan. ncc320 MHz/cnc320 MHz/ccn320 MHz mean successive one new 160 MHz tone plan and existing two 11ax 80 MHz tone plan, and ncc/cnc/ccn denote successive orders of the respective tone plans.

<In the Presence of Contiguous Band>

When cc160 MHz is used, a tone index of a left 80 MHz tone plan is tone index-512 of the existing 80 MHz tone plan, and a tone index of a right 80 MHz is tone index+512 of the existing 80 MHz tone plan.

When ncc320 MHz is used, a tone index of a left 160 MHz tone plan is tone index-1024 of a 160 MHz tone plan, a tone index of a next 80 MHz tone plan is tone index+512 of the existing 80 MHz tone plan, and a tone index of a last 80 MHz tone plan is tone index+1536 of the existing 80 MHz tone plan.

When cnc320 MHz is used, a tone index of a left 80 MHz tone plan is tone index-1536 of the existing 80 MHZ tone plan, a tone index of a center 160 MHz tone plan is directly tone index of the new 160 MHz tone plan, a tone index of a last 80 MHz tone plan is tone index+1536 of the existing 80 MHz tone plan.

When ccn320 MHz is used, a tone index of a left 80 MHz tone plan is tone index-1536, a tone index of a next 80 MHz tone plan is tone index-512 of the existing 80 MHz tone plan, and a tone index of a last 160 MHz tone plan is tone index+1024 of the new 160 MHz tone plan.

Various combinations of tone plans having different configurations of c80 and n160 may be considered in the aforementioned options. In this case, there is a disadvantage in that an indication for RU allocation may become significantly complex. Therefore, in order to reduce the signaling overhead, it may be limited to use only a structure having a specific order. For example, only c80+c80+n160 MHz/ccn320 MHz may be used.

The aforementioned various non-contiguous combinations may use not only the same band but also different bands. For example, in c80+n160+c80 MHz, each c80/n160/c80 MHz bandwidth may use 2.4 GH/5 GHz/6 GHz band in transmission.

Option 4: Alternative 320 MHz Tone Plan Considering Use of One RF

In case of contiguous 320 MHz, a situation where transmission is performed by using one RF may be considered. In this case, 320 MHz constituted by combining 160 MHz or 80 MHz tone plans has many subcarriers which are wasted. Therefore, a new tone plan may be proposed to increase efficiency and throughput of subcarrier in use. Various alternative tone plans are proposed below.

A. Alternative 320 MHz Tone Plan 1

When two 160 MHz tone plans are successive to constitute 320 MHz, 12 left/11 right guard tones are used, and may be directly applied to the alternative 320 MHz tone plan. In addition, when a full band is used in transmission, a new RU may be proposed, and a size of the new RU may be determined by considering various DC tones according to an effect of a DC offset. The number of DC tones of the existing 11ax 80 MHz is 5 or 7, and when this is directly considered, the new RU of the full band is 4068RU or 4066RU.

12/11 guard tone, 5DC, 4068RU (RU subcarrier index: −2036:−3, 3:2036)

12/11 guard tone, 7DC, 4066RU (RU subcarrier index: −2036:−4, 4:2036)

In 320 MHz, considering the effect of the DC offset, it is not preferable that the number of DC tones in use is less than 5/7 which is less than the number of DC tones used in the existing 80 MHz. In addition, 5/7DC may be sufficient in terms of performance Considering the following OFDMA tone plan using 2020RU described below, up to 7DC may be suitable. The number of DC tones in the OFDMA tone plan is designed by considering 7DC used in the existing 11ax 80 MHz OFDMA tone plan, and it is not preferable that the number of DC tones is less than that, and 7DC may also be sufficient in 320 MHZ in terms of performance.

The OFDMA tone plan can be expressed using the existing 2020RU and 26RU (13+13RU) as follows.

$12G+2020RU+13RU+7DC+13RU+2020RU+11G$

The following two configurations are proposed as a 2020RU configuration.

$2020RU=996RU+1N+26RU+1N+996RU$ $2020RU=1N+996RU+26RU+996RU+1N$

In a first configuration, a null tone is present at both sides of the 26RU so that an effect of interference from/to an adjacent RU can be decreased. In a second configuration, the effect of interference between 996RU and its adjacent RU can be decreased. An RU which uses a small number of subcarriers, such as 26RU, may preferably use the first configuration since interference has significant effect on performance.

The following two configurations are proposed as a 996RU configuration as in the new 160 MHz.

996RU=484RU+1N+26RU+1N+484RU

996RU=1N+484RU+26RU+484RU+1N

The 484RU has two 242RU configurations as in the existing 11ax.

484RU=242RU+242RU

The 242RU has the following configuration as in the existing 11ax.

242RU=1N+106RU+1N+26RU+1N+106RU+1N

The 106RU has the following configuration as in the existing 11ax.

106RU=52RU+2N+52RU

The 52RU has the following configuration as in the existing 11ax.

52RU=26RU+26RU

Each RU and an index of a null tone are listed below in a case where 4066/4068RU is used in full band transmission, the first configuration of 2020RU is used, and the first configuration of 996RU is used.

<26 RU>

TABLE 35

| RU1 | RU2 | RU3 | RU4 | RU5 | RU6 | RU7 | RU8 | RU9 |
|---|---|---|---|---|---|---|---|---|
| −2035:−2010 | −2009:−1984 | −1981:−1956 | −1955:−1930 | −1928:−1903 | −1901:−1876 | −1875:−1850 | −1847:−1822 | −1821:−1796 |
| RU10 | RU11 | RU12 | RU13 | RU14 | RU15 | RU16 | RU17 | RU18 | RU19 |
| −1793:−1768 | −1767:−1742 | −1739:−1714 | −1713:−1688 | −1686:−1661 | −1659:−1634 | −1633:−1608 | −1605:−1580 | −1579:−1554 | −1551:−1526 |
| RU20 | RU21 | RU22 | RU23 | RU24 | RU25 | RU26 | RU27 | RU28 | |
| −1523:−1498 | −1497:−1472 | −1469:−1444 | −1443:−1418 | −1416:−1391 | −1389:−1364 | −1363:−1338 | −1335:−1310 | −1309:−1284 | |
| RU29 | RU30 | RU31 | RU32 | RU33 | RU34 | RU35 | RU36 | RU37 | RU38 |
| −1281:−1256 | −1255:−1230 | −1227:−1202 | −1201:−1176 | −1174:−1149 | −1147:−1122 | −1121:−1096 | −1093:−1068 | −1067:−1042 | −1039:−1014 |
| RU39 | RU40 | RU41 | RU42 | RU43 | RU44 | RU45 | RU46 | RU47 | |
| −1011:−986 | −985:−960 | −957:−932 | −931:−906 | −904:−879 | −877:−852 | −851:−826 | −823:−798 | −797:−772 | |
| RU48 | RU49 | RU50 | RU51 | RU52 | RU53 | RU54 | RU55 | RU56 | RU57 |
| −769:−744 | −743:−718 | −715:−690 | −689:−664 | −662:−637 | −635:−610 | −609:−584 | −581:−556 | −555:−530 | −527:−502 |
| RU58 | RU59 | RU60 | RU61 | RU62 | RU63 | RU64 | RU65 | RU66 | |
| −499:−474 | −473:−448 | −445:−420 | −419:−394 | −392:−367 | −365:−340 | −339:−314 | −311:−286 | −285:−260 | |
| RU67 | RU68 | RU69 | RU70 | RU71 | RU72 | RU73 | RU74 | RU75 | RU76 |
| −257:−232 | −231:−206 | −203:−178 | −177:−152 | −150:−125 | −123:−98 | −97:−72 | −69:−44 | −43:−18 | −16:−4, 4:16 |

→RU77~RU151→ A subcarrier index of RU 76+x is equal to a value obtained by multiplying a minus sign (−) to a sign of an RU 76-x subcarrier index (x is a positive integer less than or equal to 75).

→Ex) A subcarrier index of RU 77 is equal to a value obtained by multiplying a minus sign (−) to a sign of an RU 75 subcarrier index, that is, 18:43

Null subcarriers: ±{17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}

<52 RU>

TABLE 36

| RU1 | RU2 | RU3 | RU4 |
|---|---|---|---|
| −2035:−1984 | −1981:−1930 | −1901:−1850 | −1847:−1796 |
| RU5 | RU6 | RU7 | RU8 |
| −1793:−1742 | −1739:−1688 | −1659:−1608 | −1605:−1554 |

TABLE 36-continued

| RU9 | RU10 | RU11 | RU12 |
|---|---|---|---|
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1011:−960 | −957:−906 | −877:−826 | −823:−772 |
| RU21 | RU22 | RU23 | RU24 |
| −769:−718 | −715:−664 | −635:−584 | −581:−530 |
| RU25 | RU26 | RU27 | RU28 |
| −499:−448 | −445:−394 | −365:−314 | −311:−260 |
| RU29 | RU30 | RU31 | RU32 |
| −257:−206 | −203:−152 | −123:−72 | −69:−18 |

→RU33~RU64→ A subcarrier index of RU 32+x is equal to a value obtained by multiplying a minus sign (−) to a sign of an RU 33-x subcarrier index (x is a positive integer less than or equal to 32).

→Ex) A subcarrier index of RU 34 is equal to a value obtained by multiplying a minus sign (−) to a sign of an RU 31 subcarrier index, that is, 72:123

Null subcarriers: ±{17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}

<106 RU>

TABLE 37

| RU1 | RU2 | RU3 | RU4 |
|---|---|---|---|
| −2035:−1930 | −1901:−1796 | −1793:−1688 | −1659:−1554 |
| RU5 | RU6 | RU7 | RU8 |
| −1523:−1418 | −1389:−1284 | −1281:−1176 | −1147:−1042 |
| RU9 | RU10 | RU11 | RU12 |
| −1011:−906 | −877:−772 | −769:−664 | −635:−530 |
| RU13 | RU14 | RU15 | RU16 |
| −499:−394 | −365:−260 | −257:−152 | −123:−18 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 152:257

Null subcarriers: ±{17, 124, 151, 258, 259, 366, 393, 500, 501, 528, 529, 636, 663, 770, 771, 878, 905, 1012, 1013, 1040, 1041, 1148, 1175, 1282, 1283, 1390, 1417, 1524, 1525, 1552, 1553, 1660, 1687, 1794, 1795, 1902, 1929, 2036}

<242 RU>

TABLE 38

| RU1 | RU2 | RU3 | RU4 |
|---|---|---|---|
| −2036:−1795 | −1794:−1553 | −1524:−1283 | −1282:−1041 |
| RU5 | RU6 | RU7 | RU8 |
| −1012:−771 | −770:−529 | −500:−259 | −258:−17 |

→RU9~RU16→ A subcarrier index of RU 8+x is equal to a value obtained by multiplying a minus sign (−) to a sign of an RU 9−x subcarrier index (x is a positive integer less than or equal to 8).

→Ex) A subcarrier index of RU 10 is equal to a value obtained by multiplying a minus sign (−) to a sign of an RU 7 subcarrier index, that is, 259:500

Null subcarriers: ±{501, 528, 1013, 1040, 1525, 1552}

<484 RU>

TABLE 39

| RU1 | RU2 | RU3 | RU4 |
|---|---|---|---|
| −2036:−1553 | −1524:−1041 | −1012:−529 | −500:−17 |

→RU5~RU8→ A subcarrier index of RU 4+x is equal to a value obtained by multiplying a minus sign (−) to a sign of an RU 5−x subcarrier index (x is a positive integer less than or equal to 4).

→Ex) A subcarrier index of RU 6 is equal to a value obtained by multiplying a minus sign (−) to a sign of an RU 3 subcarrier index, that is, 529:1012

Null subcarriers: ±{501, 528, 1013, 1040, 1525, 1552}

<996 RU>

TABLE 40

| RU1 | RU2 | RU3 | RU4 |
|---|---|---|---|
| −2036:−1041 | −1012:−17 | 17:1012 | 1041:2036 |

Null subcarriers: ±{1013, 1040}

<2020 RU>

TABLE 41

| RU1 | RU2 |
|---|---|
| −2036:−17 | 17:2036 |

Null subcarriers: X

<4068 or 4066 RU for New 160 MHz Tone Plan>
4068RU: −2036:−3, 3:2036
4066RU: −2036:−4, 4:2036
Null subcarriers: X Each RU and an index of a null tone are listed below in a case where 4066/4068RU is used in full band transmission, the first configuration of 2020RU is used, and the second configuration of 996RU is used.

<26 RU>

TABLE 42

| RU1 | RU2 | RU3 | RU4 | RU5 | RU6 | RU7 | RU8 | RU9 |
|---|---|---|---|---|---|---|---|---|
| −2034:−2009 | −2008:−1983 | −1980:−1955 | −1954:−1929 | −1927:−1902 | −1900:−1875 | −1874:−1849 | −1846:−1821 | −1820:−1795 |
| RU10 | RU11 | RU12 | RU13 | RU14 | RU15 | RU16 | RU17 | RU18 | RU19 |
| −1792:−1767 | −1766:−1741 | −1738:−1713 | −1712:−1687 | −1685:−1660 | −1658:−1633 | −1632:−1607 | −1604:−1579 | −1578:−1553 | −1551:−1526 |
| RU20 | RU21 | RU22 | RU23 | RU24 | RU25 | RU26 | RU27 | RU28 | |
| −1524:−1499 | −1498:−1473 | −1470:−1445 | −1444:−1419 | −1417:−1392 | −1390:−1365 | −1364:−1339 | −1336:−1311 | −1310:−1285 | |
| RU29 | RU30 | RU31 | RU32 | RU33 | RU34 | RU35 | RU36 | RU37 | RU38 |
| −1282:−1257 | −1256:−1231 | −1228:−1203 | −1202:−1177 | −1175:−1150 | −1148:−1123 | −1122:−1097 | −1094:−1069 | −1068:−1043 | −1039:−1014 |
| RU39 | RU40 | RU41 | RU42 | RU43 | RU44 | RU45 | RU46 | RU47 | |
| −1010:−985 | −984:−959 | −956:−931 | −930:−905 | −903:−878 | −876:−851 | −850:−825 | −822:−797 | −796:−771 | |
| RU48 | RU49 | RU50 | RU51 | RU52 | RU53 | RU54 | RU55 | RU56 | RU57 |
| −768:−743 | −742:−717 | −714:−689 | −688:−663 | −661:−636 | −634:−609 | −608:−583 | −580:−555 | −554:−529 | −527:−502 |
| RU58 | RU59 | RU60 | RU61 | RU62 | RU63 | RU64 | RU65 | RU66 | |
| −500:−475 | −474:−449 | −446:−421 | −420:−395 | −393:−368 | −366:−341 | −340:−315 | −312:−287 | −286:−261 | |
| RU67 | RU68 | RU69 | RU70 | RU71 | RU72 | RU73 | RU74 | RU75 | RU76 |
| −258:−233 | −232:−207 | −204:−179 | −178:−153 | −151:−126 | −124:−99 | −98:−73 | −70:−45 | −44:−19 | −16:−4, 4:16 |

→RU77~RU151→ A subcarrier index of RU 76+x is equal to a value obtained by multiplying a minus sign (−) to a sign of an RU 76−x subcarrier index (x is a positive integer less than or equal to 75).

→Ex) A subcarrier index of RU 77 is equal to a value obtained by multiplying a minus sign (−) to a sign of an RU 75 subcarrier index, that is, 19:44

Null subcarriers: ±{17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012, 1013, 1040, 1041, 1042, 1095, 1096, 1149, 1176, 1229, 1230, 1283, 1284, 1337, 1338, 1391, 1418, 1471, 1472, 1525, 1552, 1605, 1606, 1659, 1686, 1739, 1740, 1793, 1794, 1847, 1848, 1901, 1928, 1981, 1982, 2035, 2036}

<52 RU>

TABLE 43

| RU1 | RU2 | RU3 | RU4 |
|---|---|---|---|
| −2034:−1983 | −1980:−1929 | −1900:−1849 | −1846:−1795 |
| RU5 | RU6 | RU7 | RU8 |
| −1792:−1741 | −1738:−1687 | −1658:−1607 | −1604:−1553 |
| RU9 | RU10 | RU11 | RU12 |
| −1524:−1473 | −1470:−1419 | −1390:−1339 | −1336:−1285 |
| RU13 | RU14 | RU15 | RU16 |
| −1282:−1231 | −1228:−1177 | −1148:−1097 | −1094:−1043 |
| RU17 | RU18 | RU19 | RU20 |
| −1010:−959 | −956:−905 | −876:−825 | −822:−771 |
| RU21 | RU22 | RU23 | RU24 |
| −768:−717 | −714:−663 | −634:−583 | −580:−529 |
| RU25 | RU26 | RU27 | RU28 |
| −500:−449 | −446:−395 | −366:−315 | −312:−261 |

TABLE 43-continued

| RU29 | RU30 | RU31 | RU32 |
|---|---|---|---|
| −258:−207 | −204:−153 | −124:−73 | −70:−19 |

→RU33~RU64→ A subcarrier index of RU 32+x is equal to a value obtained by multiplying a minus sign (−) to a sign of an RU 33-x subcarrier index (x is a positive integer less than or equal to 32).

→Ex) A subcarrier index of RU 77 is equal to a value obtained by multiplying a minus sign (−) to a sign of an RU 31 subcarrier index, that is, 73:124

Null subcarriers: ±{17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012, 1013, 1040, 1041, 1042, 1095, 1096, 1149, 1176, 1229, 1230, 1283, 1284, 1337, 1338, 1391, 1418, 1471, 1472, 1525, 1552, 1605, 1606, 1659, 1686, 1739, 1740, 1793, 1794, 1847, 1848, 1901, 1928, 1981, 1982, 2035, 2036}

<106 RU>

TABLE 44

| RU1 | RU2 | RU3 | RU4 |
|---|---|---|---|
| −2034:−1929 | −1900:−1795 | −1792:−1687 | −1658:−1553 |
| RU5 | RU6 | RU7 | RU8 |
| −1524:−1419 | −1390:−1285 | −1282:−1177 | −1148:−1043 |
| RU9 | RU10 | RU11 | RU12 |
| −1010:−905 | −876:−771 | −768:−663 | −634:−529 |
| RU13 | RU14 | RU15 | RU16 |
| −500:−395 | −366:−261 | −258:−153 | −124:−19 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 153:258

Null subcarriers: ±{17, 18, 125, 152, 259, 260, 367, 394, 501, 528, 635, 662, 769, 770, 877, 904, 1011, 1012, 1013, 1040, 1041, 1042, 1149, 1176, 1283, 1284, 1391, 1418, 1525, 1552, 1659, 1686, 1793, 1794, 1901, 1928, 2035, 2036}

<242 RU>

TABLE 45

| RU1 | RU2 | RU3 | RU4 |
|---|---|---|---|
| −2035:−1794 | −1793:−1552 | −1525:−1284 | −1283:−1042 |
| RU5 | RU6 | RU7 | RU8 |
| −1011:−770 | −769:−528 | −501:−260 | −259:−18 |

→RU9~RU16→ A subcarrier index of RU 8+x is equal to a value obtained by multiplying a minus sign (−) to a sign of an RU 9-x subcarrier index (x is a positive integer less than or equal to 8).

→Ex) A subcarrier index of RU 10 is equal to a value obtained by multiplying a minus sign (−) to a sign of an RU 7 subcarrier index, that is, 260:501

Null subcarriers: ±{17, 1012, 1013, 1040, 1041, 2036}

<484 RU>

TABLE 46

| RU1 | RU2 | RU3 | RU4 |
|---|---|---|---|
| −2035:−1552 | −1525:−1042 | −1011:−528 | −501:−18 |

→RU5~RU8→ A subcarrier index of RU 4+x is equal to a value obtained by multiplying a minus sign (−) to a sign of an RU 5-x subcarrier index (x is a positive integer less than or equal to 4).

→Ex) A subcarrier index of RU 6 is equal to a value obtained by multiplying a minus sign (−) to a sign of an RU 3 subcarrier index, that is, 528:1011

Null subcarriers: ±{17, 1012, 1013, 1040, 1041, 2036}

<996 RU>

TABLE 47

| RU1 | RU2 | RU3 | RU4 |
|---|---|---|---|
| −2036:−1041 | −1012:−17 | 17:1012 | 1041:2036 |

Null subcarriers: ±{1013, 1040}

<2020 RU>

TABLE 48

| RU1 | RU2 |
|---|---|
| −2036:−17 | 17:2036 |

Null subcarriers: X

<4068 or 4066 RU for New 160 MHz Tone Plan>

4068RU: −2036:−3, 3:2036

4066RU: −2036:−4, 4:2036

Null subcarriers: X

Each RU and an index of a null tone are listed below in a case where 4066/4068RU is used in full band transmission, the second configuration of 2020RU is used, and the first configuration of 996RU is used.

<26 RU>

TABLE 49

| RU1 | RU2 | RU3 | RU4 | RU5 | RU6 | RU7 | RU8 | RU9 |
|---|---|---|---|---|---|---|---|---|
| −2034:−2009 | −2008:−1983 | −1980:−1955 | −1954:−1929 | −1927:−1902 | −1900:−1875 | −1874:−1849 | −1846:−1821 | −1820:−1795 |
| RU10 | RU11 | RU12 | RU13 | RU14 | RU15 | RU16 | RU17 | RU18 | RU19 |
| −1792:−1767 | −1766:−1741 | −1738:−1713 | −1712:−1687 | −1685:−1660 | −1658:−1633 | −1632:−1607 | −1604:−1579 | −1578:−1553 | −1550:−1525 |
| RU20 | RU21 | RU22 | RU23 | RU24 | RU25 | RU26 | RU27 | RU28 |
| −1522:−1497 | −1496:−1471 | −1468:−1443 | −1442:−1417 | −1415:−1390 | −1388:−1363 | −1362:−1337 | −1334:−1309 | −1308:−1283 |
| RU29 | RU30 | RU31 | RU32 | RU33 | RU34 | RU35 | RU36 | RU37 | RU38 |
| −1280:−1255 | −1254:−1229 | −1226:−1201 | −1200:−1175 | −1173:−1148 | −1146:−1121 | −1120:−1095 | −1092:−1067 | −1066:−1041 | −1039:−1014 |
| RU39 | RU40 | RU41 | RU42 | RU43 | RU44 | RU45 | RU46 | RU47 |
| −1012:−987 | −986:−961 | −958:−933 | −932:−907 | −905:−880 | −878:−853 | −852:−827 | −824:−799 | −798:−773 |
| RU48 | RU49 | RU50 | RU51 | RU52 | RU53 | RU54 | RU55 | RU56 | RU57 |
| −770:−745 | −744:−719 | −716:−691 | −690:−665 | −663:−638 | −636:−611 | −610:−585 | −582:−557 | −556:−531 | −528:−503 |

TABLE 49-continued

| RU58 | RU59 | RU60 | RU61 | RU62 | RU63 | RU64 | RU65 | RU66 | |
|---|---|---|---|---|---|---|---|---|---|
| −500:−475 | −474:−449 | −446:−421 | −420:−395 | −393:−368 | −366:−341 | −340:−315 | −312:−287 | −286:−261 | |
| RU67 | RU68 | RU69 | RU70 | RU71 | RU72 | RU73 | RU74 | RU75 | RU76 |
| −258:−233 | −232:−207 | −204:−179 | −178:−153 | −151:−126 | −124:−99 | −98:−73 | −70:−45 | −44:−19 | −16:−4, 4:16 |

→RU77~RU151→ A subcarrier index of RU 76+x is equal to a value obtained by multiplying a minus sign (−) to a sign of an RU 76-x subcarrier index (x is a positive integer less than or equal to 75).

→Ex) A subcarrier index of RU 77 is equal to a value obtained by multiplying a minus sign (−) to a sign of an RU 75 subcarrier index, that is, 19:44

Null subcarriers: ±{17, 18, 71, 72, 125, 152, 205, 206, 259, 260, 313, 314, 367, 394, 447, 448, 501, 502, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035, 2036}

<52 RU>

TABLE 50

| RU1 | RU2 | RU3 | RU4 |
|---|---|---|---|
| −2034:−1983 | −1980:−1929 | −1900:−1849 | −1846:−1795 |
| RU5 | RU6 | RU7 | RU8 |
| −1792:−1741 | −1738:−1687 | −1658:−1607 | −1604:−1553 |
| RU9 | RU10 | RU11 | RU12 |
| −1522:−1471 | −1468:−1417 | −1388:−1337 | −1334:−1283 |
| RU13 | RU14 | RU15 | RU16 |
| −1280:−1229 | −1226:−1175 | −1146:−1095 | −1092:−1041 |
| RU17 | RU18 | RU19 | RU20 |
| −1012:−961 | −958:−907 | −878:−827 | −824:−773 |
| RU21 | RU22 | RU23 | RU24 |
| −770:−719 | −716:−665 | −636:−585 | −582:−531 |
| RU25 | RU26 | RU27 | RU28 |
| −500:−449 | −446:−395 | −366:−315 | −312:−261 |
| RU29 | RU30 | RU31 | RU32 |
| −258:−207 | −204:−153 | −124:−73 | −70:−19 |

→RU33~RU64→ A subcarrier index of RU 32+x is equal to a value obtained by multiplying a minus sign (−) to a sign of an RU 33-x subcarrier index (x is a positive integer less than or equal to 75).

→Ex) A subcarrier index of RU 34 is equal to a value obtained by multiplying a minus sign (−) to a sign of an RU 31 subcarrier index, that is, 73:124

Null subcarriers: ±{17, 18, 71, 72, 125, 152, 205, 206, 259, 260, 313, 314, 367, 394, 447, 448, 501, 502, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035, 2036}

<106 RU>

TABLE 51

| RU1 | RU2 | RU3 | RU4 |
|---|---|---|---|
| −2034:−1929 | −1900:−1795 | −1792:−1687 | −1658:−1553 |
| RU5 | RU6 | RU7 | RU8 |
| −1522:−1417 | −1388:−1283 | −1280:−1175 | −1146:−1041 |
| RU9 | RU10 | RU11 | RU12 |
| −1012:−907 | −878:−773 | −770:−665 | −636:−531 |
| RU13 | RU14 | RU15 | RU16 |
| −500:−395 | −366:−261 | −258:−153 | −124:−19 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 153:258

Null subcarriers: ±{17, 18, 125, 152, 259, 260, 367, 394, 501, 502, 529, 530, 637, 664, 771, 772, 879, 906, 1013, 1040, 1147, 1174, 1281, 1282, 1389, 1416, 1523, 1524, 1551, 1552, 1659, 1686, 1793, 1794, 1901, 1928, 2035, 2036}

<242 RU>

TABLE 52

| RU1 | RU2 | RU3 | RU4 |
|---|---|---|---|
| −2035:−1794 | −1793:−1552 | −1523:−1282 | −1281:−1040 |
| RU5 | RU6 | RU7 | RU8 |
| −1013:−772 | −771:−530 | −501:−260 | −259:−18 |

→RU9~RU16→ A subcarrier index of RU 8+x is equal to a value obtained by multiplying a minus sign (−) to a sign of an RU 9-x subcarrier index (x is a positive integer less than or equal to 8).

→Ex) A subcarrier index of RU 10 is equal to a value obtained by multiplying a minus sign (−) to a sign of an RU 7 subcarrier index, that is, 260:501

Null subcarriers: ±{17, 502, 529, 1524, 1551, 2036}

<484 RU>

TABLE 53

| RU1 | RU2 | RU3 | RU4 |
|---|---|---|---|
| −2035:−1552 | −1523:−1040 | −1013:−530 | −501:−18 |

→RU5~RU8→ A subcarrier index of RU 4+x is equal to a value obtained by multiplying a minus sign (−) to a sign of an RU 5-x subcarrier index (x is a positive integer less than or equal to 4).

→Ex) A subcarrier index of RU 6 is equal to a value obtained by multiplying a minus sign (−) to a sign of an RU 3 subcarrier index, that is, 530:1013

Null subcarriers: ±{17, 502, 529, 1524, 1551, 2036}

<996 RU>

TABLE 54

| RU1 | RU2 | RU3 | RU4 |
|---|---|---|---|
| −2035:−1040 | −1013:−18 | 18:1013 | 1040:2035 |

Null subcarriers: ±{17, 2036}

<2020 RU>

TABLE 55

| RU1 | RU2 |
|---|---|
| −2036:−17 | 17:2036 |

Null subcarriers: X
<4068 or 4066 RU for New 160 MHz Tone Plan>
4068RU: −2036:−3, 3:2036
4066RU: −2036:−4, 4:2036
Null subcarriers: X
Each RU and an index of a null tone are listed below in a case where 4066/4068RU is used in full band transmission, the second configuration of 2020RU is used, and the second configuration of 996RU is used.
<26 RU>

TABLE 56

| RU1 | RU2 | RU3 | RU4 | RU5 | RU6 | RU7 | RU8 | RU9 | |
|---|---|---|---|---|---|---|---|---|---|
| −2033:−2008 | −2007:−1982 | −1979:−1954 | −1953:−1928 | −1926:−1901 | −1899:−1874 | −1873:−1848 | −1845:−1820 | −1819:−1794 | |
| RU10 | RU11 | RU12 | RU13 | RU14 | RU15 | RU16 | RU17 | RU18 | RU19 |
| −1791:−1766 | −1765:−1740 | −1737:−1712 | −1711:−1686 | −1684:−1659 | −1657:−1632 | −1631:−1606 | −1603:−1578 | −1577:−1552 | −1550:−1525 |
| RU20 | RU21 | RU22 | RU23 | RU24 | RU25 | RU26 | RU27 | RU28 | |
| −1523:−1498 | −1497:−1472 | −1469:−1444 | −1443:−1418 | −1416:−1391 | −1389:−1364 | −1363:−1338 | −1335:−1310 | −1309:−1284 | |
| RU29 | RU30 | RU31 | RU32 | RU33 | RU34 | RU35 | RU36 | RU37 | RU38 |
| −1281:−1256 | −1255:−1230 | −1227:−1202 | −1201:−1176 | −1174:−1149 | −1147:−1122 | −1121:−1096 | −1093:−1068 | −1067:−1042 | −1039:−1014 |
| RU39 | RU40 | RU41 | RU42 | RU43 | RU44 | RU45 | RU46 | RU47 | |
| −1011:−986 | −985:−960 | −957:−932 | −931:−906 | −904:−879 | −877:−852 | −851:−826 | −823:−798 | −797:−772 | |
| RU48 | RU49 | RU50 | RU51 | RU52 | RU53 | RU54 | RU55 | RU56 | RU57 |
| −769:−744 | −743:−718 | −715:−690 | −689:−664 | −662:−637 | −635:−610 | −609:−584 | −581:−556 | −555:−530 | −528:−503 |
| RU58 | RU59 | RU60 | RU61 | RU62 | RU63 | RU64 | RU65 | RU66 | |
| −501:−476 | −475:−450 | −447:−422 | −421:−396 | −394:−369 | −367:−342 | −341:−316 | −313:−288 | −287:−262 | |
| RU67 | RU68 | RU69 | RU70 | RU71 | RU72 | RU73 | RU74 | RU75 | RU76 |
| −259:−234 | −233:−208 | −205:−180 | −179:−154 | −152:−127 | −125:−100 | −99:−74 | −71:−46 | −45:−20 | −16:−4, 4:16 |

→RU77~RU151→ A subcarrier index of RU 76+x is equal to a value obtained by multiplying a minus sign (−) to a sign of an RU 76-x subcarrier index (x is a positive integer less than or equal to 75).

→Ex) A subcarrier index of RU 77 is equal to a value obtained by multiplying a minus sign (−) to a sign of an RU 75 subcarrier index, that is, 20:45

Null subcarriers: ±{17, 18, 19, 72, 73, 126, 153, 206, 207, 260, 261, 314, 315, 368, 395, 448, 449, 502, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035, 2036}

<52 RU>

TABLE 57

| RU1 | RU2 | RU3 | RU4 |
|---|---|---|---|
| −2033:−1982 | −1979:−1928 | −1899:−1848 | −1845:−1794 |
| RU5 | RU6 | RU7 | RU8 |
| −1791:−1740 | −1737:−1686 | −1657:−1606 | −1603:−1552 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1011:−960 | −957:−906 | −877:−826 | −823:−772 |
| RU21 | RU22 | RU23 | RU24 |
| −769:−718 | −715:−664 | −635:−584 | −581:−530 |
| RU25 | RU26 | RU27 | RU28 |
| −501:−450 | −447:−396 | −367:−316 | −313:−262 |
| RU29 | RU30 | RU31 | RU32 |
| −259:−208 | −205:−154 | −125:−74 | −71:−20 |

→RU33~RU64→ A subcarrier index of RU 32+x is equal to a value obtained by multiplying a minus sign (−) to a sign of an RU 33-x subcarrier index (x is a positive integer less than or equal to 32).

→Ex) A subcarrier index of RU 34 is equal to a value obtained by multiplying a minus sign (−) to a sign of an RU 31 subcarrier index, that is, 74:125

Null subcarriers: ±{17, 18, 19, 72, 73, 126, 153, 206, 207, 260, 261, 314, 315, 368, 395, 448, 449, 502, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035, 2036}

<106 RU>

TABLE 58

| RU1 | RU2 | RU3 | RU4 |
|---|---|---|---|
| −2033:−1928 | −1899:−1794 | −1791:−1686 | −1657:−1552 |
| RU5 | RU6 | RU7 | RU8 |
| −1523:−1418 | −1389:−1284 | −1281:−1176 | −1147:−1042 |
| RU9 | RU10 | RU11 | RU12 |
| −1011:−906 | −877:−772 | −769:−664 | −635:−530 |
| RU13 | RU14 | RU15 | RU16 |
| −501:−396 | −367:−262 | −259:−154 | −125:−20 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 154:259

Null subcarriers: ±{17, 18, 19, 126, 153, 260, 261, 368, 395, 502, 529, 636, 663, 770, 771, 878, 905, 1012, 1013, 1040, 1041, 1148, 1175, 1282, 1283, 1390, 1417, 1524, 1551, 1658, 1685, 1792, 1793, 1900, 1927, 2034, 2035, 2036}

<242 RU>

TABLE 59

| RU1 | RU2 | RU3 | RU4 |
|---|---|---|---|
| −2034:−1793 | −1792:−1551 | −1524:−1283 | −1282:−1041 |
| RU5 | RU6 | RU7 | RU8 |
| −1012:−771 | −770:−529 | −502:−261 | −260:−19 |

→RU9~RU16→ A subcarrier index of RU 8+x is equal to a value obtained by multiplying a minus sign (−) to a sign of an RU 9-x subcarrier index (x is a positive integer less than or equal to 8).
→Ex) A subcarrier index of RU 10 is equal to a value obtained by multiplying a minus sign (−) to a sign of an RU 7 subcarrier index, that is, 261:502
Null subcarriers: ±{17, 18, 1013, 1040, 2035, 2036}
<484 RU>

TABLE 60

| RU1 | RU2 | RU3 | RU4 |
|---|---|---|---|
| −2034:−1551 | −1524:−1041 | −1012:−529 | −502:−19 |

→RU5~RU8→ A subcarrier index of RU 4+x is equal to a value obtained by multiplying a minus sign (−) to a sign of an RU 5-x subcarrier index (x is a positive integer less than or equal to 4).
→Ex) A subcarrier index of RU 6 is equal to a value obtained by multiplying a minus sign (−) to a sign of an RU 3 subcarrier index, that is, 529:1012
Null subcarriers: ±{17, 18, 1013, 1040, 2035, 2036}
<996 RU>

TABLE 61

| RU1 | RU2 | RU3 | RU4 |
|---|---|---|---|
| −2035:−1040 | −1013:−18 | 18:1013 | 1040:2035 |

Null subcarriers: ±{17, 2036}
<2020 RU>

TABLE 62

| RU1 | RU2 |
|---|---|
| −2036:−17 | 17:2036 |

Null subcarriers: X
<4068 or 4066 RU for New 160 MHz Tone Plan>
4068RU: −2036:−3, 3:2036
4066RU: −2036:−4, 4:2036
Null subcarriers: X
B. Alternative 320 MHz Tone Plan 1-A This is the same as described in the case A, and is a case where DC is fixed to 5 in a full band and OFDMA situation.
<Full Band>
12/11 guard tone, 5DC, 4068RU (RU subcarrier index: −2036:−3, 3:2036)
<OFDMA Tone Plan>

12G+2020RU+1N+13RU+5DC+13RU+1N+2020RU+11G

DC is fixed to 5 and one null subcarrier is located at both sides of a center 26RU. Such a design is to decrease an effect of interference caused by an adjacent RU of the center 26RU.

The following two configurations are proposed as a 2020RU configuration.

2020RU=996RU+1N+26RU+1N+996RU

2020RU=1N+996RU+26RU+996RU+1N

In a first configuration, a null tone is present at both sides of the 26RU so that an effect of interference from/to an adjacent RU can be decreased. In a second configuration, the effect of interference between 996RU and its adjacent RU can be decreased. An RU which uses a small number of subcarriers, such as 26RU, may preferably use the first configuration since interference has significant effect on performance.

The following two configurations are proposed as a 996RU configuration as in the new 160 MHz.

996RU=484RU+1N+26RU+1N+484RU

996RU=1N+484RU+26RU+484RU+1N

The 484RU has two 242RU configurations as in the existing 11ax.

484RU=242RU+242RU

The 242RU has the following configuration as in the existing 11ax.

242RU=1N+106RU+1N+26RU+1N+106RU+1N

The 106RU has the following configuration as in the existing 11ax.

106RU=52RU+2N+52RU

The 52RU has the following configuration as in the existing 11ax.

52RU=26RU+26RU

Each RU and an index of a null tone are listed below in a case where 4068RU is used in full band transmission, the first configuration of 2020RU is used, and the first configuration of 996RU is used.
<26 RU>

TABLE 63

| RU1 | RU2 | RU3 | RU4 | RU5 | RU6 | RU7 | RU8 | RU9 | |
|---|---|---|---|---|---|---|---|---|---|
| −2035:−2010 | −2009:−1984 | −1981:−1956 | −1955:−1930 | −1928:−1903 | −1901:−1876 | −1875:−1850 | −1847:−1822 | −1821:−1796 | |
| RU10 | RU11 | RU12 | RU13 | RU14 | RU15 | RU16 | RU17 | RU18 | RU19 |
| −1793:−1768 | −1767:−1742 | −1739:−1714 | −1713:−1688 | −1686:−1661 | −1659:−1634 | −1633:−1608 | −1605:−1580 | −1579:−1554 | −1551:−1526 |
| RU20 | RU21 | RU22 | RU23 | RU24 | RU25 | RU26 | RU27 | RU28 | |
| −1523:−1498 | −1497:−1472 | −1469:−1444 | −1443:−1418 | −1416:−1391 | 1389:−1364 | −1363:−1338 | −1335:−1310 | −1309:−1284 | |
| RU29 | RU30 | RU31 | RU32 | RU33 | RU34 | RU35 | RU36 | RU37 | RU38 |
| −1281:−1256 | −1255:−1230 | −1227:−1202 | −1201:−1176 | −1174:−1149 | −1147:−1122 | −1121:−1096 | −1093:−1068 | −1067:−1042 | −1039:−1014 |
| RU39 | RU40 | RU41 | RU42 | RU43 | RU44 | RU45 | RU46 | RU47 | |
| −1011:−986 | −985:−960 | −957:−932 | −931:−906 | −904:−879 | −877:−852 | −851:−826 | −823:−798 | −797:−772 | |
| RU48 | RU49 | RU50 | RU51 | RU52 | RU53 | RU54 | RU55 | RU56 | RU57 |
| −769:−744 | −743:−718 | −715:−690 | −689:−664 | −662:−637 | −635:−610 | −609:−584 | −581:−556 | −555:−530 | −527:−502 |
| RU58 | RU59 | RU60 | RU61 | RU62 | RU63 | RU64 | RU65 | RU66 | |
| −499:−474 | −473:−448 | −445:−420 | −419:−394 | −392:−367 | −365:−340 | −339:−314 | −311:−286 | −285:−260 | |

TABLE 63-continued

| RU67 | RU68 | RU69 | RU70 | RU71 | RU72 | RU73 | RU74 | RU75 | RU76 |
|---|---|---|---|---|---|---|---|---|---|
| −257:−232 | −231:−206 | −203:−178 | −177:−152 | −150:−125 | −123:−98 | −97:−72 | −69:−44 | −43:−18 | −15:−3, 3:15 |

→RU77~RU151→ A subcarrier index of RU 76+x is equal to a value obtained by multiplying a minus sign (−) to a sign of an RU 76-x subcarrier index (x is a positive integer less than or equal to 75).
→Ex) A subcarrier index of RU 77 is equal to a value obtained by multiplying a minus sign (−) to a sign of an RU 75 subcarrier index, that is, 18:43
Null subcarriers: ±{16, 17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}
<52 RU>

TABLE 64

| RU1 | RU2 | RU3 | RU4 |
|---|---|---|---|
| −2035:−1984 | −1981:−1930 | −1901:−1850 | −1847:−1796 |
| RU5 | RU6 | RU7 | RU8 |
| −1793:−1742 | −1739:−1688 | −1659:−1608 | −1605:−1554 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1011:−960 | −957:−906 | −877:−826 | −823:−772 |
| RU21 | RU22 | RU23 | RU24 |
| −769:−718 | −715:−664 | −635:−584 | −581:−530 |
| RU25 | RU26 | RU27 | RU28 |
| −499:−448 | −445:−394 | −365:−314 | −311:−260 |
| RU29 | RU30 | RU31 | RU32 |
| −257:−206 | −203:−152 | −123:−72 | −69:−18 |

→RU33~RU64→ A subcarrier index of RU 32+x is equal to a value obtained by multiplying a minus sign (−) to a sign of an RU 33-x subcarrier index (x is a positive integer less than or equal to 32).
→Ex) A subcarrier index of RU 34 is equal to a value obtained by multiplying a minus sign (−) to a sign of an RU 31 subcarrier index, that is, 72:123
Null subcarriers: ±{16, 17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}
<106 RU>

TABLE 65

| RU1 | RU2 | RU3 | RU4 |
|---|---|---|---|
| −2035:−1930 | −1901:−1796 | −1793:−1688 | −1659:−1554 |
| RU5 | RU6 | RU7 | RU8 |
| −1523:−1418 | −1389:−1284 | −1281:−1176 | −1147:−1042 |
| RU9 | RU10 | RU11 | RU12 |
| −1011:−906 | −877:−772 | −769:−664 | −635:−530 |
| RU13 | RU14 | RU15 | RU16 |
| −499:−394 | −365:−260 | −257:−152 | −123:−18 |

→RU17~RU32→ A subcarrier index of RU 16+x is equal to a value obtained by multiplying a minus sign (−) to a sign of an RU 17-x subcarrier index (x is a positive integer less than or equal to 16).
→Ex) A subcarrier index of RU 18 is equal to a value obtained by multiplying a minus sign (−) to a sign of an RU 15 subcarrier index, that is, 152:257
Null subcarriers: ±{16, 17, 124, 151, 258, 259, 366, 393, 500, 501, 528, 529, 636, 663, 770, 771, 878, 905, 1012, 1013, 1040, 1041, 1148, 1175, 1282, 1283, 1390, 1417, 1524, 1525, 1552, 1553, 1660, 1687, 1794, 1795, 1902, 1929, 2036}
<242 RU>

TABLE 66

| RU1 | RU2 | RU3 | RU4 |
|---|---|---|---|
| −2036:−1795 | −1794:−1553 | −1524:−1283 | −1282:−1041 |
| RU5 | RU6 | RU7 | RU8 |
| −1012:−771 | −770:−529 | −500:−259 | −258:−17 |

→RU9~RU16→ A subcarrier index of RU 8+x is equal to a value obtained by multiplying a minus sign (−) to a sign of an RU 9-x subcarrier index (x is a positive integer less than or equal to 8).
→Ex) A subcarrier index of RU 10 is equal to a value obtained by multiplying a minus sign (−) to a sign of an RU 7 subcarrier index, that is, 259:500
Null subcarriers: ±{16, 501, 528, 1013, 1040, 1525, 1552}
<484 RU>

TABLE 67

| RU1 | RU2 | RU3 | RU4 |
|---|---|---|---|
| −2036:−1553 | −1524:−1041 | −1012:−529 | −500:−17 |

→RU5~RU8→ A subcarrier index of RU 4+x is equal to a value obtained by multiplying a minus sign (−) to a sign of an RU 5-x subcarrier index (x is a positive integer less than or equal to 4).
→Ex) A subcarrier index of RU 6 is equal to a value obtained by multiplying a minus sign (−) to a sign of an RU 3 subcarrier index, that is, 529:1012
Null subcarriers: ±{16, 501, 528, 1013, 1040, 1525, 1552}
<996 RU>

TABLE 68

| RU1 | RU2 | RU3 | RU4 |
|---|---|---|---|
| −2036:−1041 | −1012:−17 | 17:1012 | 1041:2036 |

Null subcarriers: ±{16, 1013, 1040}
<2020 RU>

TABLE 69

| RU1 | RU2 |
|---|---|
| −2036:−17 | 17:2036 |

Null subcarriers: ±16

<4068 RU for New 320 MHz Tone Plan>

4068RU: −2036:−3, 3:2036

Null subcarriers: X

Each RU and an index of a null tone are listed below in a case where 4068RU is used in full band transmission, the first configuration of 2020RU is used, and the second configuration of 996RU is used.

<26 RU>

TABLE 70

| RU1 | RU2 | RU3 | RU4 | RU5 | RU6 | RU7 | RU8 | RU9 |
|---|---|---|---|---|---|---|---|---|
| −2034:−2009 | −2008:−1983 | −1980:−1955 | −1954:−1929 | −1927:−1902 | −1900:−1875 | −1874:−1849 | −1846:−1821 | −1820:−1795 |
| RU10 | RU11 | RU12 | RU13 | RU14 | RU15 | RU16 | RU17 | RU18 | RU19 |
| −1792:−1767 | −1766:−1741 | −1738:−1713 | −1712:−1687 | −1685:−1660 | −1658:−1633 | −1632:−1607 | −1604:−1579 | −1578:−1553 | −1551:−1526 |
| RU20 | RU21 | RU22 | RU23 | RU24 | RU25 | RU26 | RU27 | RU28 |
| −1524:−1499 | −1498:−1473 | −1470:−1445 | −1444:−1419 | −1417:−1392 | −1390:−1365 | −1364:−1339 | −1336:−1311 | −1310:−1285 |
| RU29 | RU30 | RU31 | RU32 | RU33 | RU34 | RU35 | RU36 | RU37 | RU38 |
| −1282:−1257 | −1256:−1231 | −1228:−1203 | −1202:−1177 | −1175:−1150 | −1148:−1123 | −1122:−1097 | −1094:−1069 | −1068:−1043 | −1039:−1014 |
| RU39 | RU40 | RU41 | RU42 | RU43 | RU44 | RU45 | RU46 | RU47 |
| −1010:−985 | −984:−959 | −956:−931 | −930:−905 | −903:−878 | −876:−851 | −850:−825 | −822:−797 | −796:−771 |
| RU48 | RU49 | RU50 | RU51 | RU52 | RU53 | RU54 | RU55 | RU56 | RU57 |
| −768:−743 | −742:−717 | −714:−689 | −688:−663 | −661:−636 | −634:−609 | −608:−583 | −580:−555 | −554:−529 | −527:−502 |
| RU58 | RU59 | RU60 | RU61 | RU62 | RU63 | RU64 | RU65 | RU66 |
| −500:−475 | −474:−449 | −446:−421 | −420:−395 | −393:−368 | −366:−341 | −340:−315 | −312:−287 | −286:−261 |
| RU67 | RU68 | RU69 | RU70 | RU71 | RU72 | RU73 | RU74 | RU75 | RU76 |
| −258:−233 | −232:−207 | −204:−179 | −178:−153 | −151:−126 | −124:−99 | −98:−73 | −70:−45 | −44:−19 | −15:−3, 3:15 |

→RU77~RU151→ A subcarrier index of RU 76+x is equal to a value obtained by multiplying a minus sign (−) to a sign of an RU 76-x subcarrier index (x is a positive integer less than or equal to 75).

→Ex) A subcarrier index of RU 77 is equal to a value obtained by multiplying a minus sign (−) to a sign of an RU 75 subcarrier index, that is, 19:44

Null subcarriers: ±{16, 17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012, 1013, 1040, 1041, 1042, 1095, 1096, 1149, 1176, 1229, 1230, 1283, 1284, 1337, 1338, 1391, 1418, 1471, 1472, 1525, 1552, 1605, 1606, 1659, 1686, 1739, 1740, 1793, 1794, 1847, 1848, 1901, 1928, 1981, 1982, 2035, 2036}

<52 RU>

TABLE 71

| RU1 | RU2 | RU3 | RU4 |
|---|---|---|---|
| −2034:−1983 | −1980:−1929 | −1900:−1849 | −1846:−1795 |
| RU5 | RU6 | RU7 | RU8 |
| −1792:−1741 | −1738:−1687 | −1658:−1607 | −1604:−1553 |
| RU9 | RU10 | RU11 | RU12 |
| −1524:−1473 | −1470:−1419 | −1390:−1339 | −1336:−1285 |
| RU13 | RU14 | RU15 | RU16 |
| −1282:−1231 | −1228:−1177 | −1148:−1097 | −1094:−1043 |
| RU17 | RU18 | RU19 | RU20 |
| −1010:−959 | −956:−905 | −876:−825 | −822:−771 |
| RU21 | RU22 | RU23 | RU24 |
| −768:−717 | −714:−663 | −634:−583 | −580:−529 |
| RU25 | RU26 | RU27 | RU28 |
| −500:−449 | −446:−395 | −366:−315 | −312:−261 |
| RU29 | RU30 | RU31 | RU32 |
| −258:−207 | −204:−153 | −124:−73 | −70:−19 |

→RU33~RU64→ A subcarrier index of RU 32+x is equal to a value obtained by multiplying a minus sign (−) to a sign of an RU 33-x subcarrier index (x is a positive integer less than or equal to 32).

→Ex) A subcarrier index of RU 34 is equal to a value obtained by multiplying a minus sign (−) to a sign of an RU 31 subcarrier index, that is, 73:124

Null subcarriers: ±{16, 17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012, 1013, 1040, 1041, 1042, 1095, 1096, 1149, 1176, 1229, 1230, 1283, 1284, 1337, 1338, 1391, 1418, 1471, 1472, 1525, 1552, 1605, 1606, 1659, 1686, 1739, 1740, 1793, 1794, 1847, 1848, 1901, 1928, 1981, 1982, 2035, 2036}

<106 RU>

TABLE 72

| RU1 | RU2 | RU3 | RU4 |
|---|---|---|---|
| −2034:−1929 | −1900:−1795 | −1792:−1687 | −1658:−1553 |
| RU5 | RU6 | RU7 | RU8 |
| −1524:−1419 | −1390:−1285 | −1282:−1177 | −1148:−1043 |
| RU9 | RU10 | RU11 | RU12 |
| −1010:−905 | −876:−771 | −768:−663 | −634:−529 |
| RU13 | RU14 | RU15 | RU16 |
| −500:−395 | −366:−261 | −258:−153 | −124:−19 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 153:258

Null subcarriers: ±{16, 17, 18, 125, 152, 259, 260, 367, 394, 501, 528, 635, 662, 769, 770, 877, 904, 1011, 1012, 1013, 1040, 1041, 1042, 1149, 1176, 1283, 1284, 1391, 1418, 1525, 1552, 1659, 1686, 1793, 1794, 1901, 1928, 2035, 2036}

<242 RU>

TABLE 73

| RU1 | RU2 | RU3 | RU4 |
|---|---|---|---|
| −2035:−1794 | −1793:−1552 | −1525:−1284 | −1283:−1042 |
| RU5 | RU6 | RU7 | RU8 |
| −1011:−770 | −769:−528 | −501:−260 | −259:−18 |

→RU9~RU16→ A subcarrier index of RU 8+x is equal to a value obtained by multiplying a minus sign (−) to a sign of an RU 9-x subcarrier index (x is a positive integer less than or equal to 8).

→Ex) A subcarrier index of RU 10 is equal to a value obtained by multiplying a minus sign (−) to a sign of an RU 7 subcarrier index, that is, 260:501

Null subcarriers: ±{16, 17, 1012, 1013, 1040, 1041, 2036}

<484 RU>

TABLE 74

| RU1 | RU2 | RU3 | RU4 |
|---|---|---|---|
| −2035:−1552 | −1525:−1042 | −1011:−528 | −501:−18 |

→RU5~RU8→ A subcarrier index of RU 4+x is equal to a value obtained by multiplying a minus sign (−) to a sign of an RU 5-x subcarrier index (x is a positive integer less than or equal to 4).
→Ex) A subcarrier index of RU 6 is equal to a value obtained by multiplying a minus sign (−) to a sign of an RU 3 subcarrier index, that is, 528:1011
Null subcarriers: ±{16, 17, 1012, 1013, 1040, 1041, 2036}
<996 RU>

TABLE 75

| RU1 | RU2 | RU3 | RU4 |
|---|---|---|---|
| −2036:−1041 | −1012:−17 | 17:1012 | 1041:2036 |

Null subcarriers: ±{16, 1013, 1040}
<2020 RU>

TABLE 76

| RU1 | RU2 |
|---|---|
| −2036:−17 | 17:2036 |

Null subcarriers: ±16
<4068 RU for New 320 MHz Tone Plan>
4068RU: −2036:−3, 3:2036
Null subcarriers: X
Each RU and an index of a null tone are listed below in a case where 4068RU is used in full band transmission, the second configuration of 2020RU is used, and the first configuration of 996RU is used.
<26 RU>

TABLE 77

| RU1 | RU2 | RU3 | RU4 | RU5 | RU6 | RU7 | RU8 | RU9 |
|---|---|---|---|---|---|---|---|---|
| −2034:−2009 | −2008:−1983 | −1980:−1955 | −1954:−1929 | −1927:−1902 | −1900:−1875 | −1874:−1849 | −1846:−1821 | −1820:−1795 |
| RU10 | RU11 | RU12 | RU13 | RU14 | RU15 | RU16 | RU17 | RU18 | RU19 |
| −1792:−1767 | −1766:−1741 | −1738:−1713 | −1712:−1687 | −1685:−1660 | −1658:−1633 | −1632:−1607 | −1604:−1579 | −1578:−1553 | −1550:−1525 |
| RU20 | RU21 | RU22 | RU23 | RU24 | RU25 | RU26 | RU27 | RU28 | |
| −1522:−1497 | −1496:−1471 | −1468:−1443 | −1442:−1417 | −1415:−1390 | −1388:−1363 | −1362:−1337 | −1334:−1309 | −1308:−1283 | |
| RU29 | RU30 | RU31 | RU32 | RU33 | RU34 | RU35 | RU36 | RU37 | RU38 |
| −1280:−1255 | −1254:−1229 | −1228:−1201 | −1200:−1175 | −1173:−1148 | −1146:−1121 | −1120:−1095 | −1092:−1067 | −1066:−1041 | −1039:−1014 |
| RU39 | RU40 | RU41 | RU42 | RU43 | RU44 | RU45 | RU46 | RU47 | |
| −1012:−987 | −986:−961 | −958:−933 | −932:−907 | −905:−880 | −878:−853 | −852:−827 | −824:−799 | −798:−773 | |
| RU48 | RU49 | RU50 | RU51 | RU52 | RU53 | RU54 | RU55 | RU56 | RU57 |
| −770:−745 | −744:−719 | −716:−691 | −690:−665 | −663:−638 | −636:−611 | −610:−585 | −582:−557 | −556:−531 | −528:−503 |
| RU58 | RU59 | RU60 | RU61 | RU62 | RU63 | RU64 | RU65 | RU66 | |
| −500:−475 | −474:−449 | −446:−421 | −420:−395 | −393:−368 | −366:−341 | −340:−315 | −312:−287 | −286:−261 | |
| RU67 | RU68 | RU69 | RU70 | RU71 | RU72 | RU73 | RU74 | RU75 | RU76 |
| −258:−233 | −232:−207 | −204:−179 | −178:−153 | −151:−126 | −124:−99 | −98:−73 | −70:−45 | −44:−19 | −15:−3, 3:15 |

→RU77~RU151→ A subcarrier index of RU 76+x is equal to a value obtained by multiplying a minus sign (−) to a sign of an RU 76-x subcarrier index (x is a positive integer less than or equal to 75).
→Ex) A subcarrier index of RU 77 is equal to a value obtained by multiplying a minus sign (−) to a sign of an RU 75 subcarrier index, that is, 19:44
Null subcarriers: ±{16, 17, 18, 71, 72, 125, 152, 205, 206, 259, 260, 313, 314, 367, 394, 447, 448, 501, 502, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035, 2036}
<52 RU>

TABLE 78

| RU1 | RU2 | RU3 | RU4 |
|---|---|---|---|
| −2034:−1983 | −1980:−1929 | −1900:−1849 | −1846:−1795 |
| RU5 | RU6 | RU7 | RU8 |
| −1792:−1741 | −1738:−1687 | −1658:−1607 | −1604:−1553 |
| RU9 | RU10 | RU11 | RU12 |
| −1522:−1471 | −1468:−1417 | −1388:−1337 | −1334:−1283 |
| RU13 | RU14 | RU15 | RU16 |
| −1280:−1229 | −1226:−1175 | −1146:−1095 | −1092:−1041 |
| RU17 | RU18 | RU19 | RU20 |
| −1012:−961 | −958:−907 | −878:−827 | −824:−773 |
| RU21 | RU22 | RU23 | RU24 |
| −770:−719 | −716:−665 | −636:−585 | −582:−531 |
| RU25 | RU26 | RU27 | RU28 |
| −500:−449 | −446:−395 | −366:−315 | −312:−261 |
| RU29 | RU30 | RU31 | RU32 |
| −258:−207 | −204:−153 | −124:−73 | −70:−19 |

→RU33~RU64→ A subcarrier index of RU 32+x is equal to a value obtained by multiplying a minus sign (−) to a sign of an RU 33-x subcarrier index (x is a positive integer less than or equal to 32).
→Ex) A subcarrier index of RU 34 is equal to a value obtained by multiplying a minus sign (−) to a sign of an RU 31 subcarrier index, that is, 73:124
Null subcarriers: ±{16, 17, 18, 71, 72, 125, 152, 205, 206, 259, 260, 313, 314, 367, 394, 447, 448, 501, 502, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035, 2036}
<106 RU>

TABLE 79

| RU1 | RU2 | RU3 | RU4 |
|---|---|---|---|
| −2034:−1929 | −1900:−1795 | −1792:−1687 | −1658:−1553 |
| RU5 | RU6 | RU7 | RU8 |
| −1522:−1417 | −1388:−1283 | −1280:−1175 | −1146:−1041 |

TABLE 79-continued

| RU9 | RU10 | RU11 | RU12 |
|---|---|---|---|
| −1012:−907 | −878:−773 | −770:−665 | −636:−531 |
| RU13 | RU14 | RU15 | RU16 |
| −500:−395 | −366:−261 | −258:−153 | −124:−19 |

→RU17~RU32→ A subcarrier index of KU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 153:258

Null subcarriers: ±{16, 17, 18, 125, 152, 259, 260, 367, 394, 501, 502, 529, 530, 637, 664, 771, 772, 879, 906, 1013, 1040, 1147, 1174, 1281, 1282, 1389, 1416, 1523, 1524, 1551, 1552, 1659, 1686, 1793, 1794, 1901, 1928, 2035, 2036}

<242 RU>

TABLE 80

| RU1 | RU2 | RU3 | RU4 |
|---|---|---|---|
| −2035:−1794 | −1793:−1552 | −1523:−1282 | −1281:−1040 |
| RU5 | RU6 | RU7 | RU8 |
| −1013:−772 | −771:−530 | −501:−260 | −259:−18 |

→RU9~RU16→ A subcarrier index of RU 8+x is equal to a value obtained by multiplying a minus sign (−) to a sign of an RU 9-x subcarrier index (x is a positive integer less than or equal to 8).

→Ex) A subcarrier index of RU 10 is equal to a value obtained by multiplying a minus sign (−) to a sign of an RU 7 subcarrier index, that is, 260:501

Null subcarriers: ±{16, 17, 502, 529, 1524, 1551, 2036}

<484 RU>

TABLE 81

| RU1 | RU2 | RU3 | RU4 |
|---|---|---|---|
| −2035:−1552 | −1523:−1040 | −1013:−530 | −501:−18 |

→RU5~RU8→ A subcarrier index of RU 4+x is equal to a value obtained by multiplying a minus sign (−) to a sign of an RU 5-x subcarrier index (x is a positive integer less than or equal to 4).

→Ex) A subcarrier index of RU 6 is equal to a value obtained by multiplying a minus sign (−) to a sign of an RU 3 subcarrier index, that is, 530:1013

Null subcarriers: ±{16, 17, 502, 529, 1524, 1551, 2036}

<996 RU>

TABLE 82

| RU1 | RU2 | RU3 | RU4 |
|---|---|---|---|
| −2035:−1040 | −1013:−18 | 18:1013 | 1040:2035 |

Null subcarriers: ±{16, 17, 2036}

<2020 RU>

TABLE 83

| RU1 | RU2 |
|---|---|
| −2036:−17 | 17:2036 |

Null subcarriers: ±16

<4068 RU for New 320 MHz Tone Plan>

4068RU: −2036:−3, 3:2036

Null subcarriers: X

Each RU and an index of a null tone are listed below in a case where 4068RU is used in full band transmission, the second configuration of 2020RU is used, and the second configuration of 996RU is used.

<26 RU>

TABLE 84

| RU1 | RU2 | RU3 | RU4 | RU5 | RU6 | RU7 | RU8 | RU9 |
|---|---|---|---|---|---|---|---|---|
| −2033:−2008 | −2007:−1982 | −1979:−1954 | −1953:−1928 | −1926:−1901 | −1899:−1874 | −1873:−1848 | −1845:−1820 | −1819:−1794 |
| RU10 | RU11 | RU12 | RU13 | RU14 | RU15 | RU16 | RU17 | RU18 | RU19 |
| −1791:−1766 | −1765:−1740 | −1737:−1712 | −1711:−1686 | −1684:−1659 | −1657:−1632 | −1631:−1606 | −1603:−1578 | −1577:−1552 | −1550:−1525 |
| RU20 | RU21 | RU22 | RU23 | RU24 | RU25 | RU26 | RU27 | RU28 | |
| −1523:−1498 | −1497:−1472 | −1469:−1444 | −1443:−1418 | −1416:−1391 | −1389:−1364 | −1363:−1338 | −1335:−1310 | −1309:−1284 | |
| RU29 | RU30 | RU31 | RU32 | RU33 | RU34 | RU35 | RU36 | RU37 | RU38 |
| −1281:−1256 | −1255:−1230 | −1227:−1202 | −1201:−1176 | −1174:−1149 | −1147:−1122 | −1121:−1096 | −1093:−1068 | −1067:−1042 | −1039:−1014 |
| RU39 | RU40 | RU41 | RU42 | RU43 | RU44 | RU45 | RU46 | RU47 | |
| −1011:−986 | −985:−960 | −957:−932 | −931:−906 | −904:−879 | −877:−852 | −851:−826 | −823:−798 | −797:−772 | |
| RU48 | RU49 | RU50 | RU51 | RU52 | RU53 | RU54 | RU55 | RU56 | RU57 |
| −769:−744 | −743:−718 | −715:−690 | −689:−664 | −662:−637 | −635:−610 | −609:−584 | −581:−556 | −555:−530 | −528:−503 |
| RU58 | RU59 | RU60 | RU61 | RU62 | RU63 | RU64 | RU65 | RU66 | |
| −501:−476 | −475:−450 | −447:−422 | −421:−396 | −394:−369 | −367:−342 | −341:−316 | −313:−288 | −287:−262 | |
| RU67 | RU68 | RU69 | RU70 | RU71 | RU72 | RU73 | RU74 | RU75 | RU76 |
| −259:−234 | −233:−208 | −205:−180 | −179:−154 | −152:−127 | −125:−100 | −99:−74 | −71:−46 | −45:−20 | −15:−3, 3:15 |

→RU77~RU151→ A subcarrier index of RU 76+x is equal to a value obtained by multiplying a minus sign (−) to a sign of an RU 76-x subcarrier index (x is a positive integer less than or equal to 75).

→Ex) A subcarrier index of RU 77 is equal to a value obtained by multiplying a minus sign (−) to a sign of an RU 75 subcarrier index, that is, 20:45

Null subcarriers: ±{16, 17, 18, 19, 72, 73, 126, 153, 206, 207, 260, 261, 314, 315, 368, 395, 448, 449, 502, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035, 2036}

<52 RU>

TABLE 85

| RU1 | RU2 | RU3 | RU4 |
|---|---|---|---|
| −2033:−1982 | −1979:−1928 | −1899:−1848 | −1845:−1794 |
| RU5 | RU6 | RU7 | RU8 |
| −1791:−1740 | −1737:−1686 | −1657:−1606 | −1603:−1552 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1011:−960 | −957:−906 | −877:−826 | −823:−772 |
| RU21 | RU22 | RU23 | RU24 |
| −769:−718 | −715:−664 | −635:−584 | −581:−530 |
| RU25 | RU26 | RU27 | RU28 |
| −501:−450 | −447:−396 | −367:−316 | −313:−262 |
| RU29 | RU30 | RU31 | RU32 |
| −259:−208 | −205:−154 | −125:−74 | −71:−20 |

→RU33~RU64→ A subcarrier index of RU 32+x is equal to a value obtained by multiplying a minus sign (−) to a sign of an RU 33-x subcarrier index (x is a positive integer less than or equal to 32).
→Ex) A subcarrier index of RU 34 is equal to a value obtained by multiplying a minus sign (−) to a sign of an RU 31 subcarrier index, that is, 74:125
Null subcarriers: ±{16, 17, 18, 19, 72, 73, 126, 153, 206, 207, 260, 261, 314, 315, 368, 395, 448, 449, 502, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035, 2036}
<106 RU>

TABLE 86

| RU1 | RU2 | RU3 | RU4 |
|---|---|---|---|
| −2033:−1928 | −1899:−1794 | −1791:−1686 | −1657:−1552 |
| RU5 | RU6 | RU7 | RU8 |
| −1523:−1418 | −1389:−1284 | −1281:−1176 | −1147:−1042 |
| RU9 | RU10 | RU11 | RU12 |
| −1011:−906 | −877:−772 | −769:−664 | −635:−530 |
| RU13 | RU14 | RU15 | RU16 |
| −501:−396 | −367:−262 | −259:−154 | −125:−20 |

→RU17~RU32→ A subcarrier index of RU 16+x is equal to a value obtained by multiplying a minus sign (−) to a sign of an RU 17-x subcarrier index (x is a positive integer less than or equal to 16).
→Ex) A subcarrier index of RU 18 is equal to a value obtained by multiplying a minus sign (−) to a sign of an RU 15 subcarrier index, that is, 154:259
Null subcarriers: ±{16, 17, 18, 19, 126, 153, 260, 261, 368, 395, 502, 529, 636, 663, 770, 771, 878, 905, 1012, 1013, 1040, 1041, 1148, 1175, 1282, 1283, 1390, 1417, 1524, 1551, 1658, 1685, 1792, 1793, 1900, 1927, 2034, 2035, 2036}
<242 RU>

TABLE 87

| RU1 | RU2 | RU3 | RU4 |
|---|---|---|---|
| −2034:−1793 | −1792:−1551 | −1524:−1283 | −1282:−1041 |
| RU5 | RU6 | RU7 | RU8 |
| −1012:−771 | −770:−529 | −502:−261 | −260:−19 |

→RU9~RU16→ A subcarrier index of RU 8+x is equal to a value obtained by multiplying a minus sign (−) to a sign of an RU 9-x subcarrier index (x is a positive integer less than or equal to 8).
→Ex) A subcarrier index of RU 10 is equal to a value obtained by multiplying a minus sign (−) to a sign of an RU 7 subcarrier index, that is, 261:502
Null subcarriers: ±{16, 17, 18, 1013, 1040, 2035, 2036}
<484 RU>

TABLE 88

| RU1 | RU2 | RU3 | RU4 |
|---|---|---|---|
| −2034:−1551 | −1524:−1041 | −1012:−529 | −502:−19 |

→RU5~RU8→ A subcarrier index of RU 4+x is equal to a value obtained by multiplying a minus sign (−) to a sign of an RU 5-x subcarrier index (x is a positive integer less than or equal to 4).
→Ex) A subcarrier index of RU 6 is equal to a value obtained by multiplying a minus sign (−) to a sign of an RU 3 subcarrier index, that is, 529:1012
Null subcarriers: ±{16, 17, 18, 1013, 1040, 2035, 2036}
<996 RU>

TABLE 89

| RU1 | RU2 | RU3 | RU4 |
|---|---|---|---|
| −2035:−1040 | −1013:−18 | 18:1013 | 1040:2035 |

Null subcarriers: ±{16, 17, 2036}
<2020 RU>

TABLE 90

| RU1 | RU2 |
|---|---|
| −2036:−17 | 17:2036 |

Null subcarriers: ±16<4068 RU for New 320 MHz Tone Plan>
4068RU: −2036:−3, 3:2036
Null subcarriers: X
C. Alternative 320 MHz Tone Plan 2
When two 160 MHz tone plans are successive to constitute 320 MHz, 12 left/11 right guard tones are used, and may be directly applied to the alternative 320 MHz tone plan. In addition, when a full band is used in transmission, a new RU may be proposed, and a size of the new RU may be determined by considering various DC tones according to an effect of a DC offset. The number of DC tones of the existing 11ax 80 MHz is 5 or 7, and this number or 9 or 11 may be applied considering performance. In this case, the new RU is 4068/4066/4064/4062RU.
<Full Band>
12/11 guard tone, 5DC, 4068RU (RU subcarrier index: −2036:−3, 3:2036)
12/11 guard tone, 7DC, 4066RU (RU subcarrier index: −2036:−4, 4:2036)
12/11 guard tone, 9DC, 4064RU (RU subcarrier index: −2036:−5, 5:2036)
12/11 guard tone, 11DC, 4062RU (RU subcarrier index: −2036:−6, 6:2036)
In 320 MHz, considering the effect of the DC offset, it is not preferable that the number of DC tones in use is less than 5/7 which is less than the number of DC tones used in the existing 80 MHz. In addition, it may be sufficient to use 5/7DC, and 9 or 11DC may be used for more reliable performance Up to 11DC may be appropriate when considering the following OFDMA tone plan using 2018RU.

<OFDMA Tone Plan>

The OFDMA tone plan may be expressed using 2018RU and 26RU (13+13RU) as follows.

12G+2018RU+13RU+11DC+13RU+2018RU+11G

12G+2018RU+1N+13RU+9DC+13RU+1N+2018RU+11G

12G+2018RU+2N+13RU+7DC+13RU+2N+2018RU+11G

12G+2018RU+3N+13RU+5DC+13RU+3N+2018RU+11G

The number of DC tones and the number of null tones of a center 26RU (13+13RU) may be determined by considering performance of a DC offset and performance based on an effect of interference of the center 26RU (13+13RU). Considering the existing 11ax tone plan, 7DC may be sufficient when the center 26RU (13+13RU) is used.

A 2018RU configuration is proposed as follows.

2018RU=996RU+26RU+996RU

The following two configurations are proposed as a 996RU configuration as in the new 160 MHz.

996RU=484RU+1N+26RU+1N+484RU

996RU=1N+484RU+26RU+484RU+1N

The 484RU has two 242RU configurations as in the existing 11ax.

484RU=242RU+242RU

The 242RU has the following configuration as in the existing 11ax.

242RU=1N+106RU+1N+26RU+1N+106RU+1N

The 106RU has the following configuration as in the existing 11ax.

106RU=52RU+2N+52RU

The 52RU has the following configuration as in the existing 11ax.

52RU=26RU+26RU

Each RU and an index of a null tone are listed below in a case where 4062/4064/4066/4068RU is used in full band transmission, a tone plan of '12G+2018RU+13RU+11DC+13RU+2018RU+11G' is used, and the first configuration of 996RU is used.

<26 RU>

→RU77~RU151→ A subcarrier index of RU 76+x is equal to a value obtained by multiplying a minus sign (−) to a sign of an RU 76-x subcarrier index (x is a positive integer less than or equal to 75).

→Ex) A subcarrier index of RU 77 is equal to a value obtained by multiplying a minus sign (−) to a sign of an RU 75 subcarrier index, that is, 20:45

Null subcarriers: ±{19, 72, 73, 126, 153, 206, 207, 260, 261, 314, 315, 368, 395, 448, 449, 502, 503, 530, 531, 584, 585, 638, 665, 718, 719, 772, 773, 826, 827, 880, 907, 960, 961, 1014, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}

<52 RU>

TABLE 92

| RU1 | RU2 | RU3 | RU4 |
|---|---|---|---|
| −2035:−1984 | −1981:−1930 | −1901:−1850 | −1847:−1796 |
| RU5 | RU6 | RU7 | RU8 |
| −1793:−1742 | −1739:−1688 | −1659:−1608 | −1605:−1554 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1013:−962 | −959:−908 | −879:−828 | −825:−774 |
| RU21 | RU22 | RU23 | RU24 |
| −771:−720 | −717:−666 | −637:−586 | −583:−532 |
| RU25 | RU26 | RU27 | RU28 |
| −501:−450 | −447:−396 | −367:−316 | −313:−262 |
| RU29 | RU30 | RU31 | RU32 |
| −259:−208 | −205:−154 | −125:−74 | −71:−20 |

→RU33~RU64→ A subcarrier index of RU 32+x is equal to a value obtained by multiplying a minus sign (−) to a sign of an RU 33-x subcarrier index (x is a positive integer less than or equal to 32).

→Ex) A subcarrier index of RU 34 is equal to a value obtained by multiplying a minus sign (−) to a sign of an RU 31 subcarrier index, that is, 74:125

Null subcarriers: ±{19, 72, 73, 126, 153, 206, 207, 260, 261, 314, 315, 368, 395, 448, 449, 502, 503, 530, 531, 584, 585, 638, 665, 718, 719, 772, 773, 826, 827, 880, 907, 960, 961, 1014, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}

TABLE 91

| RU1 | RU2 | RU3 | RU4 | RU5 | RU6 | RU7 | RU8 | RU9 |
|---|---|---|---|---|---|---|---|---|
| −2035:−2010 | −2009:−1984 | −1981:−1956 | −1955:−1930 | −1928:−1903 | −1901:−1876 | −1875:−1850 | −1847:−1822 | −1821:−1796 |
| RU10 | RU11 | RU12 | RU13 | RU14 | RU15 | RU16 | RU17 | RU18 | RU19 |
| −1793:−1768 | −1767:−1742 | −1739:−1714 | −1713:−1688 | −1686:−1661 | −1659:−1634 | −1633:−1608 | −1605:−1580 | −1579:−1554 | −1551:−1526 |
| RU20 | RU21 | RU22 | RU23 | RU24 | RU25 | RU26 | RU27 | RU28 | |
| −1523:−1498 | −1497:−1472 | −1469:−1444 | −1443:−1418 | −1416:−1391 | 1389:−1364 | −1363:−1338 | −1335:−1310 | −1309:−1284 | |
| RU29 | RU30 | RU31 | RU32 | RU33 | RU34 | RU35 | RU36 | RU37 | RU38 |
| −1281:−1256 | −1255:−1230 | −1227:−1202 | −1201:−1176 | −1174:−1149 | −1147:−1122 | −1121:−1096 | −1093:−1068 | −1067:−1042 | −1040:−1015 |
| RU39 | RU40 | RU41 | RU42 | RU43 | RU44 | RU45 | RU46 | RU47 | |
| −1013:−988 | −987:−962 | −959:−934 | −933:−908 | −906:−881 | −879:−854 | −853:−828 | −825:−800 | −799:−774 | |
| RU48 | RU49 | RU50 | RU51 | RU52 | RU53 | RU54 | RU55 | RU56 | RU57 |
| −771:−746 | −745:−720 | −717:−692 | −691:−666 | −664:−639 | −637:−612 | −611:−586 | −583:−558 | −557:−532 | −529:−504 |
| RU58 | RU59 | RU60 | RU61 | RU62 | RU63 | RU64 | RU65 | RU66 | |
| −501:−476 | −475:−450 | −447:−422 | −421:−396 | −394:−369 | −367:−342 | −341:−316 | −313:−288 | −287:−262 | |
| RU67 | RU68 | RU69 | RU70 | RU71 | RU72 | RU73 | RU74 | RU75 | RU76 |
| −259:−234 | −233:−208 | −205:−180 | −179:−154 | −152:−127 | −125:−100 | −99:−74 | −71:−46 | −45:−20 | −18:−6, 6:18 |

<106 RU>

TABLE 93

| RU1 | RU2 | RU3 | RU4 |
|---|---|---|---|
| −2035:−1930 | −1901:−1796 | −1793:−1688 | −1659:−1554 |
| RU5 | RU6 | RU7 | RU8 |
| −1523:−1418 | −1389:−1284 | −1281:−1176 | −1147:−1042 |
| RU9 | RU10 | RU11 | RU12 |
| −1013:−908 | −879:−774 | −771:−666 | −637:−532 |
| RU13 | RU14 | RU15 | RU16 |
| −501:−396 | −367:−262 | −259:−154 | −125:−20 |

→RU17~RU32→ A subcarrier index of RU 16+x is equal to a value obtained by multiplying a minus sign (−) to a sign of an RU 17-x subcarrier index (x is a positive integer less than or equal to 16).
→Ex) A subcarrier index of RU 18 is equal to a value obtained by multiplying a minus sign (−) to a sign of an RU 15 subcarrier index, that is, 154:259
Null subcarriers: ±{19, 126, 153, 260, 261, 368, 395, 502, 503, 530, 531, 638, 665, 772, 773, 880, 907, 1014, 1041, 1148, 1175, 1282, 1283, 1390, 1417, 1524, 1525, 1552, 1553, 1660, 1687, 1794, 1795, 1902, 1929, 2036}
<242 RU>

TABLE 94

| RU1 | RU2 | RU3 | RU4 |
|---|---|---|---|
| −2036:−1795 | −1794:−1553 | −1524:−1283 | −1282:−1041 |
| RU5 | RU6 | RU7 | RU8 |
| −1014:−773 | −772:−531 | −502:−261 | −260:−19 |

→RU9~RU16→ A subcarrier index of RU 8+x is equal to a value obtained by multiplying a minus sign (−) to a sign of an RU 9-x subcarrier index (x is a positive integer less than or equal to 8).
→Ex) A subcarrier index of RU 10 is equal to a value obtained by multiplying a minus sign (−) to a sign of an RU 7 subcarrier index, that is, 261:502
Null subcarriers: ±{503, 530, 1525, 1552}

<484 RU>

TABLE 95

| RU1 | RU2 | RU3 | RU4 |
|---|---|---|---|
| −2036:−1553 | −1524:−1041 | −1014:−531 | −502:−19 |

→RU5~RU8→ A subcarrier index of RU 4+x is equal to a value obtained by multiplying a minus sign (−) to a sign of an RU 5-x subcarrier index (x is a positive integer less than or equal to 4).
→Ex) A subcarrier index of RU 6 is equal to a value obtained by multiplying a minus sign (−) to a sign of an RU 3 subcarrier index, that is, 531:1014
Null subcarriers: ±{503, 530, 1525, 1552}
<996 RU>

TABLE 96

| RU1 | RU2 | RU3 | RU4 |
|---|---|---|---|
| −2036:−1041 | −1014:−19 | 19:1014 | 1041:2036 |

Null subcarriers: X
<2018 RU>

TABLE 97

| RU1 | RU2 |
|---|---|
| −2036:−19 | 19:2036 |

Null subcarriers: X

<4068 or 4066 or 4064 or 4062 RU for New 160 MHz Tone Plan>
4068RU: −2036:−3, 3:2036
4066RU: −2036:−4, 4:2036
4064RU: −2036:−5, 5:2036
4062RU: −2036:−6, 6:2036
Null subcarriers: X
Each RU and an index of a null tone are listed below in a case where 4062/4064/4066/4068RU is used in full band transmission, a tone plan of '12G+2018RU+13RU+11DC+13RU+2018RU+11G' is used, and the second configuration of 996RU is used.
<26 RU>

TABLE 98

| RU1 | RU2 | RU3 | RU4 | RU5 | RU6 | RU7 | RU8 | RU9 |
|---|---|---|---|---|---|---|---|---|
| −2034:−2009 | −2008:−1983 | −1980:−1955 | −1954:−1929 | −1927:−1902 | −1900:−1875 | −1874:−1849 | −1846:−1821 | −1820:−1795 |
| RU10 | RU11 | RU12 | RU13 | RU14 | RU15 | RU16 | RU17 | RU18 | RU19 |
| −1792:−1767 | −1766:−1741 | −1738:−1713 | −1712:−1687 | −1685:−1660 | −1658:−1633 | −1632:−1607 | −1604:−1579 | −1578:−1553 | −1551:−1526 |
| RU20 | RU21 | RU22 | RU23 | RU24 | RU25 | RU26 | RU27 | RU28 | |
| −1524:−1499 | −1498:−1473 | −1470:−1445 | −1444:−1419 | −1417:−1392 | −1390:−1365 | −1364:−1339 | −1336:−1311 | −1310:−1285 | |
| RU29 | RU30 | RU31 | RU32 | RU33 | RU34 | RU35 | RU36 | RU37 | RU38 |
| −1282:−1257 | −1256:−1231 | −1228:−1203 | −1202:−1177 | −1175:−1150 | −1148:−1123 | −1122:−1097 | −1094:−1069 | −1068:−1043 | −1040:−1015 |
| RU39 | RU40 | RU41 | RU42 | RU43 | RU44 | RU45 | RU46 | RU47 | |
| −1012:−987 | −986:−961 | −958:−933 | −932:−907 | −905:−880 | −878:−853 | −852:−827 | −824:−799 | −798:−773 | |
| RU48 | RU49 | RU50 | RU51 | RU52 | RU53 | RU54 | RU55 | RU56 | RU57 |
| −770:−745 | −744:−719 | −716:−691 | −690:−665 | −663:−638 | −636:−611 | −610:−585 | −582:−557 | −556:−531 | −529:−504 |
| RU58 | RU59 | RU60 | RU61 | RU62 | RU63 | RU64 | RU65 | RU66 | |
| −502:−477 | −476:−451 | −448:−423 | −422:−397 | −395:−370 | −368:−343 | −342:−317 | −314:−289 | −288:−263 | |
| RU67 | RU68 | RU69 | RU70 | RU71 | RU72 | RU73 | RU74 | RU75 | RU76 |
| −260:−235 | −234:−209 | −206:−181 | −180:−155 | −153:−128 | −126:−101 | −100:−75 | −72:−47 | −46:−21 | −18:−6, 6:18 |

→RU77~RU151→ A subcarrier index of RU 76+x is equal to a value obtained by multiplying a minus sign (−) to a sign of an RU 76-x subcarrier index (x is a positive integer less than or equal to 75).
→Ex) A subcarrier index of RU 77 is equal to a value obtained by multiplying a minus sign (−) to a sign of an RU 75 subcarrier index, that is, 21:46
Null subcarriers: ±{19, 20, 73, 74, 127, 154, 207, 208, 261, 262, 315, 316, 369, 396, 449, 450, 503, 530, 583, 584, 637, 664, 717, 718, 771, 772, 825, 826, 879, 906, 959, 960, 1013, 1014, 1041, 1042, 1095, 1096, 1149, 1176, 1229, 1230, 1283, 1284, 1337, 1338, 1391, 1418, 1471, 1472, 1525, 1552, 1605, 1606, 1659, 1686, 1739, 1740, 1793, 1794, 1847, 1848, 1901, 1928, 1981, 1982, 2035, 2036}

<52 RU>

TABLE 99

| RU1 | RU2 | RU3 | RU4 |
|---|---|---|---|
| −2034:−1983 | −1980:−1929 | −1900:−1849 | −1846:−1795 |
| RU5 | RU6 | RU7 | RU8 |
| −1792:−1741 | −1738:−1687 | −1658:−1607 | −1604:−1553 |
| RU9 | RU10 | RU11 | RU12 |
| −1524:−1473 | −1470:−1419 | −1390:−1339 | −1336:−1285 |
| RU13 | RU14 | RU15 | RU16 |
| −1282:−1231 | −1228:−1177 | −1148:−1097 | −1094:−1043 |
| RU17 | RU18 | RU19 | RU20 |
| −1012:−961 | −958:−907 | −878:−827 | −824:−773 |
| RU21 | RU22 | RU23 | RU24 |
| −770:−719 | −716:−665 | −636:−585 | −582:−531 |
| RU25 | RU26 | RU27 | RU28 |
| −502:−451 | −448:−397 | −368:−317 | −314:−263 |
| RU29 | RU30 | RU31 | RU32 |
| −260:−209 | −206:−155 | −126:−75 | −72:−21 |

→RU33~RU64→ A subcarrier index of RU 32+x is equal to a value obtained by multiplying a minus sign (−) to a sign of an RU 33-x subcarrier index (x is a positive integer less than or equal to 32).

→Ex) A subcarrier index of RU 34 is equal to a value obtained by multiplying a minus sign (−) to a sign of an RU 31 subcarrier index, that is, 75:126

Null subcarriers: ±{19, 20, 73, 74, 127, 154, 207, 208, 261, 262, 315, 316, 369, 396, 449, 450, 503, 530, 583, 584, 637, 664, 717, 718, 771, 772, 825, 826, 879, 906, 959, 960, 1013, 1014, 1041, 1042, 1095, 1096, 1149, 1176, 1229, 1230, 1283, 1284, 1337, 1338, 1391, 1418, 1471, 1472, 1525, 1552, 1605, 1606, 1659, 1686, 1739, 1740, 1793, 1794, 1847, 1848, 1901, 1928, 1981, 1982, 2035, 2036}

<106 RU>

TABLE 100

| RU1 | RU2 | RU3 | RU4 |
|---|---|---|---|
| −2034:−1929 | −1900:−1795 | −1792:−1687 | −1658:−1553 |
| RU5 | RU6 | RU7 | RU8 |
| −1524:−1419 | −1390:−1285 | −1282:−1177 | −1148:−1043 |
| RU9 | RU10 | RU11 | RU12 |
| −1012:−907 | −878:−773 | −770:−665 | −636:−531 |
| RU13 | RU14 | RU15 | RU16 |
| −502:−397 | −368:−263 | −260:−155 | −126:−21 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 155:260

Null subcarriers: ±{19, 20, 127, 154, 261, 262, 369, 396, 503, 530, 637, 664, 771, 772, 879, 906, 1013, 1014, 1041, 1042, 1149, 1176, 1283, 1284, 1391, 1418, 1525, 1552, 1659, 1686, 1793, 1794, 1901, 1928, 2035, 2036}

<242 RU>

TABLE 101

| RU1 | RU2 | RU3 | RU4 |
|---|---|---|---|
| −2035:−1794 | −1793:−1552 | −1525:−1284 | −1283:−1042 |
| RU5 | RU6 | RU7 | RU8 |
| −1013:−772 | −771:−530 | −503:−262 | −261:−20 |

→RU9~RU16→ A subcarrier index of RU 8+x is equal to a value obtained by multiplying a minus sign (−) to a sign of an RU 9-x subcarrier index (x is a positive integer less than or equal to 8).

→Ex) A subcarrier index of RU 10 is equal to a value obtained by multiplying a minus sign (−) to a sign of an RU 7 subcarrier index, that is, 262:503

Null subcarriers: ±{19, 1014, 1041, 2036}

<484 RU>

TABLE 102

| RU1 | RU2 | RU3 | RU4 |
|---|---|---|---|
| −2035:−1552 | −1525:−1042 | −1013:−530 | −503:−20 |

→RU5~RU8→ A subcarrier index of RU 4+x is equal to a value obtained by multiplying a minus sign (−) to a sign of an RU 5-x subcarrier index (x is a positive integer less than or equal to 4).

→Ex) A subcarrier index of RU 6 is equal to a value obtained by multiplying a minus sign (−) to a sign of an RU 3 subcarrier index, that is, 530:1013

Null subcarriers: ±{19, 1014, 1041, 2036}

<996 RU>

TABLE 103

| RU1 | RU2 | RU3 | RU4 |
|---|---|---|---|
| −2036:−1041 | −1014:−19 | 19:1014 | 1041:2036 |

Null subcarriers: X

<2018 RU>

TABLE 104

| RU1 | RU2 |
|---|---|
| −2036:−19 | 19:2036 |

Null subcarriers: X

<4068 or 4066 or 4064 or 4062 RU for New 160 MHz Tone Plan>

4068RU: −2036:−3, 3:2036

4066RU: −2036:−4, 4:2036

4064RU: −2036:−5, 5:2036

4062RU: −2036:−6, 6:2036

Null subcarriers: X

Each RU and an index of a null tone are listed below in a case where 4062/4064/4066/4068RU is used in full band transmission, a tone plan of '12G+2018RU+1N+13RU+9DC+13RU+1N+2018RU+11G' is used, and the first configuration of 996RU is used.

<26 RU>

TABLE 105

| RU1 | RU2 | RU3 | RU4 | RU5 | RU6 | RU7 | RU8 | RU9 | |
|---|---|---|---|---|---|---|---|---|---|
| −2035:−2010 | −2009:−1984 | −1981:−1956 | −1955:−1930 | −1928:−1903 | −1901:−1876 | −1875:−1850 | −1847:−1822 | −1821:−1796 | |
| RU10 | RU11 | RU12 | RU13 | RU14 | RU15 | RU16 | RU17 | RU18 | RU19 |
| −1793:−1768 | −1767:−1742 | −1739:−1714 | −1713:−1688 | −1686:−1661 | −1659:−1634 | −1633:−1608 | −1605:−1580 | −1579:−1554 | −1551:−1526 |
| RU20 | RU21 | RU22 | RU23 | RU24 | RU25 | RU26 | RU27 | RU28 | |
| −1523:−1498 | −1497:−1472 | −1469:−1444 | −1443:−1418 | −1416:−1391 | 1389:−1364 | −1363:−1338 | −1335:−1310 | −1309:−1284 | |
| RU29 | RU30 | RU31 | RU32 | RU33 | RU34 | RU35 | RU36 | RU37 | RU38 |
| −1281:−1256 | −1255:−1230 | −1227:−1202 | −1201:−1176 | −1174:−1149 | −1147:−1122 | −1121:−1096 | −1093:−1068 | −1067:−1042 | −1040:−1015 |
| RU39 | RU40 | RU41 | RU42 | RU43 | RU44 | RU45 | RU46 | RU47 | |
| −1013:−988 | −987:−962 | −959:−934 | −933:−908 | −906:−881 | −879:−854 | −853:−828 | −825:−800 | −799:−774 | |
| RU48 | RU49 | RU50 | RU51 | RU52 | RU53 | RU54 | RU55 | RU56 | RU57 |
| −771:−746 | −745:−720 | −717:−692 | −691:−666 | −664:−639 | −637:−612 | −611:−586 | −583:−558 | −557:−532 | −529:−504 |
| RU58 | RU59 | RU60 | RU61 | RU62 | RU63 | RU64 | RU65 | RU66 | |
| −501:−476 | −475:−450 | −447:−422 | −421:−396 | −394:−369 | −367:−342 | −341:−316 | −313:−288 | −287:−262 | |
| RU67 | RU68 | RU69 | RU70 | RU71 | RU72 | RU73 | RU74 | RU75 | RU76 |
| −259:−234 | −233:−208 | −205:−180 | −179:−154 | −152:−127 | −125:−100 | −99:−74 | −71:−46 | −45:−20 | −17:−5, 5:17 |

→RU77~RU151→ A subcarrier index of RU 76+x is equal to a value obtained by multiplying a minus sign (−) to a sign of an RU 76-x subcarrier index (x is a positive integer less than or equal to 75).

→Ex) A subcarrier index of RU 77 is equal to a value obtained by multiplying a minus sign (−) to a sign of an RU 75 subcarrier index, that is, 20:45

Null subcarriers: ±{18, 19, 72, 73, 126, 153, 206, 207, 260, 261, 314, 315, 368, 395, 448, 449, 502, 503, 530, 531, 584, 585, 638, 665, 718, 719, 772, 773, 826, 827, 880, 907, 960, 961, 1014, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}

<52 RU>

TABLE 106

| RU1 | RU2 | RU3 | RU4 |
|---|---|---|---|
| −2035:−1984 | −1981:−1930 | −1901:−1850 | −1847:−1796 |
| RU5 | RU6 | RU7 | RU8 |
| −1793:−1742 | −1739:−1688 | −1659:−1608 | −1605:−1554 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1013:−962 | −959:−908 | −879:−828 | −825:−774 |
| RU21 | RU22 | RU23 | RU24 |
| −771:−720 | −717:−666 | −637:−586 | −583:−532 |
| RU25 | RU26 | RU27 | RU28 |
| −501:−450 | −447:−396 | −367:−316 | −313:−262 |
| RU29 | RU30 | RU31 | RU32 |
| −259:−208 | −205:−154 | −125:−74 | −71:−20 |

→RU33~RU64→ A subcarrier index of RU 32+x is equal to a value obtained by multiplying a minus sign (−) to a sign of an RU 33-x subcarrier index (x is a positive integer less than or equal to 32).

→Ex) A subcarrier index of RU 34 is equal to a value obtained by multiplying a minus sign (−) to a sign of an RU 31 subcarrier index, that is, 74:125

Null subcarriers: ±{18, 19, 72, 73, 126, 153, 206, 207, 260, 261, 314, 315, 368, 395, 448, 449, 502, 503, 530, 531, 584, 585, 638, 665, 718, 719, 772, 773, 826, 827, 880, 907, 960, 961, 1014, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}

<106 RU>

TABLE 107

| RU1 | RU2 | RU3 | RU4 |
|---|---|---|---|
| −2035:−1930 | −1901:−1796 | −1793:−1688 | −1659:−1554 |
| RU5 | RU6 | RU7 | RU8 |
| −1523:−1418 | −1389:−1284 | −1281:−1176 | −1147:−1042 |
| RU9 | RU10 | RU11 | RU12 |
| −1013:−908 | −879:−774 | −771:−666 | −637:−532 |
| RU13 | RU14 | RU15 | RU16 |
| −501:−396 | −367:−262 | −259:−154 | −125:−20 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 154:259

Null subcarriers: ±{18, 19, 126, 153, 260, 261, 368, 395, 502, 503, 530, 531, 638, 665, 772, 773, 880, 907, 1014, 1041, 1148, 1175, 1282, 1283, 1390, 1417, 1524, 1525, 1552, 1553, 1660, 1687, 1794, 1795, 1902, 1929, 2036}

<242 RU>

TABLE 108

| RU1 | RU2 | RU3 | RU4 |
|---|---|---|---|
| −2036:−1795 | −1794:−1553 | −1524:−1283 | −1282:−1041 |
| RU5 | RU6 | RU7 | RU8 |
| −1014:−773 | −772:−531 | −502:−261 | −260:−19 |

→RU9~RU16→ A subcarrier index of RU 8+x is equal to a value obtained by multiplying a minus sign (−) to a sign of an RU 9-x subcarrier index (x is a positive integer less than or equal to 8).

→Ex) A subcarrier index of RU 10 is equal to a value obtained by multiplying a minus sign (−) to a sign of an RU 7 subcarrier index, that is, 261:502

Null subcarriers: ±{18, 503, 530, 1525, 1552}

<484 RU>

TABLE 109

| RU1 | RU2 | RU3 | RU4 |
|---|---|---|---|
| −2036:−1553 | −1524:−1041 | −1014:−531 | −502:−19 |

→RU5~RU8→ A subcarrier index of RU 4+x is equal to a value obtained by multiplying a minus sign (−) to a sign of an RU 5-x subcarrier index (x is a positive integer less than or equal to 4).

→Ex) A subcarrier index of RU 6 is equal to a value obtained by multiplying a minus sign (−) to a sign of an RU 3 subcarrier index, that is, 531:1014

Null subcarriers: ±{18, 503, 530, 1525, 1552}

<996 RU>

TABLE 110

| RU1 | RU2 | RU3 | RU4 |
|---|---|---|---|
| −2036:−1041 | −1014:−19 | 19:1014 | 1041:2036 |

Null subcarriers: ±{18}

<2018 RU>

TABLE 111

| RU1 | RU2 |
|---|---|
| −2036:−19 | 19:2036 |

Null subcarriers: ±{18}

<4068 or 4066 or 4064 or 4062 RU for New 160 MHz Tone Plan>

4068RU: −2036:−3, 3:2036
4066RU: −2036:−4, 4:2036
4064RU: −2036:−5, 5:2036
4062RU: −2036:−6, 6:2036

Null subcarriers: X

Each RU and an index of a null tone are listed below in a case where 4062/4064/4066/4068RU is used in full band transmission, a tone plan of '12G+2018RU+1N+13RU+9DC+13RU+1N+2018RU+11G' is used, and the second configuration of 996RU is used.

<26 RU>

TABLE 112

| RU1 | RU2 | RU3 | RU4 | RU5 | RU6 | RU7 | RU8 | RU9 |
|---|---|---|---|---|---|---|---|---|
| −2034:−2009 | −2008:−1983 | −1980:−1955 | −1954:−1929 | −1927:−1902 | −1900:−1875 | −1874:−1849 | −1846:−1821 | −1820:−1795 |
| RU10 | RU11 | RU12 | RU13 | RU14 | RU15 | RU16 | RU17 | RU18 | RU19 |
| −1792:−1767 | −1766:−1741 | −1738:−1713 | −1712:−1687 | −1685:−1660 | −1658:−1633 | −1632:−1607 | −1604:−1579 | −1578:−1553 | −1551:−1526 |
| RU20 | RU21 | RU22 | RU23 | RU24 | RU25 | RU26 | RU27 | RU28 |
| −1524:−1499 | −1498:−1473 | −1470:−1445 | −1444:−1419 | −1417:−1392 | −1390:−1365 | −1364:−1339 | −1336:−1311 | −1310:−1285 |
| RU29 | RU30 | RU31 | RU32 | RU33 | RU34 | RU35 | RU36 | RU37 | RU38 |
| −1282:−1257 | −1256:−1231 | −1228:−1203 | −1202:−1177 | −1175:−1150 | −1148:−1123 | −1122:−1097 | −1094:−1069 | −1068:−1043 | −1040:−1015 |
| RU39 | RU40 | RU41 | RU42 | RU43 | RU44 | RU45 | RU46 | RU47 |
| −1012:−987 | −986:−961 | −958:−933 | −932:−907 | −905:−880 | −878:−853 | −852:−827 | −824:−799 | −798:−773 |
| RU48 | RU49 | RU50 | RU51 | RU52 | RU53 | RU54 | RU55 | RU56 | RU57 |
| −770:−745 | −744:−719 | −716:−691 | −690:−665 | −663:−638 | −636:−611 | −610:−585 | −582:−557 | −556:−531 | −529:−504 |
| RU58 | RU59 | RU60 | RU61 | RU62 | RU63 | RU64 | RU65 | RU66 |
| −502:−477 | −476:−451 | −448:−423 | −422:−397 | −395:−370 | −368:−343 | −342:−317 | −314:−289 | −288:−263 |
| RU67 | RU68 | RU69 | RU70 | RU71 | RU72 | RU73 | RU74 | RU75 | RU76 |
| −260:−235 | −234:−209 | −206:−181 | −180:−155 | −153:−128 | −126:−101 | −100:−75 | −72:−47 | −46:−21 | −17:−5, 5:17 |

→RU77~RU151→ A subcarrier index of RU 76+x is equal to a value obtained by multiplying a minus sign (−) to a sign of an RU 76-x subcarrier index (x is a positive integer less than or equal to 75).

→Ex) A subcarrier index of RU 77 is equal to a value obtained by multiplying a minus sign (−) to a sign of an RU 75 subcarrier index, that is, 21:46

Null subcarriers: ±{18, 19, 20, 73, 74, 127, 154, 207, 208, 261, 262, 315, 316, 369, 396, 449, 450, 503, 530, 583, 584, 637, 664, 717, 718, 771, 772, 825, 826, 879, 906, 959, 960, 1013, 1014, 1041, 1042, 1095, 1096, 1149, 1176, 1229, 1230, 1283, 1284, 1337, 1338, 1391, 1418, 1471, 1472, 1525, 1552, 1605, 1606, 1659, 1686, 1739, 1740, 1793, 1794, 1847, 1848, 1901, 1928, 1981, 1982, 2035, 2036}

<52 RU>

TABLE 113

| RU1 | RU2 | RU3 | RU4 |
|---|---|---|---|
| −2034:−1983 | −1980:−1929 | −1900:−1849 | −1846:−1795 |
| RU5 | RU6 | RU7 | RU8 |
| −1792:−1741 | −1738:−1687 | −1658:−1607 | −1604:−1553 |
| RU9 | RU10 | RU11 | RU12 |
| −1524:−1473 | −1470:−1419 | −1390:−1339 | −1336:−1285 |
| RU13 | RU14 | RU15 | RU16 |
| −1282:−1231 | −1228:−1177 | −1148:−1097 | −1094:−1043 |
| RU17 | RU18 | RU19 | RU20 |
| −1012:−961 | −958:−907 | −878:−827 | −824:−773 |
| RU21 | RU22 | RU23 | RU24 |
| −770:−719 | −716:−665 | −636:−585 | −582:−531 |
| RU25 | RU26 | RU27 | RU28 |
| −502:−451 | −448:−397 | −368:−317 | −314:−263 |
| RU29 | RU30 | RU31 | RU32 |
| −260:−209 | −206:−155 | −126:−75 | −72:−21 |

→RU33~RU64→ A subcarrier index of RU 32+x is equal to a value obtained by multiplying a minus sign (−) to a sign of an RU 33-x subcarrier index (x is a positive integer less than or equal to 32).

→Ex) A subcarrier index of RU 34 is equal to a value obtained by multiplying a minus sign (−) to a sign of an RU 31 subcarrier index, that is, 75:126

Null subcarriers: ±{18, 19, 20, 73, 74, 127, 154, 207, 208, 261, 262, 315, 316, 369, 396, 449, 450, 503, 530, 583, 584, 637, 664, 717, 718, 771, 772, 825, 826, 879, 906, 959, 960, 1013, 1014, 1041, 1042, 1095, 1096, 1149, 1176, 1229, 1230, 1283, 1284, 1337, 1338, 1391, 1418, 1471, 1472, 1525, 1552, 1605, 1606, 1659, 1686, 1739, 1740, 1793, 1794, 1847, 1848, 1901, 1928, 1981, 1982, 2035, 2036}

<106 RU>

TABLE 114

| RU1 | RU2 | RU3 | RU4 |
|---|---|---|---|
| −2034:−1929 | −1900:−1795 | −1792:−1687 | −1658:−1553 |
| RU5 | RU6 | RU7 | RU8 |
| −1524:−1419 | −1390:−1285 | −1282:−1177 | −1148:−1043 |
| RU9 | RU10 | RU11 | RU12 |
| −1012:−907 | −878:−773 | −770:−665 | −636:−531 |
| RU13 | RU14 | RU15 | RU16 |
| −502:−397 | −368:−263 | −260:−155 | −126:−21 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (–) to a sign of an RU 15 subcarrier index, that is, 155:260

Null subcarriers: ±{18, 19, 20, 127, 154, 261, 262, 369, 396, 503, 530, 637, 664, 771, 772, 879, 906, 1013, 1014, 1041, 1042, 1149, 1176, 1283, 1284, 1391, 1418, 1525, 1552, 1659, 1686, 1793, 1794, 1901, 1928, 2035, 2036}

<242 RU>

TABLE 115

| RU1 | RU2 | RU3 | RU4 |
|---|---|---|---|
| −2035:−1794 | −1793:−1552 | −1525:−1284 | −1283:−1042 |
| RU5 | RU6 | RU7 | RU8 |
| −1013:−772 | −771:−530 | −503:−262 | −261:−20 |

→RU9~RU16→ A subcarrier index of RU 8+x is equal to a value obtained by multiplying a minus sign (–) to a sign of an RU 9-x subcarrier index (x is a positive integer less than or equal to 8).

→Ex) A subcarrier index of RU 10 is equal to a value obtained by multiplying a minus sign (–) to a sign of an RU 7 subcarrier index, that is, 262:503

Null subcarriers: ±{18, 19, 1014, 1041, 2036}

<484 RU>

TABLE 116

| RU1 | RU2 | RU3 | RU4 |
|---|---|---|---|
| −2035:−1552 | −1525:−1042 | −1013:−530 | −503:−20 |

→RU5~RU8→ A subcarrier index of RU 4+x is equal to a value obtained by multiplying a minus sign (–) to a sign of an RU 5-x subcarrier index (x is a positive integer less than or equal to 4).

→Ex) A subcarrier index of RU 6 is equal to a value obtained by multiplying a minus sign (–) to a sign of an RU 3 subcarrier index, that is, 530:1013

Null subcarriers: ±{18, 19, 1014, 1041, 2036}

<996 RU>

TABLE 117

| RU1 | RU2 | RU3 | RU4 |
|---|---|---|---|
| −2036:−1041 | −1014:−19 | 19:1014 | 1041:2036 |

Null subcarriers: ±{18}

<2018 RU>

TABLE 118

| RU1 | RU2 |
|---|---|
| −2036:−19 | 19:2036 |

Null subcarriers: ±{18}

<4068 or 4066 or 4064 or 4062 RU for New 160 MHz Tone Plan>

4068RU: −2036:−3, 3:2036
4066RU: −2036:−4, 4:2036
4064RU: −2036:−5, 5:2036
4062RU: −2036:−6, 6:2036

Null subcarriers: X

Each RU and an index of a null tone are listed below in a case where 4062/4064/4066/4068RU is used in full band transmission, a tone plan of '12G+2018RU+2N+13RU+7DC+13RU+2N+2018RU+11G' is used, and the first configuration of 996RU is used.

<26 RU>

TABLE 119

| RU1 | RU2 | RU3 | RU4 | RU5 | RU6 | RU7 | RU8 | RU9 |
|---|---|---|---|---|---|---|---|---|
| −2035:−2010 | −2009:−1984 | −1981:−1956 | −1955:−1930 | −1928:−1903 | −1901:−1876 | −1875:−1850 | −1847:−1822 | −1821:−1796 |
| RU10 | RU11 | RU12 | RU13 | RU14 | RU15 | RU16 | RU17 | RU18 | RU19 |
| −1793:−1768 | −1767:−1742 | −1739:−1714 | −1713:−1688 | −1686:−1661 | −1659:−1634 | −1633:−1608 | −1605:−1580 | −1579:−1554 | −1551:−1526 |
| RU20 | RU21 | RU22 | RU23 | RU24 | RU25 | RU26 | RU27 | RU28 | |
| −1523:−1498 | −1497:−1472 | −1469:−1444 | −1443:−1418 | −1416:−1391 | 1389:−1364 | −1363:−1338 | −1335:−1310 | −1309:−1284 | |
| RU29 | RU30 | RU31 | RU32 | RU33 | RU34 | RU35 | RU36 | RU37 | RU38 |
| −1281:−1256 | −1255:−1230 | −1227:−1202 | −1201:−1176 | −1174:−1149 | −1147:−1122 | −1121:−1096 | −1093:−1068 | −1067:−1042 | −1040:−1015 |
| RU39 | RU40 | RU41 | RU42 | RU43 | RU44 | RU45 | RU46 | RU47 | |
| −1013:−988 | −987:−962 | −959:−934 | −933:−908 | −906:−881 | −879:−854 | −853:−828 | −825:−800 | −799:−774 | |
| RU48 | RU49 | RU50 | RU51 | RU52 | RU53 | RU54 | RU55 | RU56 | RU57 |
| −771:−746 | −745:−720 | −717:−692 | −691:−666 | −664:−639 | −637:−612 | −611:−586 | −583:−558 | −557:−532 | −529:−504 |
| RU58 | RU59 | RU60 | RU61 | RU62 | RU63 | RU64 | RU65 | RU66 | |
| −501:−476 | −475:−450 | −447:−422 | −421:−396 | −394:−369 | −367:−342 | −341:−316 | −313:−288 | −287:−262 | |
| RU67 | RU68 | RU69 | RU70 | RU71 | RU72 | RU73 | RU74 | RU75 | RU76 |
| −259:−234 | −233:−208 | −205:−180 | −179:−154 | −152:−127 | −125:−100 | −99:−74 | −71:−46 | −45:−20 | −16:−4, 4:16 |

→RU77~RU151→ A subcarrier index of RU 76+x is equal to a value obtained by multiplying a minus sign (–) to a sign of an RU 76-x subcarrier index (x is a positive integer less than or equal to 75).

→Ex) A subcarrier index of RU 77 is equal to a value obtained by multiplying a minus sign (–) to a sign of an RU 75 subcarrier index, that is, 20:45

Null subcarriers: ±{17, 18, 19, 72, 73, 126, 153, 206, 207, 260, 261, 314, 315, 368, 395, 448, 449, 502, 503, 530, 531, 584, 585, 638, 665, 718, 719, 772, 773, 826, 827, 880, 907, 960, 961, 1014, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}

<52 RU>

TABLE 120

| RU1 | RU2 | RU3 | RU4 |
|---|---|---|---|
| −2035:−1984 | −1981:−1930 | −1901:−1850 | −1847:−1796 |
| RU5 | RU6 | RU7 | RU8 |
| −1793:−1742 | −1739:−1688 | −1659:−1608 | −1605:−1554 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1013:−962 | −959:−908 | −879:−828 | −825:−774 |
| RU21 | RU22 | RU23 | RU24 |
| −771:−720 | −717:−666 | −637:−586 | −583:−532 |

TABLE 120-continued

| RU25 | RU26 | RU27 | RU28 |
|---|---|---|---|
| −501:−450 | −447:−396 | −367:−316 | −313:−262 |
| RU29 | RU30 | RU31 | RU32 |
| −259:−208 | −205:−154 | −125:−74 | −71:−20 |

→RU33~RU64→ A subcarrier index of RU 32+x is equal to a value obtained by multiplying a minus sign (−) to a sign of an RU 33-x subcarrier index (x is a positive integer less than or equal to 32).

→Ex) A subcarrier index of RU 34 is equal to a value obtained by multiplying a minus sign (−) to a sign of an RU 31 subcarrier index, that is, 74:125

Null subcarriers: ±{17, 18, 19, 72, 73, 126, 153, 206, 207, 260, 261, 314, 315, 368, 395, 448, 449, 502, 503, 530, 531, 584, 585, 638, 665, 718, 719, 772, 773, 826, 827, 880, 907, 960, 961, 1014, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}

<106 RU>

TABLE 121

| RU1 | RU2 | RU3 | RU4 |
|---|---|---|---|
| −2035:−1930 | −1901:−1796 | −1793:−1688 | −1659:−1554 |
| RU5 | RU6 | RU7 | RU8 |
| −1523:−1418 | −1389:−1284 | −1281:−1176 | −1147:−1042 |
| RU9 | RU10 | RU11 | RU12 |
| −1013:−908 | −879:−774 | −771:−666 | −637:−532 |
| RU13 | RU14 | RU15 | RU16 |
| −501:−396 | −367:−262 | −259:−154 | −125:−20 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 154:259

Null subcarriers: ±{17, 18, 19, 126, 153, 260, 261, 368, 395, 502, 503, 530, 531, 638, 665, 772, 773, 880, 907, 1014, 1041, 1148, 1175, 1282, 1283, 1390, 1417, 1524, 1525, 1552, 1553, 1660, 1687, 1794, 1795, 1902, 1929, 2036}

<242 RU>

TABLE 122

| RU1 | RU2 | RU3 | RU4 |
|---|---|---|---|
| −2036:−1795 | −1794:−1553 | −1524:−1283 | −1282:−1041 |
| RU5 | RU6 | RU7 | RU8 |
| −1014:−773 | −772:−531 | −502:−261 | −260:−19 |

→RU9~RU16→ A subcarrier index of RU 8+x is equal to a value obtained by multiplying a minus sign (−) to a sign of an RU 9-x subcarrier index (x is a positive integer less than or equal to 8).

→Ex) A subcarrier index of RU 10 is equal to a value obtained by multiplying a minus sign (−) to a sign of an RU 7 subcarrier index, that is, 261:502

Null subcarriers: ±{17, 18, 503, 530, 1525, 1552}

<484 RU>

TABLE 123

| RU1 | RU2 | RU3 | RU4 |
|---|---|---|---|
| −2036:−1553 | −1524:−1041 | −1014:−531 | −502:−19 |

→RU5~RU8→ A subcarrier index of RU 4+x is equal to a value obtained by multiplying a minus sign (−) to a sign of an RU 5-x subcarrier index (x is a positive integer less than or equal to 4).

→Ex) A subcarrier index of RU 6 is equal to a value obtained by multiplying a minus sign (−) to a sign of an RU 3 subcarrier index, that is, 531:1014

Null subcarriers: ±{17, 18, 503, 530, 1525, 1552}

<996 RU>

TABLE 124

| RU1 | RU2 | RU3 | RU4 |
|---|---|---|---|
| −2036:−1041 | −1014:−19 | 19:1014 | 1041:2036 |

Null subcarriers: ±{17, 18}

<2018 RU>

TABLE 125

| RU1 | RU2 |
|---|---|
| −2036:−19 | 19:2036 |

Null subcarriers: ±{17, 18}

<4068 or 4066 or 4064 or 4062 RU for New 160 MHz Tone Plan>

4068RU: −2036:−3, 3:2036

4066RU: −2036:−4, 4:2036

4064RU: −2036:−5, 5:2036

4062RU: −2036:−6, 6:2036

Null subcarriers: X

Each RU and an index of a null tone are listed below in a case where 4062/4064/4066/4068RU is used in full band transmission, a tone plan of '12G+2018RU+2N+13RU+7DC+13RU+2N+2018RU+11G' is used, and the second configuration of 996RU is used.

<26 RU>

TABLE 126

| RU1 | RU2 | RU3 | RU4 | RU5 | RU6 | RU7 | RU8 | RU9 |
|---|---|---|---|---|---|---|---|---|
| −2034:−2009 | −2008:−1983 | −1980:−1955 | −1954:−1929 | −1927:−1902 | −1900:−1875 | −1874:−1849 | −1846:−1821 | −1820:−1795 |
| RU10 | RU11 | RU12 | RU13 | RU14 | RU15 | RU16 | RU17 | RU18 | RU19 |
| −1792:−1767 | −1766:−1741 | −1738:−1713 | −1712:−1687 | −1685:−1660 | −1658:−1633 | −1632:−1607 | −1604:−1579 | −1578:−1553 | −1551:−1526 |
| RU20 | RU21 | RU22 | RU23 | RU24 | RU25 | RU26 | RU27 | RU28 | |
| −1524:−1499 | −1498:−1473 | −1470:−1445 | −1444:−1419 | −1417:−1392 | −1390:−1365 | −1364:−1339 | −1336:−1311 | −1310:−1285 | |
| RU29 | RU30 | RU31 | RU32 | RU33 | RU34 | RU35 | RU36 | RU37 | RU38 |
| −1282:−1257 | −1256:−1231 | −1228:−1203 | −1202:−1177 | −1175:−1150 | −1148:−1123 | −1122:−1097 | −1094:−1069 | −1068:−1043 | −1040:−1015 |
| RU39 | RU40 | RU41 | RU42 | RU43 | RU44 | RU45 | RU46 | RU47 | |
| −1012:−987 | −986:−961 | −958:−933 | −932:−907 | −905:−880 | −878:−853 | −852:−827 | −824:−799 | −798:−773 | |
| RU48 | RU49 | RU50 | RU51 | RU52 | RU53 | RU54 | RU55 | RU56 | RU57 |
| −770:−745 | −744:−719 | −716:−691 | −690:−665 | −663:−638 | −636:−611 | −610:−585 | −582:−557 | −556:−531 | −529:−504 |

TABLE 126-continued

| RU58 | RU59 | RU60 | RU61 | RU62 | RU63 | RU64 | RU65 | RU66 | |
|---|---|---|---|---|---|---|---|---|---|
| −502:−477 | −476:−451 | −448:−423 | −422:−397 | −395:−370 | −368:−343 | −342:−317 | −314:−289 | −288:−263 | |
| RU67 | RU68 | RU69 | RU70 | RU71 | RU72 | RU73 | RU74 | RU75 | RU76 |
| −260:−235 | −234:−209 | −206:−181 | −180:−155 | −153:−128 | −126:−101 | −100:−75 | −72:−47 | −46:−21 | −16:−4, 4:16 |

→RU77~RU151→ A subcarrier index of RU 76+x is equal to a value obtained by multiplying a minus sign (−) to a sign of an RU 76-x subcarrier index (x is a positive integer less than or equal to 75).
→Ex) A subcarrier index of RU 77 is equal to a value obtained by multiplying a minus sign (−) to a sign of an RU 75 subcarrier index, that is, 21:46

Null subcarriers: ±{17, 18, 19, 20, 73, 74, 127, 154, 207, 208, 261, 262, 315, 316, 369, 396, 449, 450, 503, 530, 583, 584, 637, 664, 717, 718, 771, 772, 825, 826, 879, 906, 959, 960, 1013, 1014, 1041, 1042, 1095, 1096, 1149, 1176, 1229, 1230, 1283, 1284, 1337, 1338, 1391, 1418, 1471, 1472, 1525, 1552, 1605, 1606, 1659, 1686, 1739, 1740, 1793, 1794, 1847, 1848, 1901, 1928, 1981, 1982, 2035, 2036}
<52 RU>

TABLE 127

| RU1 | RU2 | RU3 | RU4 |
|---|---|---|---|
| −2034:−1983 | −1980:−1929 | −1900:−1849 | −1846:−1795 |
| RU5 | RU6 | RU7 | RU8 |
| −1792:−1741 | −1738:−1687 | −1658:−1607 | −1604:−1553 |
| RU9 | RU10 | RU11 | RU12 |
| −1524:−1473 | −1470:−1419 | −1390:−1339 | −1336:−1285 |
| RU13 | RU14 | RU15 | RU16 |
| −1282:−1231 | −1228:−1177 | −1148:−1097 | −1094:−1043 |
| RU17 | RU18 | RU19 | RU20 |
| −1012:−961 | −958:−907 | −878:−827 | −824:−773 |
| RU21 | RU22 | RU23 | RU24 |
| −770:−719 | −716:−665 | −636:−585 | −582:−531 |
| RU25 | RU26 | RU27 | RU28 |
| −502:−451 | −448:−397 | −368:−317 | −314:−263 |
| RU29 | RU30 | RU31 | RU32 |
| −260:−209 | −206:−155 | −126:−75 | −72:−21 |

→RU33~RU64→ A subcarrier index of RU 32+x is equal to a value obtained by multiplying a minus sign (−) to a sign of an RU 33-x subcarrier index (x is a positive integer less than or equal to 32).
→Ex) A subcarrier index of RU 34 is equal to a value obtained by multiplying a minus sign (−) to a sign of an RU 31 subcarrier index, that is, 75:126

Null subcarriers: ±{17, 18, 19, 20, 73, 74, 127, 154, 207, 208, 261, 262, 315, 316, 369, 396, 449, 450, 503, 530, 583, 584, 637, 664, 717, 718, 771, 772, 825, 826, 879, 906, 959, 960, 1013, 1014, 1041, 1042, 1095, 1096, 1149, 1176, 1229, 1230, 1283, 1284, 1337, 1338, 1391, 1418, 1471, 1472, 1525, 1552, 1605, 1606, 1659, 1686, 1739, 1740, 1793, 1794, 1847, 1848, 1901, 1928, 1981, 1982, 2035, 2036}
<106 RU>

TABLE 128

| RU1 | RU2 | RU3 | RU4 |
|---|---|---|---|
| −2034:−1929 | −1900:−1795 | −1792:−1687 | −1658:−1553 |
| RU5 | RU6 | RU7 | RU8 |
| −1524:−1419 | −1390:−1285 | −1282:−1177 | −1148:−1043 |
| RU9 | RU10 | RU11 | RU12 |
| −1012:−907 | −878:−773 | −770:−665 | −636:−531 |
| RU13 | RU14 | RU15 | RU16 |
| −502:−397 | −368:−263 | −260:−155 | −126:−21 |

→RU17~RU32→ A subcarrier index of RU 16+x is equal to a value obtained by multiplying a minus sign (−) to a sign of an RU 17-x subcarrier index (x is a positive integer less than or equal to 16).
→Ex) A subcarrier index of RU 18 is equal to a value obtained by multiplying a minus sign (−) to a sign of an RU 15 subcarrier index, that is, 155:260

Null subcarriers: ±{17, 18, 19, 20, 127, 154, 261, 262, 369, 396, 503, 530, 637, 664, 771, 772, 879, 906, 1013, 1014, 1041, 1042, 1149, 1176, 1283, 1284, 1391, 1418, 1525, 1552, 1659, 1686, 1793, 1794, 1901, 1928, 2035, 2036}
<242 RU>

TABLE 129

| RU1 | RU2 | RU3 | RU4 |
|---|---|---|---|
| −2035:−1794 | −1793:−1552 | −1525:−1284 | −1283:−1042 |
| RU5 | RU6 | RU7 | RU8 |
| −1013:−772 | −771:−530 | −503:−262 | −261:−20 |

→RU9~RU16→ A subcarrier index of RU 8+x is equal to a value obtained by multiplying a minus sign (−) to a sign of an RU 9-x subcarrier index (x is a positive integer less than or equal to 8).
→Ex) A subcarrier index of RU 10 is equal to a value obtained by multiplying a minus sign (−) to a sign of an RU 7 subcarrier index, that is, 262:503

Null subcarriers: ±{17, 18, 19, 1014, 1041, 2036}
<484 RU>

TABLE 130

| RU1 | RU2 | RU3 | RU4 |
|---|---|---|---|
| −2035:−1552 | −1525:−1042 | −1013:−530 | −503:−20 |

→RU5~RU8→ A subcarrier index of RU 4+x is equal to a value obtained by multiplying a minus sign (−) to a sign of an RU 5-x subcarrier index (x is a positive integer less than or equal to 4).
→Ex) A subcarrier index of RU 6 is equal to a value obtained by multiplying a minus sign (−) to a sign of an RU 3 subcarrier index, that is, 530:1013

Null subcarriers: ±{17, 18, 19, 1014, 1041, 2036}
<996 RU>

TABLE 131

| RU1 | RU2 | RU3 | RU4 |
|---|---|---|---|
| −2036:−1041 | −1014:−19 | 19:1014 | 1041:2036 |

Null subcarriers: ±{17, 18}
<2018 RU>

TABLE 132

| RU1 | RU2 |
|---|---|
| −2036:−19 | 19:2036 |

Null subcarriers: ±{17, 18}

<4068 or 4066 or 4064 or 4062 RU for New 160 MHz Tone Plan>
4068RU: −2036:−3, 3:2036
4066RU: −2036:−4, 4:2036
4064RU: −2036:−5, 5:2036
4062RU: −2036:−6, 6:2036
Null subcarriers: X Each RU and an index of a null tone are listed below in a case where 4062/4064/4066/4068RU is used in full band transmission, a tone plan of '12G+2018RU+3N+13RU+5DC+13RU+3N+2018RU+11G' is used, and the first configuration of 996RU is used.

<26 RU>

TABLE 133

| RU1 | RU2 | RU3 | RU4 | RU5 | RU6 | RU7 | RU8 | RU9 |
|---|---|---|---|---|---|---|---|---|
| −2035:−2010 | −2009:−1984 | −1981:−1956 | −1955:−1930 | −1928:−1903 | −1901:−1876 | −1875:−1850 | −1847:−1822 | −1821:−1796 |
| RU10 | RU11 | RU12 | RU13 | RU14 | RU15 | RU16 | RU17 | RU18 | RU19 |
| −1793:−1768 | −1767:−1742 | −1739:−1714 | −1713:−1688 | −1686:−1661 | −1659:−1634 | −1633:−1608 | −1605:−1580 | −1579:−1554 | −1551:−1526 |
| RU20 | RU21 | RU22 | RU23 | RU24 | RU25 | RU26 | RU27 | RU28 | |
| −1523:−1498 | −1497:−1472 | −1469:−1444 | −1443:−1418 | −1416:−1391 | −1389:−1364 | −1363:−1338 | −1335:−1310 | −1309:−1284 | |
| RU29 | RU30 | RU31 | RU32 | RU33 | RU34 | RU35 | RU36 | RU37 | RU38 |
| −1281:−1256 | −1255:−1230 | −1227:−1202 | −1201:−1176 | −1174:−1149 | −1147:−1122 | −1121:−1096 | −1093:−1068 | −1067:−1042 | −1040:−1015 |
| RU39 | RU40 | RU41 | RU42 | RU43 | RU44 | RU45 | RU46 | RU47 | |
| −1013:−988 | −987:−962 | −959:−934 | −933:−908 | −906:−881 | −879:−854 | −853:−828 | −825:−800 | −799:−774 | |
| RU48 | RU49 | RU50 | RU51 | RU52 | RU53 | RU54 | RU55 | RU56 | RU57 |
| −771:−746 | −745:−720 | −717:−692 | −691:−666 | −664:−639 | −637:−612 | −611:−586 | −583:−558 | −557:−532 | −529:−504 |
| RU58 | RU59 | RU60 | RU61 | RU62 | RU63 | RU64 | RU65 | RU66 | |
| −501:−476 | −475:−450 | −447:−422 | −421:−396 | −394:−369 | −367:−342 | −341:−316 | −313:−288 | −287:−262 | |
| RU67 | RU68 | RU69 | RU70 | RU71 | RU72 | RU73 | RU74 | RU75 | RU76 |
| −259:−234 | −233:−208 | −205:−180 | −179:−154 | −152:−127 | −125:−100 | −99:−74 | −71:−46 | −45:−20 | −15:−3, 3:15 |

→RU77~RU151→ A subcarrier index of RU 76+x is equal to a value obtained by multiplying a minus sign (−) to a sign of an RU 76-x subcarrier index (x is a positive integer less than or equal to 75).

→Ex) A subcarrier index of RU 77 is equal to a value obtained by multiplying a minus sign (−) to a sign of an RU 75 subcarrier index, that is, 20:45

Null subcarriers: ±{16, 17, 18, 19, 72, 73, 126, 153, 206, 207, 260, 261, 314, 315, 368, 395, 448, 449, 502, 503, 530, 531, 584, 585, 638, 665, 718, 719, 772, 773, 826, 827, 880, 907, 960, 961, 1014, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}

<52 RU>

TABLE 134

| RU1 | RU2 | RU3 | RU4 |
|---|---|---|---|
| −2035:−1984 | −1981:−1930 | −1901:−1850 | −1847:−1796 |
| RU5 | RU6 | RU7 | RU8 |
| −1793:−1742 | −1739:−1688 | −1659:−1608 | −1605:−1554 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1013:−962 | −959:−908 | −879:−828 | −825:−774 |
| RU21 | RU22 | RU23 | RU24 |
| −771:−720 | −717:−666 | −637:−586 | −583:−532 |
| RU25 | RU26 | RU27 | RU28 |
| −501:−450 | −447:−396 | −367:−316 | −313:−262 |
| RU29 | RU30 | RU31 | RU32 |
| −259:−208 | −205:−154 | −125:−74 | −71:−20 |

→RU33~RU64→ A subcarrier index of RU 32+x is equal to a value obtained by multiplying a minus sign (−) to a sign of an RU 33-x subcarrier index (x is a positive integer less than or equal to 32).

→Ex) A subcarrier index of RU 34 is equal to a value obtained by multiplying a minus sign (−) to a sign of an RU 31 subcarrier index, that is, 74:125

Null subcarriers: ±{16, 17, 18, 19, 72, 73, 126, 153, 206, 207, 260, 261, 314, 315, 368, 395, 448, 449, 502, 503, 530, 531, 584, 585, 638, 665, 718, 719, 772, 773, 826, 827, 880, 907, 960, 961, 1014, 1041, 1094, 1095, 1148, 1175, 1228, 1229, 1282, 1283, 1336, 1337, 1390, 1417, 1470, 1471, 1524, 1525, 1552, 1553, 1606, 1607, 1660, 1687, 1740, 1741, 1794, 1795, 1848, 1849, 1902, 1929, 1982, 1983, 2036}

<106 RU>

TABLE 135

| RU1 | RU2 | RU3 | RU4 |
|---|---|---|---|
| −2035:−1930 | −1901:−1796 | −1793:−1688 | −1659:−1554 |
| RU5 | RU6 | RU7 | RU8 |
| −1523:−1418 | −1389:−1284 | −1281:−1176 | −1147:−1042 |
| RU9 | RU10 | RU11 | RU12 |
| −1013:−908 | −879:−774 | −771:−666 | −637:−532 |
| RU13 | RU14 | RU15 | RU16 |
| −501:−396 | −367:−262 | −259:−154 | −125:−20 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 154:259

Null subcarriers: ±{16, 17, 18, 19, 126, 153, 260, 261, 368, 395, 502, 503, 530, 531, 638, 665, 772, 773, 880, 907, 1014, 1041, 1148, 1175, 1282, 1283, 1390, 1417, 1524, 1525, 1552, 1553, 1660, 1687, 1794, 1795, 1902, 1929, 2036}

<242 RU>

TABLE 136

| RU1 | RU2 | RU3 | RU4 |
|---|---|---|---|
| −2036:−1795 | −1794:−1553 | −1524:−1283 | −1282:−1041 |
| RU5 | RU6 | RU7 | RU8 |
| −1014:−773 | −772:−531 | −502:−261 | −260:−19 |

→RU9~RU16→ A subcarrier index of RU 8+x is equal to a value obtained by multiplying a minus sign (−) to a sign of an RU 9-x subcarrier index (x is a positive integer less than or equal to 8).

→Ex) A subcarrier index of RU 10 is equal to a value obtained by multiplying a minus sign (−) to a sign of an RU 7 subcarrier index, that is, 261:502

Null subcarriers: ±{16, 17, 18, 503, 530, 1525, 1552}
<484 RU>

TABLE 137

| RU1 | RU2 | RU3 | RU4 |
|---|---|---|---|
| −2036:−1553 | −1524:−1041 | −1014:−531 | −502:−19 |

→RU5~RU8→ A subcarrier index of RU 4+x is equal to a value obtained by multiplying a minus sign (−) to a sign of an RU 5-x subcarrier index (x is a positive integer less than or equal to 4).

→Ex) A subcarrier index of RU 6 is equal to a value obtained by multiplying a minus sign (−) to a sign of an RU 3 subcarrier index, that is, 531:1014

Null subcarriers: ±{16, 17, 18, 503, 530, 1525, 1552}
<996 RU>

TABLE 138

| RU1 | RU2 | RU3 | RU4 |
|---|---|---|---|
| −2036:−1041 | −1014:−19 | 19:1014 | 1041:2036 |

Null subcarriers: ±{16, 17, 18}
<2018 RU>

TABLE 139

| RU1 | RU2 |
|---|---|
| −2036:−19 | 19:2036 |

Null subcarriers: ±{16, 17, 18}
<4068 or 4066 or 4064 or 4062 RU for New 160 MHz Tone Plan>

4068RU: −2036:−3, 3:2036
4066RU: −2036:−4, 4:2036
4064RU: −2036:−5, 5:2036
4062RU: −2036:−6, 6:2036
Null subcarriers: X D. Alternative 320 MHz Tone Plan 3

When a 320 MHz tone plan is used, a wider guard tone may be used to further decrease interference to an adjacent channel, and it is proposed to use 14/13G. In addition, when a full band is used in transmission, a new RU may be proposed, and a size of the new RU may be determined by considering various DC tones according to an effect of a DC offset. The number of DC tones of the existing 11ax 80 MHz is 5 or 7, and when this is directly considered, the new RU of the full band is 4064RU or 4062RU.

<Full Band>

14/13 guard tone, 5DC, 4064RU (RU subcarrier index: −2034:−3, 3:2034)
14/13 guard tone, 7DC, 4062RU (RU subcarrier index: −2034:−4, 4:2034)

In 320 MHz, considering the effect of the DC offset, it is not preferable that the number of DC tones in use is less than 5/7 which is less than the number of DC tones used in the existing 80 MHz. In addition, 5/7DC may be sufficient in terms of performance Considering the following OFDMA tone plan using 2018RU described below, up to 7DC may be suitable. The number of DC tones in the OFDMA tone plan is designed by considering 7DC used in the existing 11ax 80 MHz OFDMA tone plan, and it is not preferable that the number of DC tones is less than that, and 7DC may also be sufficient in 320 MHZ in terms of performance.

<OFDMA Tone Plan>

The OFDMA tone plan may be expressed using 2018RU and 26RU (13+13RU) as follows.

14G+2018RU+13RU+7DC+13RU+2018RU+13G

A 2018RU configuration is proposed as follows.

2018RU=996RU+26RU+996RU

The following two configurations are proposed as a 996RU configuration as in the new 160 MHz.

996RU=484RU+1N+26RU+1N+484RU

996RU=1N+484RU+26RU+484RU+1N

The 484RU has two 242RU configurations as in the existing 11ax.

484RU=242RU+242RU

The 242RU has the following configuration as in the existing 11ax.

242RU=1N+106RU+1N+26RU+1N+106RU+1N

The 106RU has the following configuration as in the existing 11ax.

106RU=52RU+2N+52RU

The 52RU has the following configuration as in the existing 11ax.

52RU=26RU+26RU

Each RU and an index of a null tone are listed below in a case where 4062/4064RU is used in full band transmission, and the first configuration of 996RU is used.

<26 RU>

TABLE 140

| RU1 | RU2 | RU3 | RU4 | RU5 | RU6 | RU7 | RU8 | RU9 | |
|---|---|---|---|---|---|---|---|---|---|
| −2033:−2008 | −2007:−1982 | −1979:−1954 | −1953:−1928 | −1926:−1901 | −1899:−1874 | −1873:−1848 | −1845:−1820 | −1819:−1794 | |
| RU10 | RU11 | RU12 | RU13 | RU14 | RU15 | RU16 | RU17 | RU18 | RU19 |
| −1791:−1766 | −1765:−1740 | −1737:−1712 | −1711:−1686 | −1684:−1659 | −1657:−1632 | −1631:−1606 | −1603:−1578 | −1577:−1552 | −1549:−1524 |
| RU20 | RU21 | RU22 | RU23 | RU24 | RU25 | RU26 | RU27 | RU28 | |
| −1521:−1496 | −1495:−1470 | −1467:−1442 | −1441:−1416 | −1414:−1389 | −1387:−1362 | −1361:−1336 | −1333:−1308 | −1307:−1282 | |
| RU29 | RU30 | RU31 | RU32 | RU33 | RU34 | RU35 | RU36 | RU37 | RU38 |
| −1279:−1254 | −1253:−1228 | −1225:−1200 | −1199:−1174 | −1172:−1147 | −1145:−1120 | −1119:−1094 | −1091:−1066 | −1065:−1040 | −1038:−1013 |
| RU39 | RU40 | RU41 | RU42 | RU43 | RU44 | RU45 | RU46 | RU47 | |
| −1011:−986 | −985:−960 | −957:−932 | −931:−906 | −904:−879 | −877:−852 | −851:−826 | −823:−798 | −797:−772 | |
| RU48 | RU49 | RU50 | RU51 | RU52 | RU53 | RU54 | RU55 | RU56 | RU57 |
| −769:−744 | −743:−718 | −715:−690 | −689:−664 | −662:−637 | −635:−610 | −609:−584 | −581:−556 | −555:−530 | −527:−502 |
| RU58 | RU59 | RU60 | RU61 | RU62 | RU63 | RU64 | RU65 | RU66 | |
| −499:−474 | −473:−448 | −445:−420 | −419:−394 | −392:−367 | −365:−340 | −339:−314 | −311:−286 | −285:−260 | |
| RU67 | RU68 | RU69 | RU70 | RU71 | RU72 | RU73 | RU74 | RU75 | RU76 |
| −257:−232 | −231:−206 | −203:−178 | −177:−152 | −150:−125 | −123:−98 | −97:−72 | −69:−44 | −43:−18 | −16:−4, 4:−16 |

→RU77~RU151→ A subcarrier index of RU 76+x is equal to a value obtained by multiplying a minus sign (−) to a sign of an RU 76-x subcarrier index (x is a positive integer less than or equal to 75).

→Ex) A subcarrier index of RU 77 is equal to a value obtained by multiplying a minus sign (−) to a sign of an RU 75 subcarrier index, that is, 18:43

Null subcarriers: ±{17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1039, 1092, 1093, 1146, 1173, 1226, 1227, 1280, 1281, 1334, 1335, 1388, 1415, 1468, 1469, 1522, 1523, 1550, 1551, 1604, 1605, 1658, 1685, 1738, 1739, 1792, 1793, 1846, 1847, 1900, 1927, 1980, 1981, 2034}

<52 RU>

TABLE 141

| RU1 | RU2 | RU3 | RU4 |
|---|---|---|---|
| −2033:−1982 | −1979:−1928 | −1899:−1848 | −1845:−1794 |
| RU5 | RU6 | RU7 | RU8 |
| −1791:−1740 | −1737:−1686 | −1657:−1606 | −1603:−1552 |
| RU9 | RU10 | RU11 | RU12 |
| −1521:−1470 | −1467:−1416 | −1387:−1336 | −1333:−1282 |
| RU13 | RU14 | RU15 | RU16 |
| −1279:−1228 | −1225:−1174 | −1145:−1094 | −1091:−1040 |
| RU17 | RU18 | RU19 | RU20 |
| −1011:−960 | −957:−906 | −877:−826 | −823:−772 |
| RU21 | RU22 | RU23 | RU24 |
| −769:−718 | −715:−664 | −635:−584 | −581:−530 |
| RU25 | RU26 | RU27 | RU28 |
| −499:−448 | −445:−394 | −365:−314 | −311:−260 |
| RU29 | RU30 | RU31 | RU32 |
| −257:−206 | −203:−152 | −123:−72 | −69:−18 |

→RU33~RU64→ A subcarrier index of RU 32+x is equal to a value obtained by multiplying a minus sign (−) to a sign of an RU 33-x subcarrier index (x is a positive integer less than or equal to 32).

→Ex) A subcarrier index of RU 34 is equal to a value obtained by multiplying a minus sign (−) to a sign of an RU 31 subcarrier index, that is, 72:123

Null subcarriers: ±{17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1039, 1092, 1093, 1146, 1173, 1226, 1227, 1280, 1281, 1334, 1335, 1388, 1415, 1468, 1469, 1522, 1523, 1550, 1551, 1604, 1605, 1658, 1685, 1738, 1739, 1792, 1793, 1846, 1847, 1900, 1927, 1980, 1981, 2034}

<106 RU>

TABLE 142

| RU1 | RU2 | RU3 | RU4 |
|---|---|---|---|
| −2033:−1928 | −1899:−1794 | −1791:−1686 | −1657:−1552 |
| RU5 | RU6 | RU7 | RU8 |
| −1521:−1416 | −1387:−1282 | −1279:−1174 | −1145:−1040 |
| RU9 | RU10 | RU11 | RU12 |
| −1011:−906 | −877:−772 | −769:−664 | −635:−530 |
| RU13 | RU14 | RU15 | RU16 |
| −499:−394 | −365:−260 | −257:−152 | −123:−18 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 152:257

Null subcarriers: ±{17, 124, 151, 258, 259, 366, 393, 500, 501, 528, 529, 636, 663, 770, 771, 878, 905, 1012, 1039, 1146, 1173, 1280, 1281, 1388, 1415, 1522, 1523, 1550, 1551, 1658, 1685, 1792, 1793, 1900, 1927, 2034}

<242 RU>

TABLE 143

| RU1 | RU2 | RU3 | RU4 |
|---|---|---|---|
| −2034:−1793 | −1792:−1551 | −1522:−1281 | −1280:−1039 |
| RU5 | RU6 | RU7 | RU8 |
| −1012:−771 | −770:−529 | −500:−259 | −258:−17 |

→RU9~RU16→ A subcarrier index of RU 8+x is equal to a value obtained by multiplying a minus sign (−) to a sign of an RU 9-x subcarrier index (x is a positive integer less than or equal to 8).

→Ex) A subcarrier index of RU 10 is equal to a value obtained by multiplying a minus sign (−) to a sign of an RU 7 subcarrier index, that is, 259:500

Null subcarriers: ±{501, 528, 1523, 1550}

<484 RU>

TABLE 144

| RU1 | RU2 | RU3 | RU4 |
|---|---|---|---|
| −2034:−1551 | −1522:−1039 | −1012:−529 | −500:−17 |

→RU5~RU8→ A subcarrier index of RU 4+x is equal to a value obtained by multiplying a minus sign (−) to a sign of an RU 5-x subcarrier index (x is a positive integer less than or equal to 4).

→Ex) A subcarrier index of RU 6 is equal to a value obtained by multiplying a minus sign (−) to a sign of an RU 3 subcarrier index, that is, 529:1012

Null subcarriers: ±{501, 528, 1523, 1550}

<996 RU>

TABLE 145

| RU1 | RU2 | RU3 | RU4 |
|---|---|---|---|
| −2034:−1039 | −1012:−17 | 17:1012 | 1039:2034 |

Null subcarriers: X

<2018 RU>

TABLE 146

| RU1 | RU2 |
|---|---|
| −2034:−17 | 17:2034 |

Null subcarriers: X

<4064 or 4062 RU for New 160 MHz Tone Plan>

4064RU: −2034:−3, 3:2034

4062RU: −2034:−4, 4:2034

Null subcarriers: X

Each RU and an index of a null tone are listed below in a case where 4062/4064RU is used in full band transmission, and the second configuration of 996RU is used.

<26 RU>

TABLE 147

| RU1 | RU2 | RU3 | RU4 | RU5 | RU6 | RU7 | RU8 | RU9 | |
|---|---|---|---|---|---|---|---|---|---|
| −2032:−2007 | −2006:−1981 | −1978:−1953 | −1952:−1927 | −1925:−1900 | −1898:−1873 | −1872:−1847 | −1844:−1819 | −1818:−1793 | |
| RU10 | RU11 | RU12 | RU13 | RU14 | RU15 | RU16 | RU17 | RU18 | RU19 |
| −1790:−1765 | −1764:−1739 | −1736:−1711 | −1710:−1685 | −1683:−1658 | −1656:−1631 | −1630:−1605 | −1602:−1577 | −1576:−1551 | −1549:−1524 |
| RU20 | RU21 | RU22 | RU23 | RU24 | RU25 | RU26 | RU27 | RU28 | |
| −1522:−1497 | −1496:−1471 | −1468:−1443 | −1442:−1417 | −1415:−1390 | −1388:−1363 | −1362:−1337 | −1334:−1309 | −1308:−1283 | |
| RU29 | RU30 | RU31 | RU32 | RU33 | RU34 | RU35 | RU36 | RU37 | RU38 |
| −1280:−1255 | −1254:−1229 | −1226:−1201 | −1200:−1175 | −1173:−1148 | −1146:−1121 | −1120:−1095 | −1092:−1067 | −1066:−1041 | −1038:−1013 |
| RU39 | RU40 | RU41 | RU42 | RU43 | RU44 | RU45 | RU46 | RU47 | |
| −1010:−985 | −984:−959 | −956:−931 | −930:−905 | −903:−878 | −876:−851 | −850:−825 | −822:−797 | −796:−771 | |
| RU48 | RU49 | RU50 | RU51 | RU52 | RU53 | RU54 | RU55 | RU56 | RU57 |
| −768:−743 | −742:−717 | −714:−689 | −688:−663 | −661:−636 | −634:−609 | −608:−583 | −580:−555 | −554:−529 | −527:−502 |
| RU58 | RU59 | RU60 | RU61 | RU62 | RU63 | RU64 | RU65 | RU66 | |
| −500:−475 | −474:−449 | −446:−421 | −420:−395 | −393:−368 | −366:−341 | −340:−315 | −312:−287 | −286:−261 | |
| RU67 | RU68 | RU69 | RU70 | RU71 | RU72 | RU73 | RU74 | RU75 | RU76 |
| −258:−233 | −232:−207 | −204:−179 | −178:−153 | −151:−126 | −124:−99 | −98:−73 | −70:−45 | −44:−19 | −16:−4, 4:16 |

→RU77~RU151→ A subcarrier index of RU 76+x is equal to a value obtained by multiplying a minus sign (−) to a sign of an RU 76-x subcarrier index (x is a positive integer less than or equal to 75).

→Ex) A subcarrier index of RU 77 is equal to a value obtained by multiplying a minus sign (−) to a sign of an RU 75 subcarrier index, that is, 19:44

Null subcarriers: ±{17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012, 1039, 1040, 1093, 1094, 1147, 1174, 1227, 1228, 1281, 1282, 1335, 1336, 1389, 1416, 1469, 1470, 1523, 1550, 1603, 1604, 1657, 1684, 1737, 1738, 1791, 1792, 1845, 1846, 1899, 1926, 1979, 1980, 2033, 2034}

<52 RU>

TABLE 148

| RU1 | RU2 | RU3 | RU4 |
|---|---|---|---|
| −2032:−1981 | −1978:−1927 | −1898:−1847 | −1844:−1793 |
| RU5 | RU6 | RU7 | RU8 |
| −1790:−1739 | −1736:−1685 | −1656:−1605 | −1602:−1551 |
| RU9 | RU10 | RU11 | RU12 |
| −1522:−1471 | −1468:−1417 | −1388:−1337 | −1334:−1283 |
| RU13 | RU14 | RU15 | RU16 |
| −1280:−1229 | −1226:−1175 | −1146:−1095 | −1092:−1041 |
| RU17 | RU18 | RU19 | RU20 |
| −1010:−959 | −956:−905 | −876:−825 | −822:−771 |
| RU21 | RU22 | RU23 | RU24 |
| −768:−717 | −714:−663 | −634:−583 | −580:−529 |
| RU25 | RU26 | RU27 | RU28 |
| −500:−449 | −446:−395 | −366:−315 | −312:−261 |
| RU29 | RU30 | RU31 | RU32 |
| −258:−207 | −204:−153 | −124:−73 | −70:−19 |

→RU33~RU64→ A subcarrier index of RU 32+x is equal to a value obtained by multiplying a minus sign (−) to a sign of an RU 33-x subcarrier index (x is a positive integer less than or equal to 32).

→Ex) A subcarrier index of RU 34 is equal to a value obtained by multiplying a minus sign (−) to a sign of an RU 31 subcarrier index, that is, 73:124

Null subcarriers: ±{17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012, 1039, 1040, 1093, 1094, 1147, 1174, 1227, 1228, 1281, 1282, 1335, 1336, 1389, 1416, 1469, 1470, 1523, 1550, 1603, 1604, 1657, 1684, 1737, 1738, 1791, 1792, 1845, 1846, 1899, 1926, 1979, 1980, 2033, 2034}

<106 RU>

TABLE 149

| RU1 | RU2 | RU3 | RU4 |
|---|---|---|---|
| −2032:−1927 | −1898:−1793 | −1790:−1685 | −1656:−1551 |
| RU5 | RU6 | RU7 | RU8 |
| −1522:−1417 | −1388:−1283 | −1280:−1175 | −1146:−1041 |
| RU9 | RU10 | RU11 | RU12 |
| −1010:−905 | −876:−771 | −768:−663 | −634:−529 |
| RU13 | RU14 | RU15 | RU16 |
| −500:−395 | −366:−261 | −258:−153 | −124:−19 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 153:258

Null subcarriers: ±{17, 18, 125, 152, 259, 260, 367, 394, 501, 528, 635, 662, 769, 770, 877, 904, 1011, 1012, 1039, 1040, 1147, 1174, 1281, 1282, 1389, 1416, 1523, 1550, 1657, 1684, 1791, 1792, 1899, 1926, 2033, 2034}

<242 RU>

TABLE 150

| RU1 | RU2 | RU3 | RU4 |
|---|---|---|---|
| −2033:−1792 | −1791:−1550 | −1523:−1282 | −1281:−1040 |
| RU5 | RU6 | RU7 | RU8 |
| −1011:−770 | −769:−528 | −501:−260 | −259:−18 |

→RU9~RU16→ A subcarrier index of RU 8+x is equal to a value obtained by multiplying a minus sign (−) to a sign of an RU 9-x subcarrier index (x is a positive integer less than or equal to 8).

→Ex) A subcarrier index of RU 10 is equal to a value obtained by multiplying a minus sign (−) to a sign of an RU 7 subcarrier index, that is, 260:501

Null subcarriers: ±{17, 1012, 1039, 2034}

<484 RU>

TABLE 151

| RU1 | RU2 | RU3 | RU4 |
|---|---|---|---|
| −2033:−1550 | −1523:−1040 | −1011:−528 | −501:−18 |

→RU5~RU8→ A subcarrier index of RU 4+x is equal to a value obtained by multiplying a minus sign (−) to a sign of an RU 5-x subcarrier index (x is a positive integer less than or equal to 4).

→Ex) A subcarrier index of RU 6 is equal to a value obtained by multiplying a minus sign (−) to a sign of an RU 3 subcarrier index, that is, 528:1011

Null subcarriers: ±{17, 1012, 1039, 2034}

<996 RU>

TABLE 152

| RU1 | RU2 | RU3 | RU4 |
|---|---|---|---|
| −2034:−1039 | −1012:−17 | 17:1012 | 1039:2034 |

Null subcarriers: X

<2018 RU>

TABLE 153

| RU1 | RU2 |
|---|---|
| −2034:−17 | 17:2034 |

Null subcarriers: X

The 484RU has two 242RU configurations as in the existing 11ax.

484RU=242RU+242RU

The 242RU has the following configuration as in the existing 11ax.

242RU=1$N$+106RU+1$N$+26RU+1$N$+106RU+1$N$

The 106RU has the following configuration as in the existing 11ax.

106RU=52RU+2$N$+52RU

The 52RU has the following configuration as in the existing 11ax.

52RU=26RU+26RU

Each RU and an index of a null tone are listed below in a case where 4062/4064RU is used in full band transmission, and the first configuration of 996RU is used.

<26 RU>

TABLE 154

| RU1 | RU2 | RU3 | RU4 | RU5 | RU6 | RU7 | RU8 | RU9 | |
|---|---|---|---|---|---|---|---|---|---|
| −2033:−2008 | −2007:−1982 | −1979:−1954 | −1953:−1928 | −1926:−1901 | −1899:−1874 | −1873:−1848 | −1845:−1820 | −1819:−1794 | |
| RU10 | RU11 | RU12 | RU13 | RU14 | RU15 | RU16 | RU17 | RU18 | RU19 |
| −1791:−1766 | −1765:−1740 | −1737:−1712 | −1711:−1686 | −1684:−1659 | −1657:−1632 | −1631:−1606 | −1603:−1578 | −1577:−1552 | −1549:−1524 |
| RU20 | RU21 | RU22 | RU23 | RU24 | RU25 | RU26 | RU27 | RU28 | |
| −1521:−1496 | −1495:−1470 | −1467:−1442 | −1441:−1416 | −1414:−1389 | −1387:−1362 | −1361:−1336 | −1333:−1308 | −1307:−1282 | |
| RU29 | RU30 | RU31 | RU32 | RU33 | RU34 | RU35 | RU36 | RU37 | RU38 |
| −1279:−1254 | −1253:−1228 | −1225:−1200 | −1199:−1174 | −1172:−1147 | −1145:−1120 | −1119:−1094 | −1091:−1066 | −1065:−1040 | −1038:−1013 |
| RU39 | RU40 | RU41 | RU42 | RU43 | RU44 | RU45 | RU46 | RU47 | |
| −1011:−986 | −985:−960 | −957:−932 | −931:−906 | −904:−879 | −877:−852 | −851:−826 | −823:−798 | −797:−772 | |
| RU48 | RU49 | RU50 | RU51 | RU52 | RU53 | RU54 | RU55 | RU56 | RU57 |
| −769:−744 | −743:−718 | −715:−690 | −689:−664 | −662:−637 | −635:−610 | −609:−584 | −581:−556 | −555:−530 | −527:−502 |
| RU58 | RU59 | RU60 | RU61 | RU62 | RU63 | RU64 | RU65 | RU66 | |
| −499:−448 | −473:−420 | −445:−394 | −419:−367 | −392:−340 | −365:−314 | −339:−286 | −311:−260 | −285:−260 | |
| RU67 | RU68 | RU69 | RU70 | RU71 | RU72 | RU73 | RU74 | RU75 | RU76 |
| −257:−232 | −231:−206 | −203:−178 | −177:−152 | −150:−125 | −123:−98 | −97:−72 | −69:−44 | −43:−18 | −15:−3, 3:15 |

<4064 or 4062 RU for New 160 MHz Tone Plan>

4064RU: −2034:−3, 3:2034

4062RU: −2034:−4, 4:2034

Null subcarriers: X

E. Alternative 320 MHz Tone Plan 3-A

This is the same as described in the case D, and is a case where DC is fixed to 5 in a full band and OFDMA situation.

<Full Band>

14/13 guard tone, 5DC, 4064RU (RU subcarrier index: −2034:−3, 3:2034)

<OFDMA Tone Plan>

'14G+2018RU+1N+13RU+5DC+13RU+1N+2018RU+13G' is fixed to 5 and one null subcarrier is located at both sides of a center 26RU. Such a design is to decrease an effect of interference caused by an adjacent RU of the center 26 RU.

A 2018RU configuration is proposed as follows.

2018RU=996RU+26RU+996RU

The following two configurations are proposed as a 996RU configuration as in the new 160 MHz.

996RU=484RU+1$N$+26RU+1$N$+484RU

996RU=1$N$+484RU+26RU+484RU+1$N$

→RU77~RU151→ A subcarrier index of RU 76+x is equal to a value obtained by multiplying a minus sign (−) to a sign of an RU 76-x subcarrier index (x is a positive integer less than or equal to 75).

→Ex) A subcarrier index of RU 77 is equal to a value obtained by multiplying a minus sign (−) to a sign of an RU 75 subcarrier index, that is, 18:43

Null subcarriers: ±{16, 17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1039, 1092, 1093, 1146, 1173, 1226, 1227, 1280, 1281, 1334, 1335, 1388, 1415, 1468, 1469, 1522, 1523, 1550, 1551, 1604, 1605, 1658, 1685, 1738, 1739, 1792, 1793, 1846, 1847, 1900, 1927, 1980, 1981, 2034}

<52 RU>

TABLE 155

| RU1 | RU2 | RU3 | RU4 |
|---|---|---|---|
| −2033:−1982 | −1979:−1928 | −1899:−1848 | −1845:−1794 |
| RU5 | RU6 | RU7 | RU8 |
| −1791:−1740 | −1737:−1686 | −1657:−1606 | −1603:−1552 |
| RU9 | RU10 | RU11 | RU12 |
| −1521:−1470 | −1467:−1416 | −1387:−1336 | −1333:−1282 |

TABLE 155-continued

| RU13 | RU14 | RU15 | RU16 |
|---|---|---|---|
| −1279:−1228 | −1225:−1174 | −1145:−1094 | −1091:−1040 |
| RU17 | RU18 | RU19 | RU20 |
| −1011:−960 | −957:−906 | −877:−826 | −823:−772 |
| RU21 | RU22 | RU23 | RU24 |
| −769:−718 | −715:−664 | −635:−584 | −581:−530 |
| RU25 | RU26 | RU27 | RU28 |
| −499:−448 | −445:−394 | −365:−314 | −311:−260 |
| RU29 | RU30 | RU31 | RU32 |
| −257:−206 | −203:−152 | −123:−72 | −69:−18 |

→RU33~RU64→ A subcarrier index of RU 32+x is equal to a value obtained by multiplying a minus sign (−) to a sign of an RU 33-x subcarrier index (x is a positive integer less than or equal to 32).

→Ex) A subcarrier index of RU 34 is equal to a value obtained by multiplying a minus sign (−) to a sign of an RU 31 subcarrier index, that is, 72:123

Null subcarriers: ±{16, 17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1039, 1092, 1093, 1146, 1173, 1226, 1227, 1280, 1281, 1334, 1335, 1388, 1415, 1468, 1469, 1522, 1523, 1550, 1551, 1604, 1605, 1658, 1685, 1738, 1739, 1792, 1793, 1846, 1847, 1900, 1927, 1980, 1981, 2034}

<106 RU>

TABLE 156

| RU1 | RU2 | RU3 | RU4 |
|---|---|---|---|
| −2033:−1928 | −1899:−1794 | −1791:−1686 | −1657:−1552 |
| RU5 | RU6 | RU7 | RU8 |
| −1521:−1416 | −1387:−1282 | −1279:−1174 | −1145:−1040 |
| RU9 | RU10 | RU11 | RU12 |
| −1011:−906 | −877:−772 | −769:−664 | −635:−530 |
| RU13 | RU14 | RU15 | RU16 |
| −499:−394 | −365:−260 | −257:−152 | −123:−18 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 152:257

Null subcarriers: ±{16, 17, 124, 151, 258, 259, 366, 393, 500, 501, 528, 529, 636, 663, 770, 771, 878, 905, 1012, 1039, 1146, 1173, 1280, 1281, 1388, 1415, 1522, 1523, 1550, 1551, 1658, 1685, 1792, 1793, 1900, 1927, 2034}

<242 RU>

TABLE 157

| RU1 | RU2 | RU3 | RU4 |
|---|---|---|---|
| −2034:−1793 | −1792:−1551 | −1522:−1281 | −1280:−1039 |
| RU5 | RU6 | RU7 | RU8 |
| −1012:−771 | −770:−529 | −500:−259 | −258:−17 |

→RU9~RU16→ A subcarrier index of RU 8+x is equal to a value obtained by multiplying a minus sign (−) to a sign of an RU 9-x subcarrier index (x is a positive integer less than or equal to 8).

→Ex) A subcarrier index of RU 10 is equal to a value obtained by multiplying a minus sign (−) to a sign of an RU 7 subcarrier index, that is, 259:500

Null subcarriers: ±{16, 501, 528, 1523, 1550}

<484 RU>

TABLE 158

| RU1 | RU2 | RU3 | RU4 |
|---|---|---|---|
| −2034:−1551 | −1522:−1039 | −1012:−529 | −500:−17 |

→RU5~RU8→ A subcarrier index of RU 4+x is equal to a value obtained by multiplying a minus sign (−) to a sign of an RU 5-x subcarrier index (x is a positive integer less than or equal to 4).

→Ex) A subcarrier index of RU 6 is equal to a value obtained by multiplying a minus sign (−) to a sign of an RU 3 subcarrier index, that is, 529:1012

Null subcarriers: ±{16, 501, 528, 1523, 1550}

<996 RU>

TABLE 159

| RU1 | RU2 | RU3 | RU4 |
|---|---|---|---|
| −2034:−1039 | −1012:−17 | 17:1012 | 1039:2034 |

Null subcarriers: ±16

<2018 RU>

TABLE 160

| RU1 | RU2 |
|---|---|
| −2034:−17 | 17:2034 |

Null subcarriers: ±16

<4064 RU for New 320 MHz Tone Plan>
4064RU: −2034:−3, 3:2034
Null subcarriers: X Each RU and an index of a null tone are listed below in a case where 4062/4064RU is used in full band transmission, and the second configuration of 996RU is used.

<26 RU>

TABLE 161

| RU1 | RU2 | RU3 | RU4 | RU5 | RU6 | RU7 | RU8 | RU9 |
|---|---|---|---|---|---|---|---|---|
| −2032:−2007 | −2006:−1981 | −1978:−1953 | −1952:−1927 | −1925:−1900 | −1898:−1873 | −1872:−1847 | −1844:−1819 | −1818:−1793 |
| RU10 | RU11 | RU12 | RU13 | RU14 | RU15 | RU16 | RU17 | RU18 | RU19 |
| −1790:−1765 | −1764:−1739 | −1736:−1711 | −1710:−1685 | −1683:−1658 | −1656:−1631 | −1630:−1605 | −1602:−1577 | −1576:−1551 | −1549:−1524 |
| RU20 | RU21 | RU22 | RU23 | RU24 | RU25 | RU26 | RU27 | RU28 | |
| −1522:−1497 | −1496:−1471 | −1468:−1443 | −1442:−1417 | −1415:−1390 | −1388:−1363 | −1362:−1337 | −1334:−1309 | −1308:−1283 | |
| RU29 | RU30 | RU31 | RU32 | RU33 | RU34 | RU35 | RU36 | RU37 | RU38 |
| −1280:−1255 | −1254:−1229 | −1226:−1201 | −1200:−1175 | −1173:−1148 | −1146:−1121 | −1120:−1095 | −1092:−1067 | −1066:−1041 | −1038:−1013 |
| RU39 | RU40 | RU41 | RU42 | RU43 | RU44 | RU45 | RU46 | RU47 | |
| −1010:−985 | −984:−959 | −956:−931 | −930:−905 | −903:−878 | −876:−851 | −850:−825 | −822:−797 | −796:−771 | |
| RU48 | RU49 | RU50 | RU51 | RU52 | RU53 | RU54 | RU55 | RU56 | RU57 |
| −768:−743 | −742:−717 | −714:−689 | −688:−663 | −661:−636 | −634:−609 | −608:−583 | −580:−555 | −554:−529 | −527:−502 |

TABLE 161-continued

| RU58 | RU59 | RU60 | RU61 | RU62 | RU63 | RU64 | RU65 | RU66 | |
|---|---|---|---|---|---|---|---|---|---|
| −500:−475 | −474:−449 | −446:−421 | −420:−395 | −393:−368 | −366:−341 | −340:−315 | −312:−287 | −286:−261 | |
| RU67 | RU68 | RU69 | RU70 | RU71 | RU72 | RU73 | RU74 | RU75 | RU76 |
| −258:−233 | −232:−207 | −204:−179 | −178:−153 | −151:−126 | −124:−99 | −98:−73 | −70:−45 | −44:−19 | −15:−3, 3:15 |

→RU77~RU151→ A subcarrier index of RU 76+x is equal to a value obtained by multiplying a minus sign (−) to a sign of an RU 76-x subcarrier index (x is a positive integer less than or equal to 75).

→Ex) A subcarrier index of RU 77 is equal to a value obtained by multiplying a minus sign (−) to a sign of an RU 75 subcarrier index, that is, 19:44

Null subcarriers: ±{16, 17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012, 1039, 1040, 1093, 1094, 1147, 1174, 1227, 1228, 1281, 1282, 1335, 1336, 1389, 1416, 1469, 1470, 1523, 1550, 1603, 1604, 1657, 1684, 1737, 1738, 1791, 1792, 1845, 1846, 1899, 1926, 1979, 1980, 2033, 2034}

<52 RU>

TABLE 162

| RU1 | RU2 | RU3 | RU4 |
|---|---|---|---|
| −2032:−1981 | −1978:−1927 | −1898:−1847 | −1844:−1793 |
| RU5 | RU6 | RU7 | RU8 |
| −1790:−1739 | −1736:−1685 | −1656:−1605 | −1602:−1551 |
| RU9 | RU10 | RU11 | RU12 |
| −1522:−1471 | −1468:−1417 | −1388:−1337 | −1334:−1283 |
| RU13 | RU14 | RU15 | RU16 |
| −1280:−1229 | −1226:−1175 | −1146:−1095 | −1092:−1041 |
| RU17 | RU18 | RU19 | RU20 |
| −1010:−959 | −956:−905 | −876:−825 | −822:−771 |
| RU21 | RU22 | RU23 | RU24 |
| −768:−717 | −714:−663 | −634:−583 | −580:−529 |
| RU25 | RU26 | RU27 | RU28 |
| −500:−449 | −446:−395 | −366:−315 | −312:−261 |
| RU29 | RU30 | RU31 | RU32 |
| −258:−207 | −204:−153 | −124:−73 | −70:−19 |

→RU33~RU64→ A subcarrier index of RU 32+x is equal to a value obtained by multiplying a minus sign (−) to a sign of an RU 33-x subcarrier index (x is a positive integer less than or equal to 32).

→Ex) A subcarrier index of RU 34 is equal to a value obtained by multiplying a minus sign (−) to a sign of an RU 31 subcarrier index, that is, 73:124

Null subcarriers: ±{16, 17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012, 1039, 1040, 1093, 1094, 1147, 1174, 1227, 1228, 1281, 1282, 1335, 1336, 1389, 1416, 1469, 1470, 1523, 1550, 1603, 1604, 1657, 1684, 1737, 1738, 1791, 1792, 1845, 1846, 1899, 1926, 1979, 1980, 2033, 2034}

<106 RU>

TABLE 163

| RU1 | RU2 | RU3 | RU4 |
|---|---|---|---|
| −2032:−1927 | −1898:−1793 | −1790:−1685 | −1656:−1551 |
| RU5 | RU6 | RU7 | RU8 |
| −1522:−1417 | −1388:−1283 | −1280:−1175 | −1146:−1041 |
| RU9 | RU10 | RU11 | RU12 |
| −1010:−905 | −876:−771 | −768:−663 | −634:−529 |
| RU13 | RU14 | RU15 | RU16 |
| −500:−395 | −366:−261 | −258:−153 | −124:−19 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 153:258

Null subcarriers: ±{16, 17, 18, 125, 152, 259, 260, 367, 394, 501, 528, 635, 662, 769, 770, 877, 904, 1011, 1012, 1039, 1040, 1147, 1174, 1281, 1282, 1389, 1416, 1523, 1550, 1657, 1684, 1791, 1792, 1899, 1926, 2033, 2034}

<242 RU>

TABLE 164

| RU1 | RU2 | RU3 | RU4 |
|---|---|---|---|
| −2033:−1792 | −1791:−1550 | −1523:−1282 | −1281:−1040 |
| RU5 | RU6 | RU7 | RU8 |
| −1011:−770 | −769:−528 | −501:−260 | −259:−18 |

→RU9~RU16→ A subcarrier index of RU 8+x is equal to a value obtained by multiplying a minus sign (−) to a sign of an RU 9-x subcarrier index (x is a positive integer less than or equal to 8).

→Ex) A subcarrier index of RU 10 is equal to a value obtained by multiplying a minus sign (−) to a sign of an RU 7 subcarrier index, that is, 260:501

Null subcarriers: ±{16, 17, 1012, 1039, 2034}

<484 RU>

TABLE 165

| RU1 | RU2 | RU3 | RU4 |
|---|---|---|---|
| −2033:−1550 | −1523:−1040 | −1011:−528 | −501:−18 |

→RU5~RU8→ A subcarrier index of RU 4+x is equal to a value obtained by multiplying a minus sign (−) to a sign of an RU 5-x subcarrier index (x is a positive integer less than or equal to 4).

→Ex) A subcarrier index of RU 6 is equal to a value obtained by multiplying a minus sign (−) to a sign of an RU 3 subcarrier index, that is, 528:1011

Null subcarriers: ±{16, 17, 1012, 1039, 2034}

<996 RU>

TABLE 166

| RU1 | RU2 | RU3 | RU4 |
|---|---|---|---|
| −2034:−1039 | −1012:−17 | 17:1012 | 1039:2034 |

Null subcarriers: ±16

<2018 RU>

TABLE 167

| RU1 | RU2 |
|---|---|
| −2034:−17 | 17:2034 |

Null subcarriers: ±16

<4064 RU for New 320 MHz Tone Plan>
4064RU: −2034:−3, 3:2034
Null subcarriers: X

F. Alternative 320 MHz Tone Plan 4

When a 320 MHz tone plan is used, a wider guard tone may be used to further decrease interference to an adjacent channel, and it is proposed to use 13/12G. In addition, when a full band is used in transmission, a new RU may be proposed, and a size of the new RU may be determined by considering various DC tones according to an effect of a DC offset. The number of DC tones of the existing 11ax 80 MHz is 5 or 7, and this number or 9 may be applied considering performance. In this case, the new RU is 4066/4064/4062RU.

<Full Band>
- 13/12 guard tone, 5DC, 4066RU (RU subcarrier index: −2035:−3, 3:2035)
- 13/12 guard tone, 7DC, 4064RU (RU subcarrier index: −2035:−4, 4:2035)
- 13/12 guard tone, 9DC, 4062RU (RU subcarrier index: −2035:−5, 5:2035)

In 320 MHz, considering the effect of the DC offset, it is not preferable that the number of DC tones in use is less than 5/7 which is less than the number of DC tones used in the existing 80 MHz. In addition, it may be sufficient to use 5/7DC, and 9DC may be used for more reliable performance Up to 9DC may be appropriate when considering the following OFDMA tone plan using 2018RU.

<OFDMA Tone Plan>

The OFDMA tone plan may be expressed using 2018RU and 26RU (13+13RU) as follows.

$$13G+2018RU+13RU+9DC+13RU+2018RU+12G$$

$$13G+2018RU+1N+13RU+7DC+13RU+1N+2018RU+12G$$

$$13G+2018RU+2N+13RU+5DC+13RU+2N+2018RU+12G$$

The number of DC tones and the number of null tones of a center 26RU (13+13RU) may be determined by considering performance of a DC offset and performance based on an effect of interference of the center 26RU (13+13RU). Considering the existing 11ax tone plan, 7DC may be sufficient when the center 26RU (13+13RU) is used.

A 2018RU configuration is proposed as follows.

$$2018RU=996RU+26RU+996RU$$

The following two configurations are proposed as a 996RU configuration as in the new 160 MHz.

$$996RU=484RU+1N+26RU+1N+484RU$$

$$996RU=1N+484RU+26RU+484RU+1N$$

The 484RU has two 242RU configurations as in the existing 11ax.

$$484RU=242RU+242RU$$

The 242RU has the following configuration as in the existing 11ax.

$$242RU=1N+106RU+1N+26RU+1N+106RU+1N$$

The 106RU has the following configuration as in the existing 11ax.

$$106RU=52RU+2N+52RU$$

The 52RU has the following configuration as in the existing 11ax.

$$52RU=26RU+26RU$$

Each RU and an index of a null tone are listed below in a case where 4062/4064/4066RU is used in full band transmission, a tone plan of '13G+2018RU+13RU+9DC+13RU+2018RU+12G' is used, and the first configuration of 996RU is used.

<26 RU>

TABLE 168

| RU1 | RU2 | RU3 | RU4 | RU5 | RU6 | RU7 | RU8 | RU9 | |
|---|---|---|---|---|---|---|---|---|---|
| −2034:−2009 | −2008:−1983 | −1980:−1955 | −1954:−1929 | −1927:−1902 | −1900:−1875 | −1874:−1849 | −1846:−1821 | −1820:−1795 | |
| RU10 | RU11 | RU12 | RU13 | RU14 | RU15 | RU16 | RU17 | RU18 | RU19 |
| −1792:−1767 | −1766:−1741 | −1738:−1713 | −1712:−1687 | −1685:−1660 | −1658:−1633 | −1632:−1607 | −1604:−1579 | −1578:−1553 | −1550:−1525 |
| RU20 | RU21 | RU22 | RU23 | RU24 | RU25 | RU26 | RU27 | RU28 | |
| −1522:−1497 | −1496:−1471 | −1468:−1443 | −1442:−1417 | −1415:−1390 | −1388:−1363 | −1362:−1337 | −1334:−1309 | −1308:−1283 | |
| RU29 | RU30 | RU31 | RU32 | RU33 | RU34 | RU35 | RU36 | RU37 | RU38 |
| −1280:−1255 | −1254:−1229 | −1226:−1201 | −1200:−1175 | −1173:−1148 | −1146:−1121 | −1120:−1095 | −1092:−1067 | −1066:−1041 | −1039:−1014 |
| RU39 | RU40 | RU41 | RU42 | RU43 | RU44 | RU45 | RU46 | RU47 | |
| −1012:−987 | −986:−961 | −958:−933 | −932:−907 | −905:−880 | −878:−853 | −852:−827 | −824:−799 | −798:−773 | |
| RU48 | RU49 | RU50 | RU51 | RU52 | RU53 | RU54 | RU55 | RU56 | RU57 |
| −770:−745 | −744:−719 | −716:−691 | −690:−665 | −663:−638 | −636:−611 | −610:−585 | −582:−557 | −556:−531 | −528:−503 |
| RU58 | RU59 | RU60 | RU61 | RU62 | RU63 | RU64 | RU65 | RU66 | |
| −500:−449 | −474:−421 | −446:−395 | −420:−368 | −393:−341 | −366:−315 | −340:−287 | −312:−261 | −286:−261 | |
| RU67 | RU68 | RU69 | RU70 | RU71 | RU72 | RU73 | RU74 | RU75 | RU76 |
| −258:−233 | −232:−207 | −204:−179 | −178:−153 | −151:−126 | −124:−99 | −98:−73 | −70:−45 | −44:−19 | −17:−5, 5:17 |

→RU77~RU151→ A subcarrier index of RU 76+x is equal to a value obtained by multiplying a minus sign (−) to a sign of an RU 76-x subcarrier index (x is a positive integer less than or equal to 75).

→Ex) A subcarrier index of RU 77 is equal to a value obtained by multiplying a minus sign (−) to a sign of an RU 75 subcarrier index, that is, 19:44

Null subcarriers: ±{18, 71, 72, 125, 152, 205, 206, 259, 260, 313, 314, 367, 394, 447, 448, 501, 502, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035}

<52 RU>

TABLE 169

| RU1 | RU2 | RU3 | RU4 |
|---|---|---|---|
| −2034:−1983 | −1980:−1929 | −1900:−1849 | −1846:−1795 |
| RU5 | RU6 | RU7 | RU8 |
| −1792:−1741 | −1738:−1687 | −1658:−1607 | −1604:−1553 |
| RU9 | RU10 | RU11 | RU12 |
| −1522:−1471 | −1468:−1417 | −1388:−1337 | −1334:−1283 |
| RU13 | RU14 | RU15 | RU16 |
| −1280:−1229 | −1226:−1175 | −1146:−1095 | −1092:−1041 |
| RU17 | RU18 | RU19 | RU20 |
| −1012:−961 | −958:−907 | −878:−827 | −824:−773 |

TABLE 169-continued

| RU21 | RU22 | RU23 | RU24 |
|---|---|---|---|
| −770:−719 | −716:−665 | −636:−585 | −582:−531 |
| RU25 | RU26 | RU27 | RU28 |
| −500:−449 | −446:−395 | −366:−315 | −312:−261 |
| RU29 | RU30 | RU31 | RU32 |
| −258:−207 | −204:−153 | −124:−73 | −70:−19 |

→RU33~RU64→ A subcarrier index of RU 32+x is equal to a value obtained by multiplying a minus sign (−) to a sign of an RU 33-x subcarrier index (x is a positive integer less than or equal to 32).

→Ex) A subcarrier index of RU 34 is equal to a value obtained by multiplying a minus sign (−) to a sign of an RU 31 subcarrier index, that is, 73:124

Null subcarriers: ±{18, 71, 72, 125, 152, 205, 206, 259, 260, 313, 314, 367, 394, 447, 448, 501, 502, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035}

<106 RU>

TABLE 170

| RU1 | RU2 | RU3 | RU4 |
|---|---|---|---|
| −2034:−1929 | −1900:−1795 | −1792:−1687 | −1658:−1553 |
| RU5 | RU6 | RU7 | RU8 |
| −1522:−1417 | −1388:−1283 | −1280:−1175 | −1146:−1041 |
| RU9 | RU10 | RU11 | RU12 |
| −1012:−907 | −878:−773 | −770:−665 | −636:−531 |
| RU13 | RU14 | RU15 | RU16 |
| −500:−395 | −366:−261 | −258:−153 | −124:−19 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 153:258

Null subcarriers: ±{18, 125, 152, 259, 260, 367, 394, 501, 502, 529, 530, 637, 664, 771, 772, 879, 906, 1013, 1040, 1147, 1174, 1281, 1282, 1389, 1416, 1523, 1524, 1551, 1552, 1659, 1686, 1793, 1794, 1901, 1928, 2035}

<242 RU>

TABLE 171

| RU1 | RU2 | RU3 | RU4 |
|---|---|---|---|
| −2035:−1794 | −1793:−1552 | −1523:−1282 | −1281:−1040 |
| RU5 | RU6 | RU7 | RU8 |
| −1013:−772 | −771:−530 | −501:−260 | −259:−18 |

→RU9~RU16→ A subcarrier index of RU 8+x is equal to a value obtained by multiplying a minus sign (−) to a sign of an RU 9-x subcarrier index (x is a positive integer less than or equal to 8).

→Ex) A subcarrier index of RU 10 is equal to a value obtained by multiplying a minus sign (−) to a sign of an RU 7 subcarrier index, that is, 260:501

Null subcarriers: ±{502, 529, 1524, 1551}

<484 RU>

TABLE 172

| RU1 | RU2 | RU3 | RU4 |
|---|---|---|---|
| −2035:−1552 | −1523:−1040 | −1013:−530 | −501:−18 |

→RU5~RU8→ A subcarrier index of RU 4+x is equal to a value obtained by multiplying a minus sign (−) to a sign of an RU 5-x subcarrier index (x is a positive integer less than or equal to 4).

→Ex) A subcarrier index of RU 6 is equal to a value obtained by multiplying a minus sign (−) to a sign of an RU 3 subcarrier index, that is, 530:1013

Null subcarriers: ±{502, 529, 1524, 1551}

<996 RU>

TABLE 173

| RU1 | RU2 | RU3 | RU4 |
|---|---|---|---|
| −2035:−1040 | −1013:−18 | 18:1013 | 1040:2035 |

Null subcarriers: X

<2018 RU>

TABLE 174

| RU1 | RU2 |
|---|---|
| −2035:−18 | 18:2035 |

Null subcarriers: X

<4066 or 4064 or 4062 RU for New 160 MHz Tone Plan>

4066RU: −2035:−3, 3:2035

4064RU: −2035:−4, 4:2035

4062RU: −2035:−5, 5:2035

Null subcarriers: X

Each RU and an index of a null tone are listed below in a case where 4062/4064/4066RU is used in full band transmission, a tone plan of '13G+2018RU+13RU+9DC+13RU+2018RU+12G' is used, and the second configuration of 996RU is used.

<26 RU>

TABLE 175

| RU1 | RU2 | RU3 | RU4 | RU5 | RU6 | RU7 | RU8 | RU9 |
|---|---|---|---|---|---|---|---|---|
| −2033:−2008 | −2007:−1982 | −1979:−1954 | −1953:−1928 | −1926:−1901 | −1899:−1874 | −1873:−1848 | −1845:−1820 | −1819:−1794 |
| RU10 | RU11 | RU12 | RU13 | RU14 | RU15 | RU16 | RU17 | RU18 | RU19 |
| −1791:−1766 | −1765:−1740 | −1737:−1712 | −1711:−1686 | −1684:−1659 | −1657:−1632 | −1631:−1606 | −1603:−1578 | −1577:−1552 | −1550:−1525 |
| RU20 | RU21 | RU22 | RU23 | RU24 | RU25 | RU26 | RU27 | RU28 | |
| −1523:−1498 | −1497:−1472 | −1469:−1444 | −1443:−1418 | −1416:−1391 | −1389:−1364 | −1363:−1338 | −1335:−1310 | −1309:−1284 | |
| RU29 | RU30 | RU31 | RU32 | RU33 | RU34 | RU35 | RU36 | RU37 | RU38 |
| −1281:−1256 | −1255:−1230 | −1227:−1202 | −1201:−1176 | −1174:−1149 | −1147:−1122 | −1121:−1096 | −1093:−1068 | −1067:−1042 | −1039:−1014 |
| RU39 | RU40 | RU41 | RU42 | RU43 | RU44 | RU45 | RU46 | RU47 | |
| −1011:−986 | −985:−960 | −957:−932 | −931:−906 | −904:−879 | −877:−852 | −851:−826 | −823:−798 | −797:−772 | |

TABLE 175-continued

| RU48 | RU49 | RU50 | RU51 | RU52 | RU53 | RU54 | RU55 | RU56 | RU57 |
|---|---|---|---|---|---|---|---|---|---|
| −769:−744 | −743:−718 | −715:−690 | −689:−664 | −662:−637 | −635:−610 | −609:−584 | −581:−556 | −555:−530 | −528:−503 |
| RU58 | RU59 | RU60 | RU61 | RU62 | RU63 | RU64 | RU65 | RU66 | |
| −501:−476 | −475:−450 | −447:−422 | −421:−396 | −394:−369 | −367:−342 | −341:−316 | −313:−288 | −287:−262 | |
| RU67 | RU68 | RU69 | RU70 | RU71 | RU72 | RU73 | RU74 | RU75 | RU76 |
| −259:−234 | −233:−208 | −205:−180 | −179:−154 | −152:−127 | −125:−100 | −99:−74 | −71:−46 | −45:−20 | −17:−5, 5:17 |

→RU77~RU151→ A subcarrier index of RU 76+x is equal to a value obtained by multiplying a minus sign (−) to a sign of an RU 76-x subcarrier index (x is a positive integer less than or equal to 75).

→Ex) A subcarrier index of RU 77 is equal to a value obtained by multiplying a minus sign (−) to a sign of an RU 75 subcarrier index, that is, 20:45

Null subcarriers: ±{18, 19, 72, 73, 126, 153, 206, 207, 260, 261, 314, 315, 368, 395, 448, 449, 502, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035}
<52 RU>

TABLE 176

| RU1 | RU2 | RU3 | RU4 |
|---|---|---|---|
| −2033:−1982 | −1979:−1928 | −1899:−1848 | −1845:−1794 |
| RU5 | RU6 | RU7 | RU8 |
| −1791:−1740 | −1737:−1686 | −1657:−1606 | −1603:−1552 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1011:−960 | −957:−906 | −877:−826 | −823:−772 |
| RU21 | RU22 | RU23 | RU24 |
| −769:−718 | −715:−664 | −635:−584 | −581:−530 |
| RU25 | RU26 | RU27 | RU28 |
| −501:−450 | −447:−396 | −367:−316 | −313:−262 |
| RU29 | RU30 | RU31 | RU32 |
| −259:−208 | −205:−154 | −125:−74 | −71:−20 |

→RU33~RU64→ A subcarrier index of RU 32+x is equal to a value obtained by multiplying a minus sign (−) to a sign of an RU 33-x subcarrier index (x is a positive integer less than or equal to 32).

→Ex) A subcarrier index of RU 34 is equal to a value obtained by multiplying a minus sign (−) to a sign of an RU 31 subcarrier index, that is, 74:125

Null subcarriers: ±{18, 19, 72, 73, 126, 153, 206, 207, 260, 261, 314, 315, 368, 395, 448, 449, 502, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035}
<106 RU>

TABLE 177

| RU1 | RU2 | RU3 | RU4 |
|---|---|---|---|
| −2033:−1928 | −1899:−1794 | −1791:−1686 | −1657:−1552 |
| RU5 | RU6 | RU7 | RU8 |
| −1523:−1418 | −1389:−1284 | −1281:−1176 | −1147:−1042 |
| RU9 | RU10 | RU11 | RU12 |
| −1011:−906 | −877:−772 | −769:−664 | −635:−530 |
| RU13 | RU14 | RU15 | RU16 |
| −501:−396 | −367:−262 | −259:−154 | −125:−20 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 154:259

Null subcarriers: ±{18, 19, 126, 153, 260, 261, 368, 395, 502, 529, 636, 663, 770, 771, 878, 905, 1012, 1013, 1040, 1041, 1148, 1175, 1282, 1283, 1390, 1417, 1524, 1551, 1658, 1685, 1792, 1793, 1900, 1927, 2034, 2035}
<242 RU>

TABLE 178

| RU1 | RU2 | RU3 | RU4 |
|---|---|---|---|
| −2034:−1793 | −1792:−1551 | −1524:−1283 | −1282:−1041 |
| RU5 | RU6 | RU7 | RU8 |
| −1012:−771 | −770:−529 | −502:−261 | −260:−19 |

→RU9~RU16→ A subcarrier index of RU 8+x is equal to a value obtained by multiplying a minus sign (−) to a sign of an RU 9-x subcarrier index (x is a positive integer less than or equal to 8).

→Ex) A subcarrier index of RU 10 is equal to a value obtained by multiplying a minus sign (−) to a sign of an RU 7 subcarrier index, that is, 261:502

Null subcarriers: ±{18, 1013, 1040, 2035}
<484 RU>

TABLE 179

| RU1 | RU2 | RU3 | RU4 |
|---|---|---|---|
| −2034:−1551 | −1524:−1041 | −1012:−529 | −502:−19 |

→RU5~RU8→ A subcarrier index of RU 4+x is equal to a value obtained by multiplying a minus sign (−) to a sign of an RU 5-x subcarrier index (x is a positive integer less than or equal to 4).

→Ex) A subcarrier index of RU 6 is equal to a value obtained by multiplying a minus sign (−) to a sign of an RU 3 subcarrier index, that is, 529:1012

Null subcarriers: ±{18, 1013, 1040, 2035}
<996 RU>

TABLE 180

| RU1 | RU2 | RU3 | RU4 |
|---|---|---|---|
| −2035:−1040 | −1013:−18 | 18:1013 | 1040:2035 |

Null subcarriers: X
<2018 RU>

TABLE 181

| RU1 | RU2 |
|---|---|
| −2035:−18 | 18:2035 |

Null subcarriers: X

<4066 or 4064 or 4062 RU for New 160 MHz Tone Plan>
4066RU: −2035:−3, 3:2035
4064RU: −2035:−4, 4:2035
4062RU: −2035:−5, 5:2035
Null subcarriers: X Each RU and an index of a null tone are listed below in a case where 4062/4064/4066RU is used in full band transmission, a tone plan of '13G+2018RU+1N+13RU+7DC+13RU+1N+2018RU+12G' is used, and the first configuration of 996RU is used.

<26 RU>

→Ex) A subcarrier index of RU 34 is equal to a value obtained by multiplying a minus sign (−) to a sign of an RU 31 subcarrier index, that is, 73:124

Null subcarriers: ±{17, 18, 71, 72, 125, 152, 205, 206, 259, 260, 313, 314, 367, 394, 447, 448, 501, 502, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035}

TABLE 182

| RU1 | RU2 | RU3 | RU4 | RU5 | RU6 | RU7 | RU8 | RU9 | |
|---|---|---|---|---|---|---|---|---|---|
| −2034:−2009 | −2008:−1983 | −1980:−1955 | −1954:−1929 | −1927:−1902 | −1900:−1875 | −1874:−1849 | −1846:−1821 | −1820:−1795 | |
| RU10 | RU11 | RU12 | RU13 | RU14 | RU15 | RU16 | RU17 | RU18 | RU19 |
| −1792:−1767 | −1766:−1741 | −1738:−1713 | −1712:−1687 | −1685:−1660 | −1658:−1633 | −1632:−1607 | −1604:−1579 | −1578:−1553 | −1550:−1525 |
| RU20 | RU21 | RU22 | RU23 | RU24 | RU25 | RU26 | RU27 | RU28 | |
| −1522:−1497 | −1496:−1471 | −1468:−1443 | −1442:−1417 | −1415:−1390 | −1388:−1363 | −1362:−1337 | −1334:−1309 | −1308:−1283 | |
| RU29 | RU30 | RU31 | RU32 | RU33 | RU34 | RU35 | RU36 | RU37 | RU38 |
| −1280:−1255 | −1254:−1229 | −1226:−1201 | −1200:−1175 | −1173:−1148 | −1146:−1121 | −1120:−1095 | −1092:−1067 | −1066:−1041 | −1039:−1014 |
| RU39 | RU40 | RU41 | RU42 | RU43 | RU44 | RU45 | RU46 | RU47 | |
| −1012:−987 | −986:−961 | −958:−933 | −932:−907 | −905:−880 | −878:−853 | −852:−827 | −824:−799 | −798:−773 | |
| RU48 | RU49 | RU50 | RU51 | RU52 | RU53 | RU54 | RU55 | RU56 | RU57 |
| −770:−745 | −744:−719 | −716:−691 | −690:−665 | −663:−638 | −636:−611 | −610:−585 | −582:−557 | −556:−531 | −528:−503 |
| RU58 | RU59 | RU60 | RU61 | RU62 | RU63 | RU64 | RU65 | RU66 | |
| −500:−475 | −474:−449 | −446:−421 | −420:−395 | −393:−368 | −366:−341 | −340:−315 | −312:−287 | −286:−261 | |
| RU67 | RU68 | RU69 | RU70 | RU71 | RU72 | RU73 | RU74 | RU75 | RU76 |
| −258:−233 | −232:−207 | −204:−179 | −178:−153 | −151:−126 | −124:−99 | −98:−73 | −70:−45 | −44:−19 | −16:−4, 4:16 |

→RU77~RU151→ A subcarrier index of RU 76+x is equal to a value obtained by multiplying a minus sign (−) to a sign of an RU 76-x subcarrier index (x is a positive integer less than or equal to 75).

→Ex) A subcarrier index of RU 77 is equal to a value obtained by multiplying a minus sign (−) to a sign of an RU 75 subcarrier index, that is, 19:44

Null subcarriers: ±{17, 18, 71, 72, 125, 152, 205, 206, 259, 260, 313, 314, 367, 394, 447, 448, 501, 502, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035}

<52 RU>

TABLE 183

| RU1 | RU2 | RU3 | RU4 |
|---|---|---|---|
| −2034:−1983 | −1980:−1929 | −1900:−1849 | −1846:−1795 |
| RU5 | RU6 | RU7 | RU8 |
| −1792:−1741 | −1738:−1687 | −1658:−1607 | −1604:−1553 |
| RU9 | RU10 | RU11 | RU12 |
| −1522:−1471 | −1468:−1417 | −1388:−1337 | −1334:−1283 |
| RU13 | RU14 | RU15 | RU16 |
| −1280:−1229 | −1226:−1175 | −1146:−1095 | −1092:−1041 |
| RU17 | RU18 | RU19 | RU20 |
| −1012:−961 | −958:−907 | −878:−827 | −824:−773 |
| RU21 | RU22 | RU23 | RU24 |
| −770:−719 | −716:−665 | −636:−585 | −582:−531 |
| RU25 | RU26 | RU27 | RU28 |
| −500:−449 | −446:−395 | −366:−315 | −312:−261 |
| RU29 | RU30 | RU31 | RU32 |
| −258:−207 | −204:−153 | −124:−73 | −70:−19 |

→RU33~RU64→ A subcarrier index of RU 32+x is equal to a value obtained by multiplying a minus sign (−) to a sign of an RU 33-x subcarrier index (x is a positive integer less than or equal to 32).

<106 RU>

TABLE 184

| RU1 | RU2 | RU3 | RU4 |
|---|---|---|---|
| −2034:−1929 | −1900:−1795 | −1792:−1687 | −1658:−1553 |
| RU5 | RU6 | RU7 | RU8 |
| −1522:−1417 | −1388:−1283 | −1280:−1175 | −1146:−1041 |
| RU9 | RU10 | RU11 | RU12 |
| −1012:−907 | −878:−773 | −770:−665 | −636:−531 |
| RU13 | RU14 | RU15 | RU16 |
| −500:−395 | −366:−261 | −258:−153 | −124:−19 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 153:258

Null subcarriers: ±{17, 18, 125, 152, 259, 260, 367, 394, 501, 502, 529, 530, 637, 664, 771, 772, 879, 906, 1013, 1040, 1147, 1174, 1281, 1282, 1389, 1416, 1523, 1524, 1551, 1552, 1659, 1686, 1793, 1794, 1901, 1928, 2035}

<242 RU>

TABLE 185

| RU1 | RU2 | RU3 | RU4 |
|---|---|---|---|
| −2035:−1794 | −1793:−1552 | −1523:−1282 | −1281:−1040 |
| RU5 | RU6 | RU7 | RU8 |
| −1013:−772 | −771:−530 | −501:−260 | −259:−18 |

→RU9~RU16→ A subcarrier index of RU 8+x is equal to a value obtained by multiplying a minus sign (−) to a sign of an RU 9-x subcarrier index (x is a positive integer less than or equal to 8).

→Ex) A subcarrier index of RU 10 is equal to a value obtained by multiplying a minus sign (−) to a sign of an RU 7 subcarrier index, that is, 260:501

Null subcarriers: ±{17, 502, 529, 1524, 1551}

<484 RU>

TABLE 186

| RU1 | RU2 | RU3 | RU4 |
|---|---|---|---|
| −2035:−1552 | −1523:−1040 | −1013:−530 | −501:−18 |

→RU5~RU8→ A subcarrier index of RU 4+x is equal to a value obtained by multiplying a minus sign (−) to a sign of an RU 5-x subcarrier index (x is a positive integer less than or equal to 4).
→Ex) A subcarrier index of RU 6 is equal to a value obtained by multiplying a minus sign (−) to a sign of an RU 3 subcarrier index, that is, 530:1013
Null subcarriers: ±{17, 502, 529, 1524, 1551}
<996 RU>

TABLE 187

| RU1 | RU2 | RU3 | RU4 |
|---|---|---|---|
| −2035:−1040 | −1013:−18 | 18:1013 | 1040:2035 |

Null subcarriers: ±{17}
<2018 RU>

TABLE 188

| RU1 | RU2 |
|---|---|
| −2035:−18 | 18:2035 |

Null subcarriers: ±{17}
<4066 or 4064 or 4062 RU for New 160 MHz Tone Plan>
4066RU: −2035:−3, 3:2035
4064RU: −2035:−4, 4:2035
4062RU: −2035:−5, 5:2035
Null subcarriers: X
Each RU and an index of a null tone are listed below in a case where 4062/4064/4066RU is used in full band transmission, a tone plan of '13G+2018RU+1N+13RU+7DC+13RU+1N+2018RU+12G' is used, and the second configuration of 996RU is used.
<26 RU>

TABLE 189

| RU1 | RU2 | RU3 | RU4 | RU5 | RU6 | RU7 | RU8 | RU9 | |
|---|---|---|---|---|---|---|---|---|---|
| −2033:−2008 | −2007:−1982 | −1979:−1954 | −1953:−1928 | −1926:−1901 | −1899:−1874 | −1873:−1848 | −1845:−1820 | −1819:−1794 | |
| RU10 | RU11 | RU12 | RU13 | RU14 | RU15 | RU16 | RU17 | RU18 | RU19 |
| −1791:−1766 | −1765:−1740 | −1737:−1712 | −1711:−1686 | −1684:−1659 | −1657:−1632 | −1631:−1606 | −1603:−1578 | −1577:−1552 | −1550:−1525 |
| RU20 | RU21 | RU22 | RU23 | RU24 | RU25 | RU26 | RU27 | RU28 | |
| −1523:−1498 | −1497:−1472 | −1469:−1444 | −1443:−1418 | −1416:−1391 | −1389:−1364 | −1363:−1338 | −1335:−1310 | −1309:−1284 | |
| RU29 | RU30 | RU31 | RU32 | RU33 | RU34 | RU35 | RU36 | RU37 | RU38 |
| −1281:−1256 | −1255:−1230 | −1227:−1202 | −1201:−1176 | −1174:−1149 | −1147:−1122 | −1121:−1096 | −1093:−1068 | −1067:−1042 | −1039:−1014 |
| RU39 | RU40 | RU41 | RU42 | RU43 | RU44 | RU45 | RU46 | RU47 | |
| −1011:−986 | −985:−960 | −957:−932 | −931:−906 | −904:−879 | −877:−852 | −851:−826 | −823:−798 | −797:−772 | |
| RU48 | RU49 | RU50 | RU51 | RU52 | RU53 | RU54 | RU55 | RU56 | RU57 |
| −769:−744 | −743:−718 | −715:−690 | −689:−664 | −662:−637 | −635:−610 | −609:−584 | −581:−556 | −555:−530 | −528:−503 |
| RU58 | RU59 | RU60 | RU61 | RU62 | RU63 | RU64 | RU65 | RU66 | |
| −501:−476 | −475:−450 | −447:−422 | −421:−396 | −394:−369 | −367:−342 | −341:−316 | −313:−288 | −287:−262 | |
| RU67 | RU68 | RU69 | RU70 | RU71 | RU72 | RU73 | RU74 | RU75 | RU76 |
| −259:−234 | −233:−208 | −205:−180 | −179:−154 | −152:−127 | −125:−100 | −99:−74 | −71:−46 | −45:−20 | −16:−4, 4:16 |

→RU77~RU151→ A subcarrier index of RU 76+x is equal to a value obtained by multiplying a minus sign (−) to a sign of an RU 76-x subcarrier index (x is a positive integer less than or equal to 75).
→Ex) A subcarrier index of RU 77 is equal to a value obtained by multiplying a minus sign (−) to a sign of an RU 75 subcarrier index, that is, 20:45

Null subcarriers: ±{17, 18, 19, 72, 73, 126, 153, 206, 207, 260, 261, 314, 315, 368, 395, 448, 449, 502, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035}
<52 RU>

TABLE 190

| RU1 | RU2 | RU3 | RU4 |
|---|---|---|---|
| −2033:−1982 | −1979:−1928 | −1899:−1848 | −1845:−1794 |
| RU5 | RU6 | RU7 | RU8 |
| −1791:−1740 | −1737:−1686 | −1657:−1606 | −1603:−1552 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1011:−960 | −957:−906 | −877:−826 | −823:−772 |
| RU21 | RU22 | RU23 | RU24 |
| −769:−718 | −715:−664 | −635:−584 | −581:−530 |
| RU25 | RU26 | RU27 | RU28 |
| −501:−450 | −447:−396 | −367:−316 | −313:−262 |
| RU29 | RU30 | RU31 | RU32 |
| −259:−208 | −205:−154 | −125:−74 | −71:−20 |

→RU33~RU64→ A subcarrier index of RU 32+x is equal to a value obtained by multiplying a minus sign (−) to a sign of an RU 33-x subcarrier index (x is a positive integer less than or equal to 32).
→Ex) A subcarrier index of RU 34 is equal to a value obtained by multiplying a minus sign (−) to a sign of an RU 31 subcarrier index, that is, 74:125

Null subcarriers: ±{17, 18, 19, 72, 73, 126, 153, 206, 207, 260, 261, 314, 315, 368, 395, 448, 449, 502, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035}
<106 RU>

TABLE 191

| RU1 | RU2 | RU3 | RU4 |
|---|---|---|---|
| −2033:−1928 | −1899:−1794 | −1791:−1686 | −1657:−1552 |
| RU5 | RU6 | RU7 | RU8 |
| −1523:−1418 | −1389:−1284 | −1281:−1176 | −1147:−1042 |
| RU9 | RU10 | RU11 | RU12 |
| −1011:−906 | −877:−772 | −769:−664 | −635:−530 |
| RU13 | RU14 | RU15 | RU16 |
| −501:−396 | −367:−262 | −259:−154 | −125:−20 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 154:259

Null subcarriers: ±{17, 18, 19, 126, 153, 260, 261, 368, 395, 502, 529, 636, 663, 770, 771, 878, 905, 1012, 1013, 1040, 1041, 1148, 1175, 1282, 1283, 1390, 1417, 1524, 1551, 1658, 1685, 1792, 1793, 1900, 1927, 2034, 2035}
<242 RU>

TABLE 192

| RU1 | RU2 | RU3 | RU4 |
|---|---|---|---|
| −2034:−1793 | −1792:−1551 | −1524:−1283 | −1282:−1041 |
| RU5 | RU6 | RU7 | RU8 |
| −1012:−771 | −770:−529 | −502:−261 | −260:−19 |

→RU9~RU16→ A subcarrier index of RU 8+x is equal to a value obtained by multiplying a minus sign (−) to a sign of an RU 9-x subcarrier index (x is a positive integer less than or equal to 8).

→Ex) A subcarrier index of RU 10 is equal to a value obtained by multiplying a minus sign (−) to a sign of an RU 7 subcarrier index, that is, 261:502

Null subcarriers: ±{17, 18, 1013, 1040, 2035}
<484 RU>

TABLE 193

| RU1 | RU2 | RU3 | RU4 |
|---|---|---|---|
| −2034:−1551 | −1524:−1041 | −1012:−529 | −502:−19 |

→RU5~RU8→ A subcarrier index of RU 4+x is equal to a value obtained by multiplying a minus sign (−) to a sign of an RU 5-x subcarrier index (x is a positive integer less than or equal to 4).

→Ex) A subcarrier index of RU 6 is equal to a value obtained by multiplying a minus sign (−) to a sign of an RU 3 subcarrier index, that is, 529:1012

Null subcarriers: ±{17, 18, 1013, 1040, 2035}
<996 RU>

TABLE 194

| RU1 | RU2 | RU3 | RU4 |
|---|---|---|---|
| −2035:−1040 | −1013:−18 | 18:1013 | 1040:2035 |

Null subcarriers: ±{17}
<2018 RU>

TABLE 195

| RU1 | RU2 |
|---|---|
| −2035:−18 | 18:2035 |

Null subcarriers: ±{17}
<4066 or 4064 or 4062 RU for New 160 MHz Tone Plan>
4066RU: −2035:−3, 3:2035
4064RU: −2035:−4, 4:2035
4062RU: −2035:−5, 5:2035
Null subcarriers: X
Each RU and an index of a null tone are listed below in a case where 4062/4064/4066RU is used in full band transmission, a tone plan of '13G+2018RU+2N+13RU+5DC+13RU+2N+2018RU+12G' is used, and the first configuration of 996RU is used.
<26 RU>

TABLE 196

| RU1 | RU2 | RU3 | RU4 | RU5 | RU6 | RU7 | RU8 | RU9 | |
|---|---|---|---|---|---|---|---|---|---|
| −2034:−2009 | −2008:−1983 | −1980:−1955 | −1954:−1929 | −1927:−1902 | −1900:−1875 | −1874:−1849 | −1846:−1821 | −1820:−1795 | |
| RU10 | RU11 | RU12 | RU13 | RU14 | RU15 | RU16 | RU17 | RU18 | RU19 |
| −1792:−1767 | −1766:−1741 | −1738:−1713 | −1712:−1687 | −1685:−1660 | −1658:−1633 | −1632:−1607 | −1604:−1579 | −1578:−1553 | −1550:−1525 |
| RU20 | RU21 | RU22 | RU23 | RU24 | RU25 | RU26 | RU27 | RU28 | |
| −1522:−1497 | −1496:−1471 | −1468:−1443 | −1442:−1417 | −1415:−1390 | −1388:−1363 | −1362:−1337 | −1334:−1309 | −1308:−1283 | |
| RU29 | RU30 | RU31 | RU32 | RU33 | RU34 | RU35 | RU36 | RU37 | RU38 |
| −1280:−1255 | −1254:−1229 | −1226:−1201 | −1200:−1175 | −1173:−1148 | −1146:−1121 | −1120:−1095 | −1092:−1067 | −1066:−1041 | −1039:−1014 |
| RU39 | RU40 | RU41 | RU42 | RU43 | RU44 | RU45 | RU46 | RU47 | |
| −1012:−987 | −986:−961 | −958:−933 | −932:−907 | −905:−880 | −878:−853 | −852:−827 | −824:−799 | −798:−773 | |
| RU48 | RU49 | RU50 | RU51 | RU52 | RU53 | RU54 | RU55 | RU56 | RU57 |
| −770:−745 | −744:−719 | −716:−691 | −690:−665 | −663:−638 | −636:−611 | −610:−585 | −582:−557 | −556:−531 | −528:−503 |
| RU58 | RU59 | RU60 | RU61 | RU62 | RU63 | RU64 | RU65 | RU66 | |
| −500:−475 | −474:−449 | −446:−421 | −420:−395 | −393:−368 | −366:−341 | −340:−315 | −312:−287 | −286:−261 | |
| RU67 | RU68 | RU69 | RU70 | RU71 | RU72 | RU73 | RU74 | RU75 | RU76 |
| −258:−233 | −232:−207 | −204:−179 | −178:−153 | −151:−126 | −124:−99 | −98:−73 | −70:−45 | −44:−19 | −15:−3, 3:15 |

→RU77~RU151→ A subcarrier index of RU 76+x is equal to a value obtained by multiplying a minus sign (−) to a sign of an RU 76-x subcarrier index (x is a positive integer less than or equal to 75).
→Ex) A subcarrier index of RU 77 is equal to a value obtained by multiplying a minus sign (−) to a sign of an RU 75 subcarrier index, that is, 19:44

Null subcarriers: ±{16, 17, 18, 71, 72, 125, 152, 205, 206, 259, 260, 313, 314, 367, 394, 447, 448, 501, 502, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035}
<52 RU>

TABLE 197

| RU1 | RU2 | RU3 | RU4 |
|---|---|---|---|
| −2034:−1983 | −1980:−1929 | −1900:−1849 | −1846:−1795 |
| RU5 | RU6 | RU7 | RU8 |
| −1792:−1741 | −1738:−1687 | −1658:−1607 | −1604:−1553 |
| RU9 | RU10 | RU11 | RU12 |
| −1522:−1471 | −1468:−1417 | −1388:−1337 | −1334:−1283 |
| RU13 | RU14 | RU15 | RU16 |
| −1280:−1229 | −1226:−1175 | −1146:−1095 | −1092:−1041 |
| RU17 | RU18 | RU19 | RU20 |
| −1012:−961 | −958:−907 | −878:−827 | −824:−773 |
| RU21 | RU22 | RU23 | RU24 |
| −770:−719 | −716:−665 | −636:−585 | −582:−531 |
| RU25 | RU26 | RU27 | RU28 |
| −500:−449 | −446:−395 | −366:−315 | −312:−261 |
| RU29 | RU30 | RU31 | RU32 |
| −258:−207 | −204:−153 | −124:−73 | −70:−19 |

→RU33~RU64→ A subcarrier index of RU 32+x is equal to a value obtained by multiplying a minus sign (−) to a sign of an RU 33-x subcarrier index (x is a positive integer less than or equal to 32).
→Ex) A subcarrier index of RU 34 is equal to a value obtained by multiplying a minus sign (−) to a sign of an RU 31 subcarrier index, that is, 73:124

Null subcarriers: ±{16, 17, 18, 71, 72, 125, 152, 205, 206, 259, 260, 313, 314, 367, 394, 447, 448, 501, 502, 529, 530, 583, 584, 637, 664, 717, 718, 771, 772, 825, 826, 879, 906, 959, 960, 1013, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035}
<106 RU>

TABLE 198

| RU1 | RU2 | RU3 | RU4 |
|---|---|---|---|
| −2034:−1929 | −1900:−1795 | −1792:−1687 | −1658:−1553 |
| RU5 | RU6 | RU7 | RU8 |
| −1522:−1417 | −1388:−1283 | −1280:−1175 | −1146:−1041 |
| RU9 | RU10 | RU11 | RU12 |
| −1012:−907 | −878:−773 | −770:−665 | −636:−531 |
| RU13 | RU14 | RU15 | RU16 |
| −500:−395 | −366:−261 | −258:−153 | −124:−19 |

→RU17~RU32→ A subcarrier index of RU 16+x is equal to a value obtained by multiplying a minus sign (−) to a sign of an RU 17-x subcarrier index (x is a positive integer less than or equal to 16).
→Ex) A subcarrier index of RU 18 is equal to a value obtained by multiplying a minus sign (−) to a sign of an RU 15 subcarrier index, that is, 153:258

Null subcarriers: ±{16, 17, 18, 125, 152, 259, 260, 367, 394, 501, 502, 529, 530, 637, 664, 771, 772, 879, 906, 1013, 1040, 1147, 1174, 1281, 1282, 1389, 1416, 1523, 1524, 1551, 1552, 1659, 1686, 1793, 1794, 1901, 1928, 2035}
<242 RU>

TABLE 199

| RU1 | RU2 | RU3 | RU4 |
|---|---|---|---|
| −2035:−1794 | −1793:−1552 | −1523:−1282 | −1281:−1040 |
| RU5 | RU6 | RU7 | RU8 |
| −1013:−772 | −771:−530 | −501:−260 | −259:−18 |

→RU9~RU16→ A subcarrier index of RU 8+x is equal to a value obtained by multiplying a minus sign (−) to a sign of an RU 9-x subcarrier index (x is a positive integer less than or equal to 8).
→Ex) A subcarrier index of RU 10 is equal to a value obtained by multiplying a minus sign (−) to a sign of an RU 7 subcarrier index, that is, 260:501

Null subcarriers: ±{16, 17, 502, 529, 1524, 1551}
<484 RU>

TABLE 200

| RU1 | RU2 | RU3 | RU4 |
|---|---|---|---|
| −2035:−1552 | −1523:−1040 | −1013:−530 | −501:−18 |

→RU5~RU8→ A subcarrier index of RU 4+x is equal to a value obtained by multiplying a minus sign (−) to a sign of an RU 5-x subcarrier index (x is a positive integer less than or equal to 4).
→Ex) A subcarrier index of RU 6 is equal to a value obtained by multiplying a minus sign (−) to a sign of an RU 3 subcarrier index, that is, 530:1013

Null subcarriers: ±{16, 17, 502, 529, 1524, 1551}
<996 RU>

TABLE 201

| RU1 | RU2 | RU3 | RU4 |
|---|---|---|---|
| −2035:−1040 | −1013:−18 | 18:1013 | 1040:2035 |

Null subcarriers: ±{16, 17}

<2018 RU>

TABLE 202

| RU1 | RU2 |
|---|---|
| −2035:−18 | 18:2035 |

Null subcarriers: ±{16, 17}
<4066 or 4064 or 4062 RU for New 160 MHz Tone Plan>
4066RU: −2035:−3, 3:2035
4064RU: −2035:−4, 4:2035
4062RU: −2035:−5, 5:2035
Null subcarriers: X
Each RU and an index of a null tone are listed below in a case where 4062/4064/4066RU is used in full band transmission, a tone plan of '13G+2018RU+2N+13RU+5DC+13RU+2N+2018RU+12G' is used, and the second configuration of 996RU is used.
<26 RU>

TABLE 203

| RU1 | RU2 | RU3 | RU4 | RU5 | RU6 | RU7 | RU8 | RU9 | |
|---|---|---|---|---|---|---|---|---|---|
| −2033:−2008 | −2007:−1982 | −1979:−1954 | −1953:−1928 | −1926:−1901 | −1899:−1874 | −1873:−1848 | −1845:−1820 | −1819:−1794 | |
| RU10 | RU11 | RU12 | RU13 | RU14 | RU15 | RU16 | RU17 | RU18 | RU19 |
| −1791:−1766 | −1765:−1740 | −1737:−1712 | −1711:−1686 | −1684:−1659 | −1657:−1632 | −1631:−1606 | −1603:−1578 | −1577:−1552 | −1550:−1525 |
| RU20 | RU21 | RU22 | RU23 | RU24 | RU25 | RU26 | RU27 | RU28 | |
| −1523:−1498 | −1497:−1472 | −1469:−1444 | −1443:−1418 | −1416:−1391 | −1389:−1364 | −1363:−1338 | −1335:−1310 | −1309:−1284 | |
| RU29 | RU30 | RU31 | RU32 | RU33 | RU34 | RU35 | RU36 | RU37 | RU38 |
| −1281:−1256 | −1255:−1230 | −1227:−1202 | 1201:−1176 | −1174:−1149 | −1147:−1122 | −1121:−1096 | −1093:−1068 | −1067:−1042 | −1039:−1014 |
| RU39 | RU40 | RU41 | RU42 | RU43 | RU44 | RU45 | RU46 | RU47 | |
| −1011:−986 | −985:−960 | −957:−932 | −931:−906 | −904:−879 | −877:−852 | −851:−826 | −823:−798 | −797:−772 | |
| RU48 | RU49 | RU50 | RU51 | RU52 | RU53 | RU54 | RU55 | RU56 | RU57 |
| −769:−744 | −743:−718 | −715:−690 | −689:−664 | −662:−637 | −635:−610 | −609:−584 | −581:−556 | −555:−530 | −528:−503 |
| RU58 | RU59 | RU60 | RU61 | RU62 | RU63 | RU64 | RU65 | RU66 | |
| −501:−476 | −475:−450 | −447:−422 | −421:−396 | −394:−369 | −367:−342 | −341:−316 | −313:−288 | −287:−262 | |
| RU67 | RU68 | RU69 | RU70 | RU71 | RU72 | RU73 | RU74 | RU75 | RU76 |
| −259:−234 | −233:−208 | −205:−180 | −179:−154 | −152:−127 | −125:−100 | −99:−74 | −71:−46 | −45:−20 | −15:−3, 3:15 |

→RU77~RU151→ A subcarrier index of RU 76+x is equal to a value obtained by multiplying a minus sign (−) to a sign of an RU 76-x subcarrier index (x is a positive integer less than or equal to 75).
→Ex) A subcarrier index of RU 77 is equal to a value obtained by multiplying a minus sign (−) to a sign of an RU 75 subcarrier index, that is, 20:45
Null subcarriers: ±{16, 17, 18, 19, 72, 73, 126, 153, 206, 207, 260, 261, 314, 315, 368, 395, 448, 449, 502, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035}
<52 RU>

TABLE 204

| RU1 | RU2 | RU3 | RU4 |
|---|---|---|---|
| −2033:−1982 | −1979:−1928 | −1899:−1848 | −1845:−1794 |
| RU5 | RU6 | RU7 | RU8 |
| −1791:−1740 | −1737:−1686 | −1657:−1606 | −1603:−1552 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1011:−960 | −957:−906 | −877:−826 | −823:−772 |
| RU21 | RU22 | RU23 | RU24 |
| −769:−718 | −715:−664 | −635:−584 | −581:−530 |
| RU25 | RU26 | RU27 | RU28 |
| −501:−450 | −447:−396 | −367:−316 | −313:−262 |
| RU29 | RU30 | RU31 | RU32 |
| −259:−208 | −205:−154 | −125:−74 | −71:−20 |

→RU33~RU64→ A subcarrier index of RU 32+x is equal to a value obtained by multiplying a minus sign (−) to a sign of an RU 33-x subcarrier index (x is a positive integer less than or equal to 32).
→Ex) A subcarrier index of RU 34 is equal to a value obtained by multiplying a minus sign (−) to a sign of an RU 31 subcarrier index, that is, 74:125
Null subcarriers: ±{16, 17, 18, 19, 72, 73, 126, 153, 206, 207, 260, 261, 314, 315, 368, 395, 448, 449, 502, 529, 582, 583, 636, 663, 716, 717, 770, 771, 824, 825, 878, 905, 958, 959, 1012, 1013, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035}
<106 RU>

TABLE 205

| RU1 | RU2 | RU3 | RU4 |
|---|---|---|---|
| −2033:−1928 | −1899:−1794 | −1791:−1686 | −1657:−1552 |
| RU5 | RU6 | RU7 | RU8 |
| −1523:−1418 | −1389:−1284 | −1281:−1176 | −1147:−1042 |
| RU9 | RU10 | RU11 | RU12 |
| −1011:−906 | −877:−772 | −769:−664 | −635:−530 |
| RU13 | RU14 | RU15 | RU16 |
| −501:−396 | −367:−262 | −259:−154 | −125:−20 |

→RU17~RU32→ A subcarrier index of RU 16+x is equal to a value obtained by multiplying a minus sign (−) to a sign of an RU 17-x subcarrier index (x is a positive integer less than or equal to 16).
→Ex) A subcarrier index of RU 18 is equal to a value obtained by multiplying a minus sign (−) to a sign of an RU 15 subcarrier index, that is, 154:259
Null subcarriers: ±{16, 17, 18, 19, 126, 153, 260, 261, 368, 395, 502, 529, 636, 663, 770, 771, 878, 905, 1012, 1013, 1040, 1041, 1148, 1175, 1282, 1283, 1390, 1417, 1524, 1551, 1658, 1685, 1792, 1793, 1900, 1927, 2034, 2035}
<242 RU>

TABLE 206

| RU1 | RU2 | RU3 | RU4 |
|---|---|---|---|
| −2034:−1793 | −1792:−1551 | −1524:−1283 | −1282:−1041 |

TABLE 206-continued

| RU5 | RU6 | RU7 | RU8 |
|---|---|---|---|
| −1012:−771 | −770:−529 | −502:−261 | −260:−19 |

→RU9~RU16→ A subcarrier index of RU 8+x is equal to a value obtained by multiplying a minus sign (−) to a sign of an RU 9-x subcarrier index (x is a positive integer less than or equal to 8).

→Ex) A subcarrier index of RU 10 is equal to a value obtained by multiplying a minus sign (−) to a sign of an RU 7 subcarrier index, that is, 261:502

Null subcarriers: ±{16, 17, 18, 1013, 1040, 2035}
<484 RU>

TABLE 207

| RU1 | RU2 | RU3 | RU4 |
|---|---|---|---|
| −2034:−1551 | −1524:−1041 | −1012:−529 | −502:−19 |

→RU5~RU8→ A subcarrier index of RU 4+x is equal to a value obtained by multiplying a minus sign (−) to a sign of an RU 5-x subcarrier index (x is a positive integer less than or equal to 4).

→Ex) A subcarrier index of RU 6 is equal to a value obtained by multiplying a minus sign (−) to a sign of an RU 3 subcarrier index, that is, 529:1012

Null subcarriers: ±{16, 17, 18, 1013, 1040, 2035}
<996 RU>

TABLE 208

| RU1 | RU2 | RU3 | RU4 |
|---|---|---|---|
| −2035:−1040 | −1013:−18 | 18:1013 | 1040:2035 |

Null subcarriers: ±{16, 17}
<2018 RU>

TABLE 209

| RU1 | RU2 |
|---|---|
| −2035:−18 | 18:2035 |

Null subcarriers: ±{16, 17}
<4066 or 4064 or 4062 RU for New 160 MHz Tone Plan>
4066RU: −2035:−3, 3:2035
4064RU: −2035:−4, 4:2035
4062RU: −2035:−5, 5:2035
Null subcarriers: X G. Alternative 320 MHz Tone Plan 5

In order to reduce an effect of interference to an adjacent channel or from the adjacent channel in the alternative 320 MHz tone plan 1, a guard tone is increased one by one to use 13 left/12 right guard tones. Instead, a tone plan may be designed in such a manner that a DC offset is decreased to some extent by decreasing the DC by one in the OFDMA tone plan. A full band and OFDAM tone plan is as follows.

<Full Band>
13/12 guard tone, 5DC, 4066RU (RU subcarrier index: −2035:−3, 3:2035)

<OFDMA Tone Plan>
13G+2020RU+13RU+5DC+13RU+2020RU+12G

The following two configurations are proposed as a 2020RU configuration.

2020RU=996RU+1N+26RU+1N+996RU

2020RU=1N+996RU+26RU+996RU+1N

In a first configuration, a null tone is present at both sides of the 26RU so that an effect of interference from/to an adjacent RU can be decreased. In a second configuration, the effect of interference between 996RU and its adjacent RU can be decreased. An RU which uses a small number of subcarriers, such as 26RU, may preferably use the first configuration since interference has significant effect on performance.

The following two configurations are proposed as a 996RU configuration as in the new 160 MHz.

996RU=484RU+1N+26RU+1N+484RU

996RU=1N+484RU+26RU+484RU+1N

The 484RU has two 242RU configurations as in the existing 11ax.

484RU=242RU+242RU

The 242RU has the following configuration as in the existing 11ax.

242RU=1N+106RU+1N+26RU+1N+106RU+1N

The 106RU has the following configuration as in the existing 11ax.

106RU=52RU+2N+52RU

The 52RU has the following configuration as in the existing 11ax.

52RU=26RU+26RU

Each RU and an index of a null tone are listed below in a case where the first configuration of 2020RU is used, and the first configuration of 996RU is used.

<26 RU>

TABLE 210

| RU1 | RU2 | RU3 | RU4 | RU5 | RU6 | RU7 | RU8 | RU9 | |
|---|---|---|---|---|---|---|---|---|---|
| −2034:−2009 | −2008:−1983 | −1980:−1955 | −1954:−1929 | −1927:−1902 | −1900:−1875 | −1874:−1849 | −1846:−1821 | −1820:−1795 | |
| RU10 | RU11 | RU12 | RU13 | RU14 | RU15 | RU16 | RU17 | RU18 | RU19 |
| −1792:−1767 | −1766:−1741 | −1738:−1713 | −1712:−1687 | −1685:−1660 | −1658:−1633 | −1632:−1607 | −1604:−1579 | −1578:−1553 | −1550:−1525 |
| RU20 | RU21 | RU22 | RU23 | RU24 | RU25 | RU26 | RU27 | RU28 | |
| −1522:−1497 | −1496:−1471 | −1468:−1443 | −1442:−1417 | −1415:−1390 | −1388:−1363 | −1362:−1337 | −1334:−1309 | −1308:−1283 | |
| RU29 | RU30 | RU31 | RU32 | RU33 | RU34 | RU35 | RU36 | RU37 | RU38 |
| −1280:−1255 | −1254:−1229 | −1226:−1201 | 1200:−1175 | −1173:−1148 | −1146:−1121 | −1120:−1095 | −1092:−1067 | −1066:−1041 | −1038:−1013 |
| RU39 | RU40 | RU41 | RU42 | RU43 | RU44 | RU45 | RU46 | RU47 | |
| −1010:−985 | −984:−959 | −956:−931 | −930:−905 | −903:−878 | −876:−851 | −850:−825 | −822:−797 | −796:−771 | |
| RU48 | RU49 | RU50 | RU51 | RU52 | RU53 | RU54 | RU55 | RU56 | RU57 |
| −768:−743 | −742:−717 | −714:−689 | −688:−663 | −661:−636 | −634:−609 | −608:−583 | −580:−555 | −554:−529 | −526:−501 |
| RU58 | RU59 | RU60 | RU61 | RU62 | RU63 | RU64 | RU65 | RU66 | |
| −498:−473 | −472:−447 | −444:−419 | −418:−393 | −391:−366 | −364:−339 | −338:−313 | −310:−285 | −284:−259 | |
| RU67 | RU68 | RU69 | RU70 | RU71 | RU72 | RU73 | RU74 | RU75 | RU76 |
| −256:−231 | −230:−205 | −202:−177 | −176:−151 | −149:−124 | −122:−97 | −96:−71 | −68:−43 | −42:−17 | −15:−3, 3:15 |

→RU77~RU151→ A subcarrier index of RU 76+x is equal to a value obtained by multiplying a minus sign (−) to a sign of an RU 76-x subcarrier index (x is a positive integer less than or equal to 75).

→Ex) A subcarrier index of RU 77 is equal to a value obtained by multiplying a minus sign (−) to a sign of an RU 75 subcarrier index, that is, 17:42

Null subcarriers: ±{16, 69, 70, 123, 150, 203, 204, 257, 258, 311, 312, 365, 392, 445, 446, 499, 500, 527, 528, 581, 582, 635, 662, 715, 716, 769, 770, 823, 824, 877, 904, 957, 958, 1011, 1012, 1039, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035}

<52 RU>

TABLE 211

| RU1 | RU2 | RU3 | RU4 |
|---|---|---|---|
| −2034:−1983 | −1980:−1929 | −1900:−1849 | −1846:−1795 |
| RU5 | RU6 | RU7 | RU8 |
| −1792:−1741 | −1738:−1687 | −1658:−1607 | −1604:−1553 |
| RU9 | RU10 | RU11 | RU12 |
| −1522:−1471 | −1468:−1417 | −1388:−1337 | −1334:−1283 |
| RU13 | RU14 | RU15 | RU16 |
| −1280:−1229 | −1226:−1175 | −1146:−1095 | −1092:−1041 |
| RU17 | RU18 | RU19 | RU20 |
| −1010:−959 | −956:−905 | −876:−825 | −822:−771 |
| RU21 | RU22 | RU23 | RU24 |
| −768:−717 | −714:−663 | −634:−583 | −580:−529 |
| RU25 | RU26 | RU27 | RU28 |
| −498:−447 | −444:−393 | −364:−313 | −310:−259 |
| RU29 | RU30 | RU31 | RU32 |
| −256:−205 | −202:−151 | −122:−71 | −68:−17 |

→RU33~RU64→ A subcarrier index of RU 32+x is equal to a value obtained by multiplying a minus sign (−) to a sign of an RU 33-x subcarrier index (x is a positive integer less than or equal to 32).

→Ex) A subcarrier index of RU 34 is equal to a value obtained by multiplying a minus sign (−) to a sign of an RU 31 subcarrier index, that is, 71:122

Null subcarriers: ±{16, 69, 70, 123, 150, 203, 204, 257, 258, 311, 312, 365, 392, 445, 446, 499, 500, 527, 528, 581, 582, 635, 662, 715, 716, 769, 770, 823, 824, 877, 904, 957, 958, 1011, 1012, 1039, 1040, 1093, 1094, 1147, 1174, 1227, 1228, 1281, 1282, 1335, 1336, 1389, 1416, 1469, 1470, 1523, 1524, 1551, 1552, 1605, 1606, 1659, 1686, 1739, 1740, 1793, 1794, 1847, 1848, 1901, 1928, 1981, 1982, 2035}

<106 RU>

TABLE 212

| RU1 | RU2 | RU3 | RU4 |
|---|---|---|---|
| −2034:−1929 | −1900:−1795 | −1792:−1687 | −1658:−1553 |
| RU5 | RU6 | RU7 | RU8 |
| −1522:−1417 | −1388:−1283 | −1280:−1175 | −1146:−1041 |
| RU9 | RU10 | RU11 | RU12 |
| −1010:−905 | −876:−771 | −768:−663 | −634:−529 |
| RU13 | RU14 | RU15 | RU16 |
| −498:−393 | −364:−259 | −256:−151 | −122:−17 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 151:256

Null subcarriers: ±{16, 123, 150, 257, 258, 365, 392, 499, 500, 527, 528, 635, 662, 769, 770, 877, 904, 1011, 1012, 1039, 1040, 1147, 1174, 1281, 1282, 1389, 1416, 1523, 1524, 1551, 1552, 1659, 1686, 1793, 1794, 1901, 1928, 2035}

<242 RU>

TABLE 213

| RU1 | RU2 | RU3 | RU4 |
|---|---|---|---|
| −2035:−1794 | −1793:−1552 | −1523:−1282 | −1281:−1040 |
| RU5 | RU6 | RU7 | RU8 |
| −1011:−770 | −769:−528 | −499:−258 | −257:−16 |

→RU9~RU16→ A subcarrier index of RU 8+x is equal to a value obtained by multiplying a minus sign (−) to a sign of an RU 9-x subcarrier index (x is a positive integer less than or equal to 8).

→Ex) A subcarrier index of RU 10 is equal to a value obtained by multiplying a minus sign (−) to a sign of an RU 7 subcarrier index, that is, 258:499

Null subcarriers: ±{500, 527, 1012, 1039, 1524, 1551}

<484 RU>

TABLE 214

| RU1 | RU2 | RU3 | RU4 |
|---|---|---|---|
| −2035:−1552 | −1523:−1040 | −1011:−528 | −499:−16 |

→RU5~RU8→ A subcarrier index of RU 4+x is equal to a value obtained by multiplying a minus sign (−) to a sign of an RU 5-x subcarrier index (x is a positive integer less than or equal to 4).

>Ex) A subcarrier index of RU 6 is equal to a value obtained by multiplying a minus sign (−) to a sign of an RU 3 subcarrier index, that is, 528:1011

Null subcarriers: ±{500, 527, 1012, 1039, 1524, 1551}

<996 RU>

TABLE 215

| RU1 | RU2 | RU3 | RU4 |
|---|---|---|---|
| −2035:−1040 | −1011:−16 | 16:1011 | 1040:2035 |

Null subcarriers: ±{1012, 1039}

<2020 RU>

TABLE 216

| RU1 | RU2 |
|---|---|
| −2035:−16 | 16:2035 |

Null subcarriers: X

<4066 RU>

4066RU: −2035:−3, 3:2035

Null subcarriers: X

Each RU and an index of a null tone are listed below in a case where the first configuration of 2020RU is used, and the second configuration of 996RU is used.

<26 RU>

TABLE 217

| RU1 | RU2 | RU3 | RU4 | RU5 | RU6 | RU7 | RU8 | RU9 | |
|---|---|---|---|---|---|---|---|---|---|
| −2033:−2008 | −2007:−1982 | −1979:−1954 | −1953:−1928 | −1926:−1901 | −1899:−1874 | −1873:−1848 | −1845:−1820 | −1819:−1794 | |
| RU10 | RU11 | RU12 | RU13 | RU14 | RU15 | RU16 | RU17 | RU18 | RU19 |
| −1791:−1766 | −1765:−1740 | −1737:−1712 | −1711:−1686 | −1684:−1659 | −1657:−1632 | −1631:−1606 | −1603:−1578 | −1577:−1552 | −1550:−1525 |
| RU20 | RU21 | RU22 | RU23 | RU24 | RU25 | RU26 | RU27 | RU28 | |
| −1523:−1498 | −1497:−1472 | −1469:−1444 | −1443:−1418 | −1416:−1391 | −1389:−1364 | −1363:−1338 | −1335:−1310 | −1309:−1284 | |
| RU29 | RU30 | RU31 | RU32 | RU33 | RU34 | RU35 | RU36 | RU37 | RU38 |
| −1281:−1256 | −1255:−1230 | −1227:−1202 | −1201:−1176 | −1174:−1149 | −1147:−1122 | −1121:−1096 | −1093:−1068 | −1067:−1042 | −1038:−1013 |
| RU39 | RU40 | RU41 | RU42 | RU43 | RU44 | RU45 | RU46 | RU47 | |
| −1009:−984 | −983:−958 | −955:−930 | −929:−904 | −902:−877 | −875:−850 | −849:−824 | −821:−796 | −795:−770 | |
| RU48 | RU49 | RU50 | RU51 | RU52 | RU53 | RU54 | RU55 | RU56 | RU57 |
| −767:−742 | −741:−716 | −713:−688 | −687:−662 | −660:−635 | −633:−608 | −607:−582 | −579:−554 | −553:−528 | −526:−501 |
| RU58 | RU59 | RU60 | RU61 | RU62 | RU63 | RU64 | RU65 | RU66 | |
| −499:−474 | −473:−448 | −445:−420 | −419:−394 | −392:−367 | −365:−340 | −339:−314 | −311:−286 | −285:−260 | |
| RU67 | RU68 | RU69 | RU70 | RU71 | RU72 | RU73 | RU74 | RU75 | RU76 |
| −257:−232 | −231:−206 | −203:−178 | −177:−152 | −150:−125 | −123:−98 | −97:−72 | −69:−44 | −43:−18 | −15:−3, 3:15 |

→RU77~RU151→ A subcarrier index of RU 76+x is equal to a value obtained by multiplying a minus sign (−) to a sign of an RU 76-x subcarrier index (x is a positive integer less than or equal to 75).

→Ex) A subcarrier index of RU 77 is equal to a value obtained by multiplying a minus sign (−) to a sign of an RU 75 subcarrier index, that is, 18:43

Null subcarriers: ±{16, 17, 70, 71, 124, 151, 204, 205, 258, 259, 312, 313, 366, 393, 446, 447, 500, 527, 580, 581, 634, 661, 714, 715, 768, 769, 822, 823, 876, 903, 956, 957, 1010, 1011, 1012, 1039, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035}

<52 RU>

TABLE 218

| RU1 | RU2 | RU3 | RU4 |
|---|---|---|---|
| −2033:−1982 | −1979:−1928 | −1899:−1848 | −1845:−1794 |
| RU5 | RU6 | RU7 | RU8 |
| −1791:−1740 | −1737:−1686 | −1657:−1606 | −1603:−1552 |
| RU9 | RU10 | RU11 | RU12 |
| −1523:−1472 | −1469:−1418 | −1389:−1338 | −1335:−1284 |
| RU13 | RU14 | RU15 | RU16 |
| −1281:−1230 | −1227:−1176 | −1147:−1096 | −1093:−1042 |
| RU17 | RU18 | RU19 | RU20 |
| −1009:−958 | −955:−904 | −875:−824 | −821:−770 |
| RU21 | RU22 | RU23 | RU24 |
| −767:−716 | −713:−662 | −633:−582 | −579:−528 |
| RU25 | RU26 | RU27 | RU28 |
| −499:−448 | −445:−394 | −365:−314 | −311:−260 |
| RU29 | RU30 | RU31 | RU32 |
| −257:−206 | −203:−152 | −123:−72 | −69:−18 |

→RU33~RU64→ A subcarrier index of RU 32+x is equal to a value obtained by multiplying a minus sign (−) to a sign of an RU 33-x subcarrier index (x is a positive integer less than or equal to 32).

→Ex) A subcarrier index of RU 34 is equal to a value obtained by multiplying a minus sign (−) to a sign of an RU 31 subcarrier index, that is, 72:123

Null subcarriers: ±{16, 17, 70, 71, 124, 151, 204, 205, 258, 259, 312, 313, 366, 393, 446, 447, 500, 527, 580, 581, 634, 661, 714, 715, 768, 769, 822, 823, 876, 903, 956, 957, 1010, 1011, 1012, 1039, 1040, 1041, 1094, 1095, 1148, 1175, 1228, 1229, 1282, 1283, 1336, 1337, 1390, 1417, 1470, 1471, 1524, 1551, 1604, 1605, 1658, 1685, 1738, 1739, 1792, 1793, 1846, 1847, 1900, 1927, 1980, 1981, 2034, 2035}

<106 RU>

TABLE 219

| RU1 | RU2 | RU3 | RU4 |
|---|---|---|---|
| −2033:−1928 | −1899:−1794 | −1791:−1686 | −1657:−1552 |
| RU5 | RU6 | RU7 | RU8 |
| −1523:−1418 | −1389:−1284 | −1281:−1176 | −1147:−1042 |
| RU9 | RU10 | RU11 | RU12 |
| −1009:−904 | −875:−770 | −767:−662 | −633:−528 |
| RU13 | RU14 | RU15 | RU16 |
| −499:−394 | −365:−260 | −257:−152 | −123:−18 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 152:257

Null subcarriers: ±{16, 17, 124, 151, 258, 259, 366, 393, 500, 527, 634, 661, 768, 769, 876, 903, 1010, 1011, 1012, 1039, 1040, 1041, 1148, 1175, 1282, 1283, 1390, 1417, 1524, 1551, 1658, 1685, 1792, 1793, 1900, 1927, 2034, 2035}

<242 RU>

TABLE 220

| RU1 | RU2 | RU3 | RU4 |
|---|---|---|---|
| −2034:−1793 | −1792:−1551 | −1524:−1283 | −1282:−1041 |
| RU5 | RU6 | RU7 | RU8 |
| −1010:−769 | −768:−527 | −500:−259 | −258:−17 |

→RU9~RU16→ A subcarrier index of RU 8+x is equal to a value obtained by multiplying a minus sign (−) to a sign of an RU 9-x subcarrier index (x is a positive integer less than or equal to 8).

→Ex) A subcarrier index of RU 10 is equal to a value obtained by multiplying a minus sign (−) to a sign of an RU 7 subcarrier index, that is, 259:500

Null subcarriers: ±{16, 1011, 1012, 1039, 1040, 2035}

<484 RU>

TABLE 221

| RU1 | RU2 | RU3 | RU4 |
|---|---|---|---|
| −2034:−1551 | −1524:−1041 | −1010:−527 | −500:−17 |

→RU5~RU8→ A subcarrier index of RU 4+x is equal to a value obtained by multiplying a minus sign (−) to a sign of an RU 5-x subcarrier index (x is a positive integer less than or equal to 4).

→Ex) A subcarrier index of RU 6 is equal to a value obtained by multiplying a minus sign (−) to a sign of an RU 3 subcarrier index, that is, 527:1010

Null subcarriers: ±{16, 1011, 1012, 1039, 1040, 2035}

<996 RU>

TABLE 222

| RU1 | RU2 | RU3 | RU4 |
|---|---|---|---|
| −2035:−1040 | −1011:−16 | 16:1011 | 1040:2035 |

Null subcarriers: ±{1012, 1039}

<2020 RU>

TABLE 223

| RU1 | RU2 |
|---|---|
| −2035:−16 | 16:2035 |

Null subcarriers: X

<4066 RU>

4066RU: −2035:−3, 3:2035

Null subcarriers: X

Each RU and an index of a null tone are listed below in a case where the second configuration of 2020RU is used, and the first configuration of 996RU is used.

<26 RU>

TABLE 224

| RU1 | RU2 | RU3 | RU4 | RU5 | RU6 | RU7 | RU8 | RU9 |
|---|---|---|---|---|---|---|---|---|
| −2033:−2008 | −2007:−1982 | −1979:−1954 | −1953:−1928 | −1926:−1901 | −1899:−1874 | −1873:−1848 | −1845:−1820 | −1819:−1794 |
| RU10 | RU11 | RU12 | RU13 | RU14 | RU15 | RU16 | RU17 | RU18 | RU19 |
| −1791:−1766 | −1765:−1740 | −1737:−1712 | −1711:−1686 | −1684:−1659 | −1657:−1632 | −1631:−1606 | −1603:−1578 | −1577:−1552 | −1549:−1524 |
| RU20 | RU21 | RU22 | RU23 | RU24 | RU25 | RU26 | RU27 | RU28 | |
| −1521:−1496 | −1495:−1470 | −1467:−1442 | −1441:−1416 | −1414:−1389 | −1387:−1362 | −1361:−1336 | −1333:−1308 | −1307:−1282 | |
| RU29 | RU30 | RU31 | RU32 | RU33 | RU34 | RU35 | RU36 | RU37 | RU38 |
| −1279:−1254 | −1253:−1228 | −1225:−1200 | −1199:−1174 | −1172:−1147 | −1145:−1120 | −1119:−1094 | −1091:−1066 | −1065:−1040 | −1038:−1013 |
| RU39 | RU40 | RU41 | RU42 | RU43 | RU44 | RU45 | RU46 | RU47 | |
| −1011:−986 | −985:−960 | −957:−932 | −931:−906 | −904:−879 | −877:−852 | −851:−826 | −823:−798 | −797:−772 | |
| RU48 | RU49 | RU50 | RU51 | RU52 | RU53 | RU54 | RU55 | RU56 | RU57 |
| −769:−744 | −743:−718 | −715:−690 | −689:−664 | −662:−637 | −635:−610 | −609:−584 | −581:−556 | −555:−530 | −527:−502 |
| RU58 | RU59 | RU60 | RU61 | RU62 | RU63 | RU64 | RU65 | RU66 | |
| −499:−474 | −473:−448 | −445:−420 | −419:−394 | −392:−367 | −365:−340 | −339:−314 | −311:−286 | −285:−260 | |
| RU67 | RU68 | RU69 | RU70 | RU71 | RU72 | RU73 | RU74 | RU75 | RU76 |
| −257:−232 | −231:−206 | −203:−178 | −177:−152 | −150:−125 | −123:−98 | −97:−72 | −69:−44 | −43:−18 | −15:−3, 3:15 |

→RU77~RU151→ A subcarrier index of RU 76+x is equal to a value obtained by multiplying a minus sign (−) to a sign of an RU 76-x subcarrier index (x is a positive integer less than or equal to 75).

→Ex) A subcarrier index of RU 77 is equal to a value obtained by multiplying a minus sign (−) to a sign of an RU 75 subcarrier index, that is, 18:43

Null subcarriers: ±{16, 17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1039, 1092, 1093, 1146, 1173, 1226, 1227, 1280, 1281, 1334, 1335, 1388, 1415, 1468, 1469, 1522, 1523, 1550, 1551, 1604, 1605, 1658, 1685, 1738, 1739, 1792, 1793, 1846, 1847, 1900, 1927, 1980, 1981, 2034, 2035}

<52 RU>

TABLE 225

| RU1 | RU2 | RU3 | RU4 |
|---|---|---|---|
| −2033:−1982 | −1979:−1928 | −1899:−1848 | −1845:−1794 |
| RU5 | RU6 | RU7 | RU8 |
| −1791:−1740 | −1737:−1686 | −1657:−1606 | −1603:−1552 |
| RU9 | RU10 | RU11 | RU12 |
| −1521:−1470 | −1467:−1416 | −1387:−1336 | −1333:−1282 |
| RU13 | RU14 | RU15 | RU16 |
| −1279:−1228 | −1225:−1174 | −1145:−1094 | −1091:−1040 |
| RU17 | RU18 | RU19 | RU20 |
| −1011:−960 | −957:−906 | −877:−826 | −823:−772 |
| RU21 | RU22 | RU23 | RU24 |
| −769:−718 | −715:−664 | −635:−584 | −581:−530 |
| RU25 | RU26 | RU27 | RU28 |
| −499:−448 | −445:−394 | −365:−314 | −311:−260 |
| RU29 | RU30 | RU31 | RU32 |
| −257:−206 | −203:−152 | −123:−72 | −69:−18 |

→RU33~RU64→ A subcarrier index of RU 32+x is equal to a value obtained by multiplying a minus sign (−) to a sign of an RU 33-x subcarrier index (x is a positive integer less than or equal to 32).

→Ex) A subcarrier index of RU 34 is equal to a value obtained by multiplying a minus sign (−) to a sign of an RU 31 subcarrier index, that is, 72:123

Null subcarriers: ±{16, 17, 70, 71, 124, 151, 204, 205, 258, 259, 312, 313, 366, 393, 446, 447, 500, 501, 528, 529, 582, 583, 636, 663, 716, 717, 770, 771, 824, 825, 878, 905, 958, 959, 1012, 1039, 1092, 1093, 1146, 1173, 1226, 1227, 1280, 1281, 1334, 1335, 1388, 1415, 1468, 1469, 1522, 1523, 1550, 1551, 1604, 1605, 1658, 1685, 1738, 1739, 1792, 1793, 1846, 1847, 1900, 1927, 1980, 1981, 2034, 2035}

<106 RU>

TABLE 226

| RU1 | RU2 | RU3 | RU4 |
|---|---|---|---|
| −2033:−1928 | −1899:−1794 | −1791:−1686 | −1657:−1552 |
| RU5 | RU6 | RU7 | RU8 |
| −1521:−1416 | −1387:−1282 | −1279:−1174 | −1145:−1040 |
| RU9 | RU10 | RU11 | RU12 |
| −1011:−906 | −877:−772 | −769:−664 | −635:−530 |
| RU13 | RU14 | RU15 | RU16 |
| −499:394 | −365:−260 | −257:−152 | −123:−18 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 152:257

Null subcarriers: ±{16, 17, 124, 151, 258, 259, 366, 393, 500, 501, 528, 529, 636, 663, 770, 771, 878, 905, 1012, 1039, 1146, 1173, 1280, 1281, 1388, 1415, 1522, 1523, 1550, 1551, 1658, 1685, 1792, 1793, 1900, 1927, 2034, 2035}

<242 RU>

TABLE 227

| RU1 | RU2 | RU3 | RU4 |
|---|---|---|---|
| −2034:−1793 | −1792:−1551 | −1522:−1281 | −1280:−1039 |
| RU5 | RU6 | RU7 | RU8 |
| −1012:−771 | −770:−529 | −500:−259 | −258:−17 |

→RU9~RU16→ A subcarrier index of RU 8+x is equal to a value obtained by multiplying a minus sign (−) to a sign of an RU 9-x subcarrier index (x is a positive integer less than or equal to 8).

→Ex) A subcarrier index of RU 10 is equal to a value obtained by multiplying a minus sign (−) to a sign of an RU 7 subcarrier index, that is, 259:500

Null subcarriers: ±{16, 501, 528, 1523, 1550, 2035}

<484 RU>

TABLE 228

| RU1 | RU2 | RU3 | RU4 |
|---|---|---|---|
| −2034:−1551 | −1522:−1039 | −1012:−529 | −500:−17 |

→RU5~RU8→ A subcarrier index of RU 4+x is equal to a value obtained by multiplying a minus sign (−) to a sign of an RU 5-x subcarrier index (x is a positive integer less than or equal to 4).

→Ex) A subcarrier index of RU 6 is equal to a value obtained by multiplying a minus sign (−) to a sign of an RU 3 subcarrier index, that is, 529:1012

Null subcarriers: ±{16, 501, 528, 1523, 1550, 2035}

<996 RU>

TABLE 229

| RU1 | RU2 | RU3 | RU4 |
|---|---|---|---|
| −2034:−1039 | −1012:−17 | 17:1012 | 1039:2034 |

Null subcarriers: ±{16, 2035}

<2020 RU>

TABLE 230

| RU1 | RU2 |
|---|---|
| −2035:−16 | 16:2035 |

Null subcarriers: X

<4066 RU>

4066RU: −2035:−3, 3:2035

Null subcarriers: X

Each RU and an index of a null tone are listed below in a case where the second configuration of 2020RU is used, and the second configuration of 996RU is used.

<26 RU>

TABLE 231

| RU1 | RU2 | RU3 | RU4 | RU5 | RU6 | RU7 | RU8 | RU9 | |
|---|---|---|---|---|---|---|---|---|---|
| −2032:−2007 | −2006:−1981 | −1978:−1953 | −1952:−1927 | −1925:−1900 | −1898:−1873 | −1872:−1847 | −1844:−1819 | −1818:−1793 | |
| RU10 | RU11 | RU12 | RU13 | RU14 | RU15 | RU16 | RU17 | RU18 | RU19 |
| −1790:−1765 | −1764:−1739 | −1736:−1711 | −1710:−1685 | −1683:−1658 | −1656:−1631 | −1630:−1605 | −1602:−1577 | −1576:−1551 | −1549:−1524 |
| RU20 | RU21 | RU22 | RU23 | RU24 | RU25 | RU26 | RU27 | RU28 | |
| −1522:−1497 | −1496:−1471 | −1468:−1443 | −1442:−1417 | −1415:−1390 | −1388:−1363 | −1362:−1337 | −1334:−1309 | −1308:−1283 | |
| RU29 | RU30 | RU31 | RU32 | RU33 | RU34 | RU35 | RU36 | RU37 | RU38 |
| −1280:−1255 | −1254:−1229 | −1226:−1201 | −1200:−1175 | −1173:−1148 | −1146:−1121 | −1120:−1095 | −1092:−1067 | −1066:−1041 | −1038:−1013 |
| RU39 | RU40 | RU41 | RU42 | RU43 | RU44 | RU45 | RU46 | RU47 | |
| −1010:−985 | −984:−959 | −956:−931 | −930:−905 | −903:−878 | −876:−851 | −850:−825 | −822:−797 | −796:−771 | |
| RU48 | RU49 | RU50 | RU51 | RU52 | RU53 | RU54 | RU55 | RU56 | RU57 |
| −768:−743 | −742:−717 | −714:−689 | −688:−663 | −661:−636 | −634:−609 | −608:−583 | −580:−555 | −554:−529 | −527:−502 |
| RU58 | RU59 | RU60 | RU61 | RU62 | RU63 | RU64 | RU65 | RU66 | |
| −500:−475 | −474:−449 | −446:−421 | −420:−395 | −393:−368 | −366:−341 | −340:−315 | −312:−287 | −286:−261 | |
| RU67 | RU68 | RU69 | RU70 | RU71 | RU72 | RU73 | RU74 | RU75 | RU76 |
| −258:−233 | −232:−207 | −204:−179 | −178:−153 | −151:−126 | −124:−99 | −98:−73 | −70:−45 | −44:−19 | −15:−3, 3:15 |

→RU77~RU151→ A subcarrier index of RU 76+x is equal to a value obtained by multiplying a minus sign (−) to a sign of an RU 76-x subcarrier index (x is a positive integer less than or equal to 75).

→Ex) A subcarrier index of RU 77 is equal to a value obtained by multiplying a minus sign (−) to a sign of an RU 75 subcarrier index, that is, 19:44

Null subcarriers: ±{16, 17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012, 1039, 1040, 1093, 1094, 1147, 1174, 1227, 1228, 1281, 1282, 1335, 1336, 1389, 1416, 1469, 1470, 1523, 1550, 1603, 1604, 1657, 1684, 1737, 1738, 1791, 1792, 1845, 1846, 1899, 1926, 1979, 1980, 2033, 2034, 2035}

<52 RU>

TABLE 232

| RU1 | RU2 | RU3 | RU4 |
|---|---|---|---|
| −2032:−1981 | −1978:−1927 | −1898:−1847 | −1844:−1793 |
| RU5 | RU6 | RU7 | RU8 |
| −1790:−1739 | −1736:−1685 | −1656:−1605 | −1602:−1551 |
| RU9 | RU10 | RU11 | RU12 |
| −1522:−1471 | −1468:−1417 | −1388:−1337 | −1334:−1283 |
| RU13 | RU14 | RU15 | RU16 |
| −1280:−1229 | −1226:−1175 | −1146:−1095 | −1092:−1041 |
| RU17 | RU18 | RU19 | RU20 |
| −1010:−959 | −956:−905 | −876:−825 | −822:−771 |
| RU21 | RU22 | RU23 | RU24 |
| −768:−717 | −714:−663 | −634:−583 | −580:−529 |
| RU25 | RU26 | RU27 | RU28 |
| −500:−449 | −446:−395 | −366:−315 | −312:−261 |
| RU29 | RU30 | RU31 | RU32 |
| −258:−207 | −204:−153 | −124:−73 | −70:−19 |

→RU33~RU64→ A subcarrier index of RU 32+x is equal to a value obtained by multiplying a minus sign (−) to a sign of an RU 33-x subcarrier index (x is a positive integer less than or equal to 32).

→Ex) A subcarrier index of RU 34 is equal to a value obtained by multiplying a minus sign (−) to a sign of an RU 31 subcarrier index, that is, 73:124

Null subcarriers: ±{16, 17, 18, 71, 72, 125, 152, 205, 206, 259, 260, 313, 314, 367, 394, 447, 448, 501, 528, 581, 582, 635, 662, 715, 716, 769, 770, 823, 824, 877, 904, 957, 958, 1011, 1012, 1039, 1040, 1093, 1094, 1147, 1174, 1227, 1228, 1281, 1282, 1335, 1336, 1389, 1416, 1469, 1470, 1523, 1550, 1603, 1604, 1657, 1684, 1737, 1738, 1791, 1792, 1845, 1846, 1899, 1926, 1979, 1980, 2033, 2034, 2035}

<106 RU>

TABLE 233

| RU1 | RU2 | RU3 | RU4 |
|---|---|---|---|
| −2032:−1927 | −1898:−1793 | −1790:−1685 | −1656:−1551 |
| RU5 | RU6 | RU7 | RU8 |
| −1522:−1417 | −1388:−1283 | −1280:−1175 | −1146:−1041 |
| RU9 | RU10 | RU11 | RU12 |
| −1010:−905 | −876:−771 | −768:−663 | −634:−529 |
| RU13 | RU14 | RU15 | RU16 |
| −500:−395 | −366:−261 | −258:−153 | −124:−19 |

→RU17~RU32→ A subcarrier index of RU 16+x is equal to a value obtained by multiplying a minus sign (−) to a sign of an RU 17-x subcarrier index (x is a positive integer less than or equal to 16).

→Ex) A subcarrier index of RU 18 is equal to a value obtained by multiplying a minus sign (−) to a sign of an RU 15 subcarrier index, that is, 153:258

Null subcarriers: ±{16, 17, 18, 125, 152, 259, 260, 367, 394, 501, 528, 635, 662, 769, 770, 877, 904, 1011, 1012, 1039, 1040, 1147, 1174, 1281, 1282, 1389, 1416, 1523, 1550, 1657, 1684, 1791, 1792, 1899, 1926, 2033, 2034, 2035}

<242 RU>

TABLE 234

| RU1 | RU2 | RU3 | RU4 |
|---|---|---|---|
| −2033:−1792 | −1791:−1550 | −1523:−1282 | −1281:−1040 |
| RU5 | RU6 | RU7 | RU8 |
| −1011:−770 | −769:−528 | −501:−260 | −259:−18 |

→RU9~RU16→ A subcarrier index of RU 8+x is equal to a value obtained by multiplying a minus sign (−) to a sign of an RU 9-x subcarrier index (x is a positive integer less than or equal to 8).

→Ex) A subcarrier index of RU 10 is equal to a value obtained by multiplying a minus sign (−) to a sign of an RU 7 subcarrier index, that is, 260:501

Null subcarriers: ±{16, 17, 1012, 1039, 2034, 2035}
<484 RU>

TABLE 235

| RU1 | RU2 | RU3 | RU4 |
|---|---|---|---|
| −2033:−1550 | −1523:−1040 | −1011:−528 | −501:−18 |

→RU5~RU8→ A subcarrier index of RU 4+x is equal to a value obtained by multiplying a minus sign (−) to a sign of an RU 5-x subcarrier index (x is a positive integer less than or equal to 4).

→Ex) A subcarrier index of RU 6 is equal to a value obtained by multiplying a minus sign (−) to a sign of an RU 3 subcarrier index, that is, 528:1011

Null subcarriers: ±{16, 17, 1012, 1039, 2034, 2035}
<996 RU>

TABLE 236

| RU1 | RU2 | RU3 | RU4 |
|---|---|---|---|
| −2034:−1039 | −1012:−17 | 17:1012 | 1039:2034 |

Null subcarriers: ±{16, 2035}
<2020 RU>

TABLE 237

| RU1 | RU2 |
|---|---|
| −2035:−16 | 16:2035 |

Null subcarriers: X
<4066 RU>
4066RU: −2035:−3, 3:2035
Null subcarriers: X

Various full band plans proposed in the aforementioned 320 MHz alternative tone plan are configured to have the same number of guard tones of OFDMA, and a DC size is configured by considering DC of a tone plan of OFDMA, but may also be configured separately from this. For example, the full band tone plan proposed in the case A may be used in the OFDMA tone plan proposed in the cases B, C, D, E, F, and G.

3. 240 MHz

A bandwidth of 240 MHz may be used in transmission, and may be configured by combining three existing 11ax 80 NHz tone plans. This may be expressed as follows by considering both contiguous and non-contiguous situations. 80+80+80 MHz/160+80 MHz/80+160 MHz/240 MHz
+ means non-contiguous, and 160/240 means that 2/380 MHz tone plans are contiguously arranged in succession.

<In the Presence of Contiguous Band>

When 160 MHz is used, a tone index of a left 80 MHz tone plan is tone index-512 of the existing 80 MHz tone plan, and a tone index of a right 80 MHz tone plan is tone index+512 of the existing 80 MHz tone plan.

When 240 MHz is used, a tone index of a center 80 MHz tone plan is directly a tone index of the existing 80 MHz tone plan, a tone index of the leftmost 80 MHz tone plan is tone index-1024 of the existing 80 MHz tone plan, and a tone index of the right most 80 MHz is tone index+1024 of the existing 80 MHz tone plan.

The aforementioned various non-contiguous combinations may use not only the same band but also different bands. For example, in 80+80+80 MHz, each 80 MHz bandwidth may use 2.4GH/5 GHz/6 GHz band in transmission.

4. Exemplary Embodiments

Hereinafter, the aforementioned tone plan will be described in detail with reference to FIG. 13 to FIG. 17.

Figure 13:
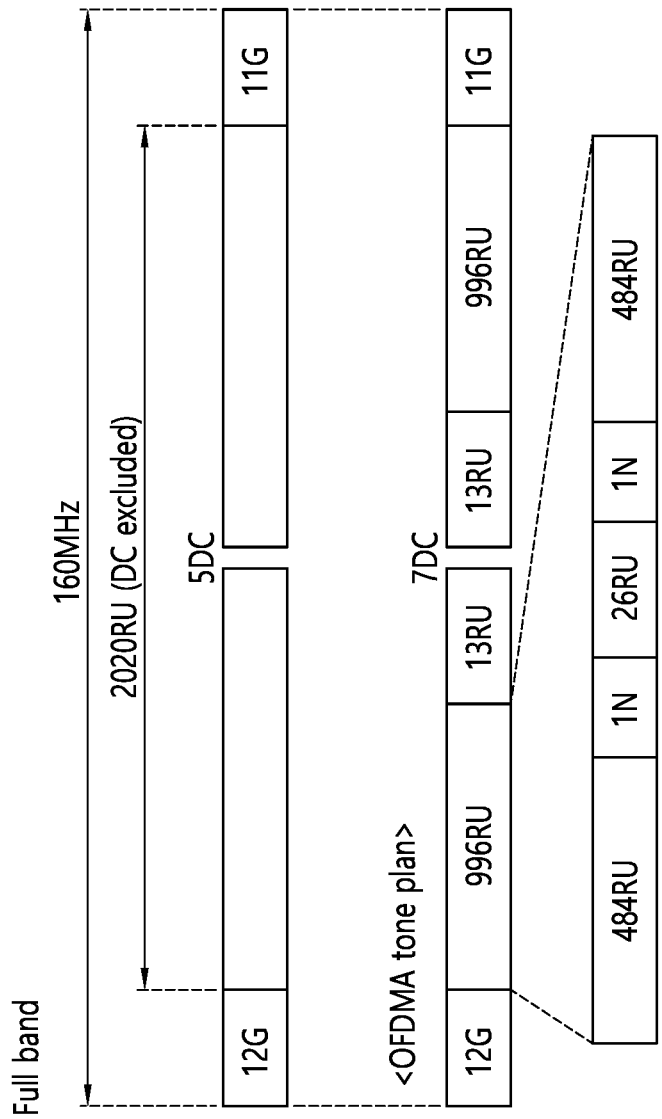
FIG. 13 shows an example of a tone plan in a 160 MHz band according to the present embodiment.

FIG. 13 shows an example of a tone plan in a 160 MHz band according to the present embodiment.

A tone plan in case of a full band and a tone plan in case of applying OFDMA are both illustrated in FIG. 13.

First, in case of the full band, a tone plan of 160 MHz may sequentially consist of 12 guard tones, 2020RU, 5 DC tones, and 11 guard tones. 5 DC tones may be located at the center of 160 MHz, and data may be transmitted in the 2020RU. However, FIG. 13 is for one embodiment only, and thus the 12 guard tones and the 11 guard tones may change in locations. When 7 DC tones are located at the center of 160 MHz, the data may be transmitted in 2018RU.

In case of applying OFDMA, a tone plan of 160 MHz may sequentially consist of 12 guard tones, 996RU, 13RU, 7 DC tones, 13RU, 996RU, and 11 guard tones. In addition, the 996RU may consist of 484RU, one null tone, 26RU, one null tone, and 484RU. However, FIG. 13 is for one embodiment only, and thus the 12 guard tones and the 11 guard tones may change in locations. The 996RU may consist of one null tone, 484RU, 26RU, 484RU, and one null tone.

The 484RU and subordinate RUs are not shown since they may have the same configuration as in the existing 11ax.

Figure 14:
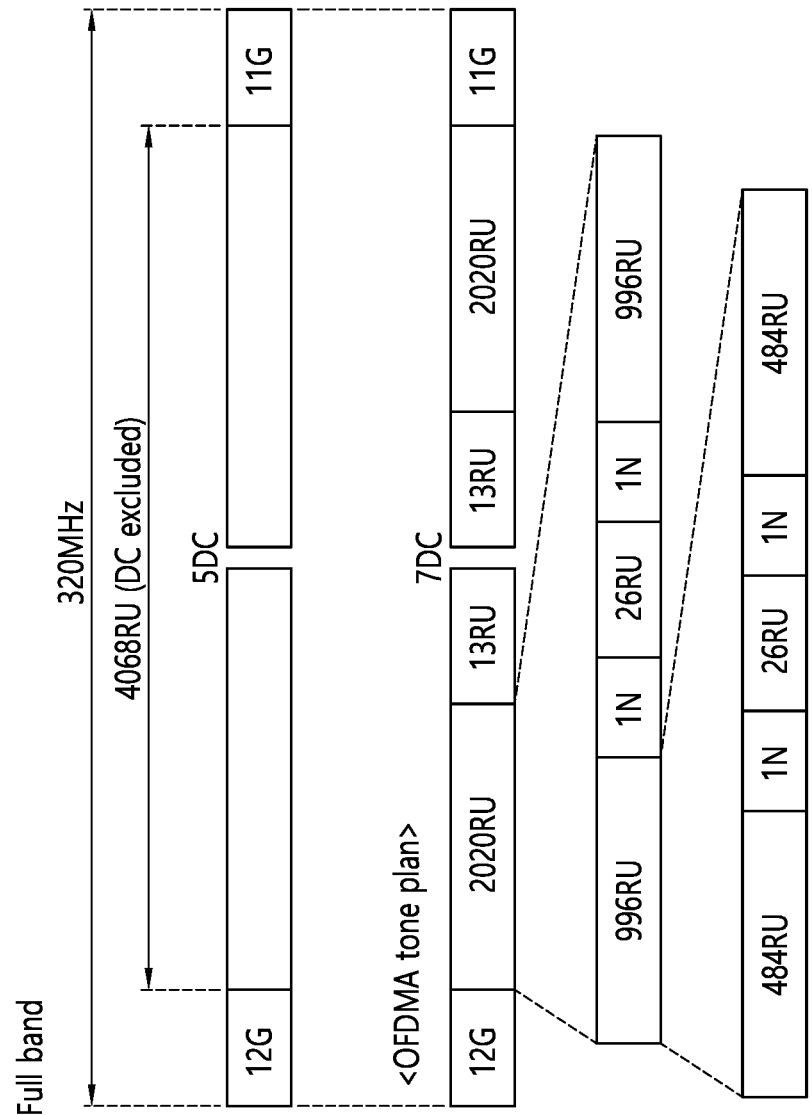
FIG. 14 shows an example of a tone plan in a 320 MHz band according to the present embodiment.

FIG. 14 shows an example of a tone plan in a 320 MHz band according to the present embodiment.

A tone plan in case of a full band and a tone plan in case of applying OFDMA are both illustrated in FIG. 14.

First, in case of the full band, a tone plan of 320 MHz may sequentially consist of 12 guard tones, 4068RU, 5 DC tones, and 11 guard tones. 5 DC tones may be located at the center of 320 MHz, and data may be transmitted in the 4068RU. However, FIG. 14 is for one embodiment only, and thus the 12 guard tones and the 11 guard tones may change in locations. When 7 DC tones are located at the center of 320 MHz, the data may be transmitted in 4066RU.

In case of applying OFDMA, a tone plan of 320 MHz may sequentially consist of 12 guard tones, 2020RU, 13RU, 7 DC tones, 13RU, 2020RU, and 11 guard tones. In addition, the 2020-tone RU may consist of 996RU, one null tone, 26RU, one null tone, and 996RU. In addition, the 996RU may consist of 484RU, one null tone, 26RU, one null tone, and 484RU. However, FIG. 14 is for one embodiment only, and thus the 12 guard tones and the 11 guard tones may change in locations. The 996RU may consist of one null tone, 484RU, 26RU, 484RU, and one null tone.

The 484RU and subordinate RUs are not shown since they may have the same configuration as in the existing 11ax.

Figure 15:
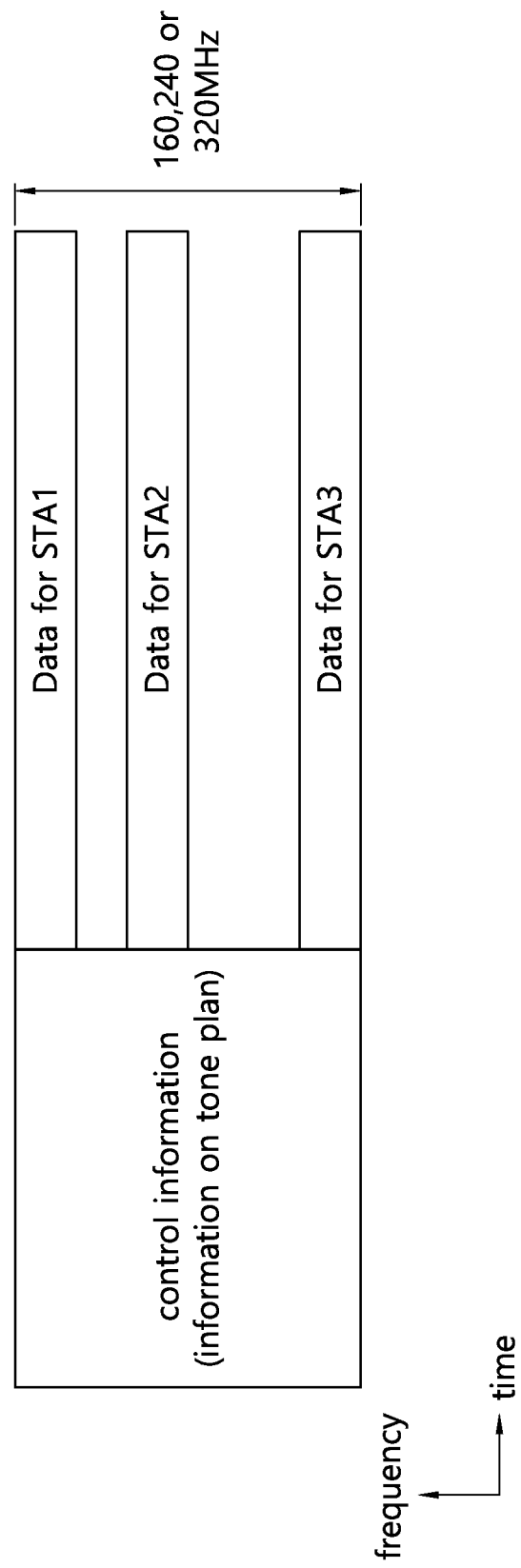
FIG. 15 shows an example of performing OFDMA transmission in a 160 MHz, 240 MHz, or 320 MHz band according to the present embodiment.

FIG. 15 shows an example of performing OFDMA transmission in a 160 MHz, 240 MHz, or 320 MHz band according to the present embodiment.

Referring to FIG. 15, an AP may transmit a PPDU to an STA 1 to an STA 3.

The PPDU may include control information including information on a tone plan. The STA 1 to the STA 3 may transmit/receive data in unit of RU, based on the information on the tone plan at 160 MHz, 240 MHz, or 320 MHz.

That is, the AP may transmit the information on the tone plan to all STAs in BSS at 160 MHz, 240 MHz, or 320 MHz, and the STA may acquire scheduling information of its data, based on the information on the tone plan. Accordingly, among the all STAs in the BSS, the STA 1 to the STA 3, which have data, may transmit/receive data through an RU allocated based on the information on the one plan. The data may include both downlink data and uplink data.

A tone plan in a broadband will be described below in detail with reference to FIG. 16 and FIG. 17.

Figure 16:
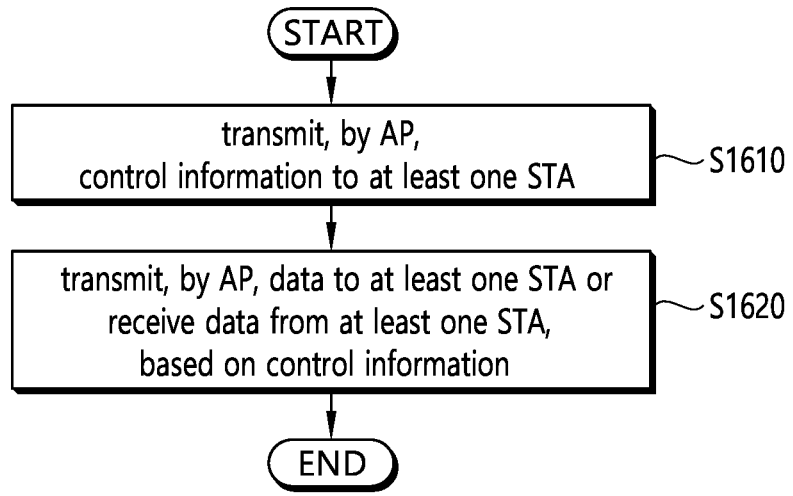
FIG. 16 is a flowchart illustrating a procedure of transmitting/receiving data, based on a tone plan, from an AP perspective according to the present embodiment.

FIG. 16 is a flowchart illustrating a procedure of transmitting/receiving data, based on a tone plan, from an AP perspective according to the present embodiment.

An embodiment of FIG. 16 may be performed in a network environment in which a next-generation WLAN system is supported. The next-generation WLAN system is a WLAN system evolved from an 802.11ax system, and may satisfy backward compatibility with the 802.11ax system.

The embodiment of FIG. 16 may be performed in a transmitting device, and the transmitting device may correspond to an access point (AP). A receiving device of FIG. 16 may correspond to a station (STA) (non-AP STA).

In step S1610, the AP transmits control information to at least one STA.

In step S1620, the AP transmits data to the at least one STA or receives data from the at least one STA, based on the control information.

The control information includes resource unit (RU) information for transmitting/receiving the data in a broadband. That is, it may be regarded that the RU information includes scheduling information on data for the at least one STA (information on a configuration of an RU used when data is transmitted in practice in the broadband). The at least one STA may decode the RU information to transmit/receive the data in unit of RU. The broadband may be 160 MHz, 240 MHz or 320 MHz, but is limited to 320 MHz in the present embodiment.

If the RU information is tone plan information for a full bandwidth of the broadband, the RU information includes allocation information on that the broadband consists of 12 guard tones, a 4068-tone RU, 5 DC tones, and 11 guard tones. The allocation information is one example, and may include allocation information for a configuration of various RUs in which data is transmitted in practice. When using the tone plan for the full bandwidth of the broadband, it may be SU transmission. When MU MIMO is applied for the full bandwidth, it may be MU transmission.

If the RU information is tone plan information which applies OFDMA for the broadband, the RU information includes allocation information on that the broadband consists of 12 guard tones, a 2020-tone RU, a 13-tone RU, 7 DC tones, a 13-tone RU, a 2020-tone RU, and 11 guard tones. The allocation information is one example, and the RU information may include allocation information for a configuration of various RUs in which data is transmitted in practice. When using the tone plan which applies OFDMA for the broadband, the at least one STA is one or more STAs (SU transmission or MU transmission).

If the RU information is tone plan information for the full bandwidth of the broadband, the tone plan for the broadband is as follows. The broadband may sequentially consist of 12 guard tones, a 4068-tone RU, 5 DC tones, and 11 guard tones. The 5 DC tones may be located at the center of the broadband.

The 4068-tone RU is an RU including 4068 tones. A tone index of the 4068-tone RU ranges from −2036 to −3 and from 3 to 2036. The data may be transmitted/received through the 4068-tone RU.

If the RU information is tone plan information which applies OFDMA for the broadband, the tone plan for the broadband is as follows. The broadband may sequentially consist of 12 guard tones, a 4068-tone RU, 5 DC tones, and 11 guard tones. The 5 DC tones may be located at the center of the broadband.

The 2020-tone RU is an RU including 2020 tones. The 2020-tone RU may consist of a 996-tone RU, 1 null tone, a 26-tone RU, 1 null tone, and a 996-tone RU.

The 996-tone RU is an RU including 996 tones. The 996-tone RU may consist of a 484-tone RU, 1 null tone, a 26-tone RU, 1 null tone, and a 484-tone RU.

The 484-tone RU is an RU including 484 tones. The 484-tone RU may consist of a 242-tone RU and a 242-tone RU.

The 242-tone RU is an RU including 242 tones. The 242-tone RU may consist of 1 null tone, a 106-tone RU, 1 null tone, a 26-tone RU, 1 null tone, a 106-tone RU, and 1 null tone.

The 106-tone RU is an RU including 106 tones. The 106-tone RU may consist of a 52-tone RU, 1 null tone, and a 52-tone RU.

The 52-tone RU is an RU including 52 tones. The 52-tone RU may consist of a 26-tone RU and a 26-tone RU. The 26-tone RU may be a minimum-unit RU including 26 tones.

In case of a tone plan which applies OFDMA for the broadband, the data may be transmitted/received through the 2020-tone RU, the 996-tone RU, the 484-tone RU, the 242-tone RU, the 106-tone RU, the 52-tone RU, or the 26-tone RU. That is, the data may be transmitted/received through an RU (the 996-tone RU, the 484-tone RU, the 242-tone RU, the 106-tone RU, the 52-tone RU, or the 26-tone RU) having the 2020-tone RU or a smaller tone included in the 2020-tone RU.

In addition, the AP may generate a physical protocol data unit (PPDU).

The PPDU may include a legacy preamble, a signal field, a training field, and a data field, The control information may be included in the signal field. The signal field may include extremely high throughput (EHT)-SIG-A and EHT-SIG-B. The EHT-SIG-B may include the RU information. That is, the AP may report information on the tone plan in the broadband through the EHT-SIG-B in the PPDU.

The data may include the training field and the data field. The training field may include an EHT-short training field (STF) and an EHT-long training field (LTF). That is, the EHT-STF, EHT-LTF, and data field in the PPDU may be transmitted/received in a band (RU) based on the tone plan in the broadband.

Figure 17:
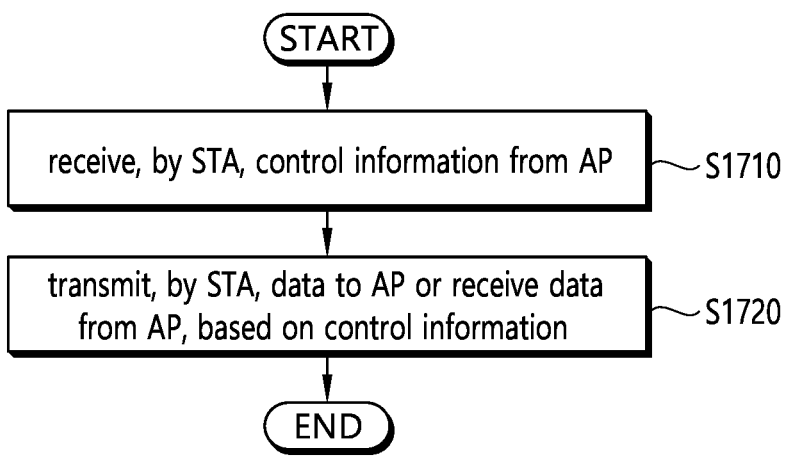
FIG. 17 is a flowchart illustrating a procedure of transmitting/receiving data, based on a tone plan, from an STA perspective according to the present embodiment.

FIG. 17 is a flowchart illustrating a procedure of transmitting/receiving data, based on a tone plan, from an STA perspective according to the present embodiment.

An embodiment of FIG. 17 may be performed in a network environment in which a next-generation WLAN system is supported. The next-generation WLAN system is a WLAN system evolved from an 802.11ax system, and may satisfy backward compatibility with the 802.11ax system.

The embodiment of FIG. 17 may be performed in a receiving device, and the receiving device may correspond to a station (STA) (non-AP STA).

In step 1710, a station (STA) receives control information from an access point (AP).

In step 1720, the STA transmits data to the AP or receives data from the AP, based on the control information.

The control information includes resource unit (RU) information for transmitting/receiving the data in a broadband. That is, it may be regarded that the RU information includes scheduling information on data for the at least one STA (information on a configuration of an RU used when data is transmitted in practice in the broadband). The at least one STA may decode the RU information to transmit/receive the data in unit of RU. The broadband may be 160 MHz, 240 MHz or 320 MHz, but is limited to 320 MHz in the present embodiment.

If the RU information is tone plan information for a full bandwidth of the broadband, the RU information includes allocation information on that the broadband consists of 12 guard tones, a 4068-tone RU, 5 DC tones, and 11 guard tones. The allocation information is one example, and may include allocation information for a configuration of various RUs in which data is transmitted in practice. When using the tone plan for the full bandwidth of the broadband, it may be SU transmission. When MU MIMO is applied for the full bandwidth, it may be MU transmission.

If the RU information is tone plan information which applies orthogonal frequency division multiplex access (OFDMA) for the broadband, the RU information includes allocation information on that the broadband consists of 12 guard tones, a 2020-tone RU, a 13-tone RU, 7 DC tones, a 13-tone RU, a 2020-tone RU, and 11 guard tones. The allocation information is one example, and the RU information may include allocation information for a configuration of various RUs in which data is transmitted in practice. When using the tone plan which applies OFDMA for the broadband, the at least one STA is one or more STAs (SU transmission or MU transmission).

If the RU information is tone plan information for the full bandwidth of the broadband, the tone plan for the broadband is as follows. The broadband may sequentially consist of 12 guard tones, a 4068-tone RU, 5 DC tones, and 11 guard tones. The 5 DC tones may be located at the center of the broadband.

The 4068-tone RU is an RU including 4068 tones. A tone index of the 4068-tone RU ranges from −2036 to −3 and from 3 to 2036. The data may be transmitted/received through the 4068-tone RU.

If the RU information is tone plan information which applies OFDMA for the broadband, the tone plan for the broadband is as follows. The broadband may sequentially consist of 12 guard tones, a 4068-tone RU, 5 DC tones, and 11 guard tones. The 5 DC tones may be located at the center of the broadband.

The 2020-tone RU is an RU including 2020 tones. The 2020-tone RU may consist of a 996-tone RU, 1 null tone, a 26-tone RU, 1 null tone, and a 996-tone RU.

The 996-tone RU is an RU including 996 tones. The 996-tone RU may consist of a 484-tone RU, 1 null tone, a 26-tone RU, 1 null tone, and a 484-tone RU.

The 484-tone RU is an RU including 484 tones. The 484-tone RU may consist of a 242-tone RU and a 242-tone RU.

The 242-tone RU is an RU including 242 tones. The 242-tone RU may consist of 1 null tone, a 106-tone RU, 1 null tone, a 26-tone RU, 1 null tone, a 106-tone RU, and 1 null tone.

The 106-tone RU is an RU including 106 tones. The 106-tone RU may consist of a 52-tone RU, 1 null tone, and a 52-tone RU.

The 52-tone RU is an RU including 52 tones. The 52-tone RU may consist of a 26-tone RU and a 26-tone RU. The 26-tone RU may be a minimum-unit RU including 26 tones.

In case of the tone plan which applies OFDMA for the broadband, the data may be transmitted/received through the 2020-tone RU, the 996-tone RU, the 484-tone RU, the 242-tone RU, the 106-tone RU, the 52-tone RU, or the 26-tone RU. That is, the data may be transmitted/received through an RU (the 996-tone RU, the 484-tone RU, the 242-tone RU, the 106-tone RU, the 52-tone RU, or the 26-tone RU) having the 2020-tone RU or a smaller tone included in the 2020-tone RU.

In addition, the AP may generate a physical protocol data unit (PPDU).

The PPDU may include a legacy preamble, a signal field, a training field, and a data field, The control information may be included in the signal field. The signal field may include extremely high throughput (EHT)-SIG-A and EHT-SIG-B. The EHT-SIG-B may include the RU information. That is, the AP may report information on the tone plan in the broadband through the EHT-SIG-B in the PPDU.

The data may include the training field and the data field. The training field may include an EHT-short training field (STF) and an EHT-long training field (LTF). That is, the EHT-STF, EHT-LTF, and data field in the PPDU may be transmitted/received in a band (RU) based on the tone plan in the broadband.

5. Device Configuration

Figure 18:
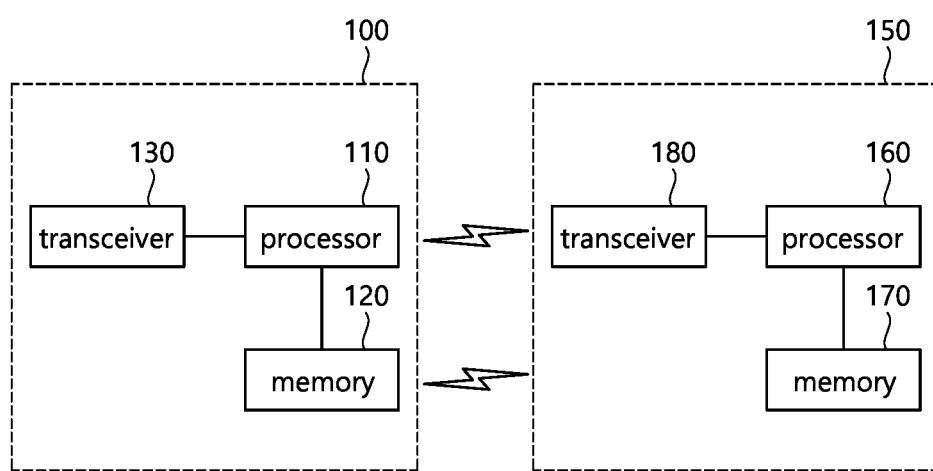
FIG. 18 is a diagram for describing a device for implementing the above-described method.

FIG. 18 is a diagram describing a device for implementing the above-described method.

A wireless device (100) of FIG. 18 may correspond to an initiator STA, which transmits a signal that is described in the description presented above, and a wireless device (150) may correspond to a responder STA, which receives a signal that is described in the description presented above. At this point, each station may correspond to a 11ay device (or user equipment (UE)) or a PCP/AP. Hereinafter, for simplicity in the description of the present disclosure, the initiator STA transmits a signal is referred to as a transmitting device (100), and the responder STA receiving a signal is referred to as a receiving device (150).

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor 110, 160 may implement the functions, processes and/or methods proposed in the present disclosure. For example, the processor 110, 160 may perform the operation according to the present embodiment.

An operation of the processor 110 of the transmitting device is described in detail as follows. The processor 110 of the transmitting device transmits control information to at least one STA, and transmits data to at least one STA or receives data from at least one STA, based on the control information.

An operation of the processor 160 of the receiving device is described in detail as follows. The processor 160 of the receiving device receives control information from the AP, and transmits data to the AP or receives data from the AP, based on the control information.

Figure 19:
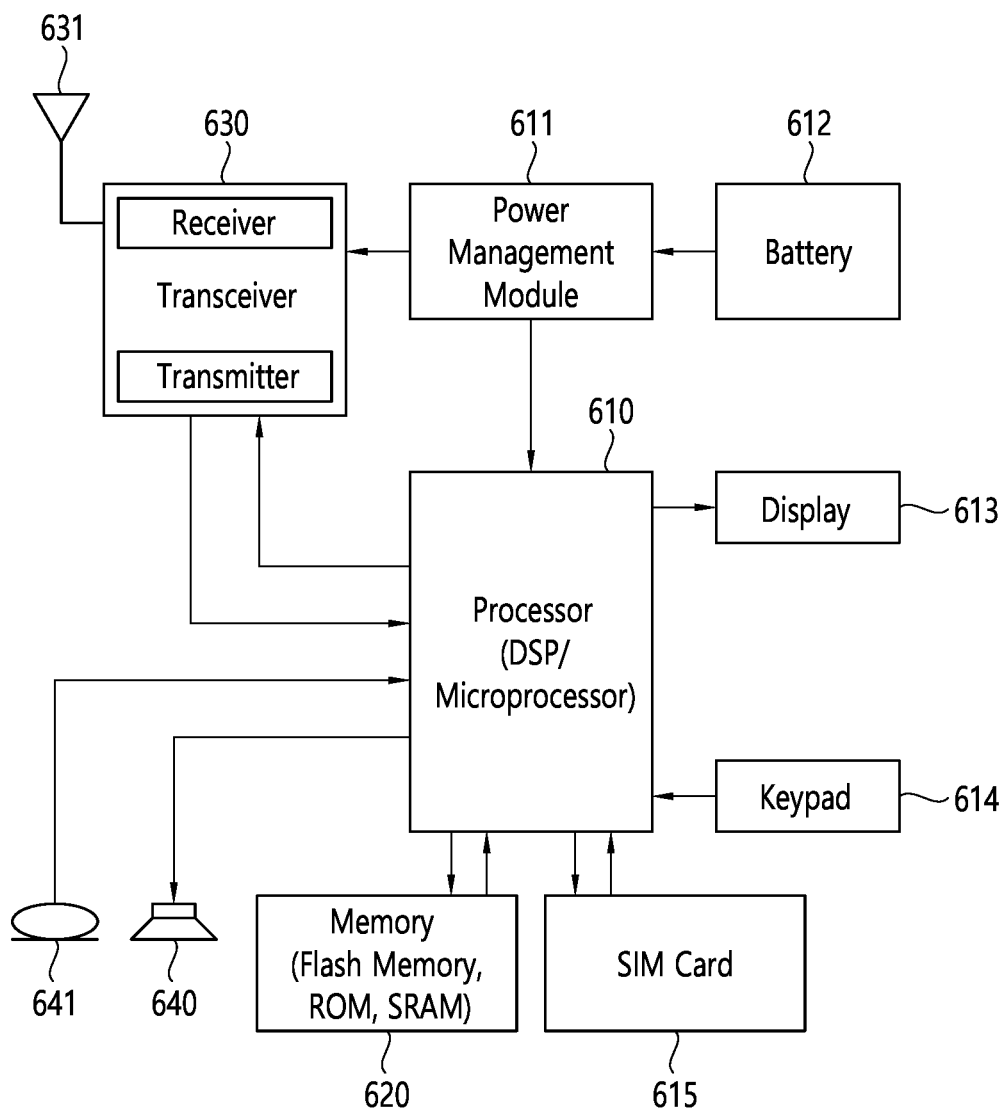
FIG. 19 illustrates a more detailed wireless device for implementing the embodiment of the present disclosure.

FIG. 19 shows a UE to which the technical features of the present disclosure can be applied.

A UE includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods of the present disclosure described below. The processor 610 may be configured to control one or more other components of the UE 600 to implement proposed functions, procedures and/or methods of the present disclosure described below. Layers of the radio interface protocol may be implemented in the processor 610. The processor 610 may include application-specific integrated circuit (ASIC), other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

In case of the transmitting device, the processor 610 transmits control information to at least one STA, and transmits data to at least one STA or receives data from at least one STA, based on the control information.

In case of the receiving device, the processor 610 receives control information from the AP, and transmits data to the AP or receives data from the AP, based on the control information The control information includes resource unit (RU) information for transmitting/receiving the data in a broadband. That is, it may be regarded that the RU information includes scheduling information on data for the at least one STA (information on a configuration of an RU used when data is transmitted in practice in the broadband). The at least one STA may decode the RU information to transmit/receive the data in unit of RU. The broadband may be 160 MHz, 240 MHz or 320 MHz, but is limited to 320 MHz in the present embodiment.

If the RU information is tone plan information for a full bandwidth of the broadband, the RU information includes allocation information on that the broadband consists of 12 guard tones, a 4068-tone RU, 5 DC tones, and 11 guard tones. The allocation information is one example, and may include allocation information for a configuration of various RUs in which data is transmitted in practice. When using the tone plan for the full bandwidth of the broadband, it may be SU transmission. When MU MIMO is applied for the full bandwidth, it may be MU transmission.

If the RU information is tone plan information which applies OFDMA for the broadband, the RU information includes allocation information on that the broadband consists of 12 guard tones, a 2020-tone RU, a 13-tone RU, 7 DC tones, a 13-tone RU, a 2020-tone RU, and 11 guard tones. The allocation information is one example, and the RU information may include allocation information for a configuration of various RUs in which data is transmitted in practice. When using the tone plan which applies OFDMA for the broadband, the at least one STA is one or more STAs (SU transmission or MU transmission).

If the RU information is tone plan information for the full bandwidth of the broadband, the tone plan for the broadband is as follows. The broadband may sequentially consist of 12 guard tones, a 4068-tone RU, 5 DC tones, and 11 guard tones. The 5 DC tones may be located at the center of the broadband.

The 4068-tone RU is an RU including 4068 tones. A tone index of the 4068-tone RU ranges from −2036 to −3 and from 3 to 2036. The data may be transmitted/received through the 4068-tone RU.

If the RU information is tone plan information which applies OFDMA for the broadband, the tone plan for the broadband is as follows. The broadband may sequentially consist of 12 guard tones, a 4068-tone RU, 5 DC tones, and 11 guard tones. The 5 DC tones may be located at the center of the broadband.

The 2020-tone RU is an RU including 2020 tones. The 2020-tone RU may consist of a 996-tone RU, 1 null tone, a 26-tone RU, 1 null tone, and a 996-tone RU.

The 996-tone RU is an RU including 996 tones. The 996-tone RU may consist of a 484-tone RU, 1 null tone, a 26-tone RU, 1 null tone, and a 484-tone RU.

The 484-tone RU is an RU including 484 tones. The 484-tone RU may consist of a 242-tone RU and a 242-tone RU.

The 242-tone RU is an RU including 242 tones. The 242-tone RU may consist of 1 null tone, a 106-tone RU, 1 null tone, a 26-tone RU, 1 null tone, a 106-tone RU, and 1 null tone.

The 106-tone RU is an RU including 106 tones. The 106-tone RU may consist of a 52-tone RU, 1 null tone, and a 52-tone RU.

The 52-tone RU is an RU including 52 tones. The 52-tone RU may consist of a 26-tone RU and a 26-tone RU. The 26-tone RU may be a minimum-unit RU including 26 tones.

In case of a tone plan which applies OFDMA for the broadband, the data may be transmitted/received through the 2020-tone RU, the 996-tone RU, the 484-tone RU, the 242-tone RU, the 106-tone RU, the 52-tone RU, or the 26-tone RU. That is, the data may be transmitted/received through an RU (the 996-tone RU, the 484-tone RU, the 242-tone RU, the 106-tone RU, the 52-tone RU, or the 26-tone RU) having the 2020-tone RU or a smaller tone included in the 2020-tone RU.

In addition, the AP may generate a physical protocol data unit (PPDU).

The PPDU may include a legacy preamble, a signal field, a training field, and a data field, The control information may be included in the signal field. The signal field may include extremely high throughput (EHT)-SIG-A and EHT-SIG-B. The EHT-SIG-B may include the RU information. That is, the AP may report information on the tone plan in the broadband through the EHT-SIG-B in the PPDU.

The data may include the training field and the data field. The training field may include an EHT-short training field (STF) and an EHT-long training field (LTF). That is, the EHT-STF, EHT-LTF, and data field in the PPDU may be transmitted/received in a band (RU) based on the tone plan in the broadband.

What is claimed is:

1. A method of transmitting/receiving transmitting data in a wireless local area network (WLAN) system, the method comprising:
    transmitting, by an access point (AP), control information to at least one station (STA); and
    transmitting, by the AP, data to the at least one STA,
    wherein the control information comprises resource unit (RU) information for transmitting the data in a broadband,
    wherein, based on the RU information being tone plan information for a full bandwidth of the broadband, the RU information comprises allocation information on that the broadband consists of 12 guard tones, a 4068-tone RU, 5 DC tones, and 11 guard tones,
    wherein, based on the RU information being tone plan information which applies orthogonal frequency division multiplex access (OFDMA) for the broadband, the RU information comprises allocation information on that the broadband consists of 12 guard tones, a 2020-tone RU, a 13-tone RU, 7 DC tones, a 13-tone RU, a 2020-tone RU, and 11 guard tones,
    wherein the 4068-tone RU is an RU comprising 4068 tones,
    wherein a tone index of the 4068-tone RU ranges from −2036 to −3 and from 3 to 2036, and
    wherein the data is transmitted through the 4068-tone RU.
2. The method of claim 1,
    wherein the 2020-tone RU is an RU comprising 2020 tones, and
    wherein the 2020-tone RU consists of a 996-tone RU, 1 null tone, a 26-tone RU, 1 null tone, and a 996-tone RU.
3. The method of claim 2,
    wherein the 996-tone RU is an RU comprising 996 tones, and
    wherein the 996-tone RU consists of a 484-tone RU, 1 null tone, a 26-tone RU, 1 null tone, and a 484-tone RU.

4. The method of claim 3,
wherein the 484-tone RU is an RU comprising 484 tones, and
wherein the 484-tone RU consists of a 242-tone RU and a 242-tone RU.

5. The method of claim 4,
wherein the 242-tone RU is an RU comprising 242 tones, and
wherein the 242-tone RU consists of 1 null tone, a 106-tone RU, 1 null tone, a 26-tone RU, 1 null tone, a 106-tone RU, and 1 null tone.

6. The method of claim 5,
wherein the 106-tone RU is an RU comprising 106 tones, and
wherein the 106-tone RU consists of a 52-tone RU, 1 null tone, and a 52-tone RU.

7. The method of claim 6,
wherein the 52-tone RU is an RU comprising 52 tones,
wherein the 52-tone RU consists of a 26-tone RU and a 26-tone RU, and
wherein the 26-tone RU is a minimum-unit RU comprising 26 tones.

8. The method of claim 7, wherein the data is transmitted/received through the 2020-tone RU, the 996-tone RU, the 484-tone RU, the 242-tone RU, the 106-tone RU, the 52-tone RU, or the 26-tone RU.

9. The method of claim 1, further comprising
generating, by the AP, a physical protocol data unit (PPDU),
wherein the PPDU comprises a legacy preamble, a signal field, a training field, and a data field,
wherein the control information is comprised in the signal field,
wherein the data comprises the training field and the data field, and
wherein the broadband is 320 MHz.

10. The method of claim 9,
wherein the signal field comprises extremely high throughput (EHT)-SIG-A and EHT-SIG-B,
wherein the training field comprises EHT-short training field (STF) and EHT-long training field (LTF), and
wherein the EHT-SIG-B comprises the RU information.

11. An access point (AP) transmitting data in a wireless local area network (WLAN) system, the AP comprising:
a memory;
a transceiver; and
a processor operatively coupled with the memory and the transceiver, wherein the processor is configured to:
transmit control information to at least one station (STA); and
transmit data to the at least one STA, based on the control information,
wherein the control information comprises resource unit (RU) information for transmitting the data in a broadband,
wherein, based on the RU information being tone plan information for a full bandwidth of the broadband, the RU information comprises allocation information on that the broadband consists of 12 guard tones, a 4068-tone RU, 5 DC tones, and 11 guard tones,
wherein, based on the RU information being tone plan information which applies orthogonal frequency division multiplex access (OFDMA) for the broadband, the RU information comprises allocation information on that the broadband consists of 12 guard tones, a 2020-tone RU, a 13-tone RU, 7 DC tones, a 13-tone RU, a 2020-tone RU, and 11 guard tones,
wherein the 4068-tone RU is an RU comprising 4068 tones,
wherein a tone index of the 4068-tone RU ranges from −2036 to −3 and from 3 to 2036, and
wherein the data is transmitted through the 4068-tone RU.

12. The AP of claim 11,
wherein the 2020-tone RU is an RU comprising 2020 tones, and
wherein the 2020-tone RU consists of a 996-tone RU, 1 null tone, a 26-tone RU, 1 null tone, and a 996-tone RU.

13. The AP of claim 12,
wherein the 996-tone RU is an RU comprising 996 tones, and
wherein the 996-tone RU consists of a 484-tone RU, 1 null tone, a 26-tone RU, 1 null tone, and a 484-tone RU.

14. The AP of claim 13,
wherein the 484-tone RU is an RU comprising 484 tones, and
wherein the 484-tone RU consists of a 242-tone RU and a 242-tone RU.

15. The AP of claim 14,
wherein the 242-tone RU is an RU comprising 242 tones, and
wherein the 242-tone RU consists of 1 null tone, a 106-tone RU, 1 null tone, a 26-tone RU, 1 null tone, a 106-tone RU, and 1 null tone.

16. The AP of claim 15,
wherein the 106-tone RU is an RU comprising 106 tones, and
wherein the 106-tone RU consists of a 52-tone RU, 1 null tone, and a 52-tone RU.

17. The AP of claim 16,
wherein the 52-tone RU is an RU comprising 52 tones,
wherein the 52-tone RU consists of a 26-tone RU and a 26-tone RU,
wherein the 26-tone RU is a minimum-unit RU comprising 26 tones, and
wherein the data is transmitted/received through the 2020-tone RU, the 996-tone RU, the 484-tone RU, the 242-tone RU, the 106-tone RU, the 52-tone RU, or the 26-tone RU.

18. A station (STA) receiving data in a wireless local area network (WLAN) system, the STA comprising:
a memory;
a transceiver; and
a processor operatively coupled with the memory and the transceiver, wherein the processor is configured to
receive control information from an access point (AP); and
receive data from the AP, based on the control information,
wherein the control information comprises resource unit (RU) information for transmitting the data in a broadband,
wherein, based on the RU information being tone plan information for a full bandwidth of the broadband, the RU information comprises allocation information on that the broadband consists of 12 guard tones, a 4068-tone RU, 5 DC tones, and 11 guard tones,
wherein, based on the RU information being tone plan information which applies orthogonal frequency division multiplex access (OFDMA) for the broadband, the RU information comprises allocation information on that the broadband consists of 12 guard tones, a 2020-tone RU, a 13-tone RU, 7 DC tones, a 13-tone RU, a 2020-tone RU, and 11 guard tones, wherein the 4068-tone RU is an RU comprising 4068 tones,
wherein a tone index of the 4068-tone RU ranges from −2036 to −3 and from 3 to 2036, and
wherein the data is received through the 4068-tone RU.

* * * * *